(12) United States Patent
Hori et al.

(10) Patent No.: US 7,650,328 B2
(45) Date of Patent: Jan. 19, 2010

(54) DATA STORAGE DEVICE CAPABLE OF STORING MULTIPLE SETS OF HISTORY INFORMATION ON INPUT/OUTPUT PROCESSING OF SECURITY DATA WITHOUT DUPLICATION

(75) Inventors: Yoshihiro Hori, Gifu (JP); Kenichiro Tada, Tokorozawa (JP); Tatsuya Hirai, Kawasaki (JP); Masafumi Tsuru, Tokyo (JP); Takayuki Hasebe, Kawasaki (JP)

(73) Assignees: Sanyo Electric Co., Ltd., Osaka (JP); Pioneer Corporation, Tokyo (JP); Hitachi, Ltd., Tokyo (JP); Phoenix Technologies K.K., Tokyo (JP); Fujitsu Limited, Kanagawa (JP)

( * ) Notice: Subject to any disclaimer, the term of this patent is extended or adjusted under 35 U.S.C. 154(b) by 878 days.

(21) Appl. No.: 10/522,176

(22) PCT Filed: Jul. 24, 2003

(86) PCT No.: PCT/JP03/09414

§ 371 (c)(1),
(2), (4) Date: Jan. 24, 2005

(87) PCT Pub. No.: WO2004/012085

PCT Pub. Date: Feb. 5, 2004

(65) Prior Publication Data

US 2005/0289062 A1 Dec. 29, 2005

(30) Foreign Application Priority Data

Jul. 25, 2002 (JP) ............................. 2002-216750

(51) Int. Cl.
*G06F 7/00* (2006.01)

(52) U.S. Cl. ...................... 707/3; 707/1; 707/2; 707/7; 707/10; 707/200; 713/165

(58) Field of Classification Search ...................... None
See application file for complete search history.

(56) References Cited

U.S. PATENT DOCUMENTS 4,249,172 A 2/1981 Watkins et al.

(Continued)

FOREIGN PATENT DOCUMENTS

EP 1 237 324 A1 9/2002

(Continued)

OTHER PUBLICATIONS

Japanese Decision to Grant Patent, w/ English translation thereof, issued in Japanese Patent Application No. JP 2002-216750 dated Sep. 8, 2009.

(Continued)

*Primary Examiner*—Hung Q Pham
(74) *Attorney, Agent, or Firm*—McDermott Will & Emery LLP

(57) ABSTRACT

A data storage device includes a secure data storage portion including a log memory. The log memory is formed of a plurality of banks, and stores history information in the plurality of banks in a ring-like fashion. The plurality of banks are designated by addresses (0–(N–1)), respectively. Each of the items of the history information respectively stored in the banks includes a management number region, a license ID (LID) region, a Ks2x region, an ST1 region, an ST2 region, a KPcmy region and a LBA region.

8 Claims, 30 Drawing Sheets

U.S. PATENT DOCUMENTS

| | | |
|---|---|---|
| 5,828,821 A | 10/1998 | Hoshina et al. |
| 5,919,257 A | 7/1999 | Trostle |
| 5,953,685 A | 9/1999 | Bogin et al. |
| 5,956,735 A | 9/1999 | Clark et al. |
| 6,023,710 A * | 2/2000 | Steiner et al. ............... 707/204 |
| 6,034,832 A | 3/2000 | Ichimura et al. |
| 6,078,338 A | 6/2000 | Horan et al. |
| 6,477,530 B1 | 11/2002 | Omata et al. |
| 6,732,124 B1 * | 5/2004 | Koseki et al. ............... 707/202 |
| 6,789,203 B1 | 9/2004 | Belissent |
| 6,898,708 B2 | 5/2005 | Hori et al. |
| 6,952,737 B1 | 10/2005 | Coates et al. |
| 6,999,948 B1 | 2/2006 | Hatanaka et al. |
| 7,010,809 B2 | 3/2006 | Hori et al. |
| 7,134,026 B2 | 11/2006 | Horiuchi et al. |
| 7,181,629 B1 | 2/2007 | Hatanaka et al. |
| 7,185,013 B2 | 2/2007 | Burnett |
| 7,219,227 B2 | 5/2007 | Hori et al. |
| 7,222,153 B2 | 5/2007 | Ando et al. |
| 7,243,242 B2 | 7/2007 | Moriai |
| 7,305,558 B1 * | 12/2007 | Miyazaki et al. ............ 713/178 |
| 7,340,055 B2 | 3/2008 | Hori et al. |
| 2002/0034302 A1 | 3/2002 | Moriai et al. |
| 2002/0131594 A1 | 9/2002 | Hori et al. |
| 2002/0136405 A1 | 9/2002 | Hori |
| 2002/0138442 A1 | 9/2002 | Hori et al. |
| 2002/0138733 A1 | 9/2002 | Ishibashi et al. |
| 2002/0176580 A1 | 11/2002 | Horiuchi et al. |
| 2002/0183985 A1 | 12/2002 | Hori et al. |
| 2002/0184154 A1 | 12/2002 | Hori et al. |
| 2002/0184492 A1 | 12/2002 | Hori et al. |
| 2002/0191764 A1 | 12/2002 | Hori et al. |
| 2003/0009667 A1 | 1/2003 | Horiuchi et al. |
| 2003/0116969 A1 | 6/2003 | Skinner et al. |
| 2003/0161064 A1 | 8/2003 | Hori et al. |
| 2003/0200458 A1 | 10/2003 | Hori et al. |
| 2004/0010467 A1 | 1/2004 | Hori et al. |
| 2004/0088510 A1 | 5/2004 | Hori |
| 2004/0179691 A1 | 9/2004 | Hori et al. |
| 2005/0076208 A1 | 4/2005 | Hori et al. |
| 2005/0120232 A1 | 6/2005 | Hori et al. |
| 2006/0116969 A1 | 6/2006 | Hatanaka et al. |

FOREIGN PATENT DOCUMENTS

| | | |
|---|---|---|
| JP | 03-231337 A | 10/1991 |
| JP | 5-46359 A | 2/1993 |
| JP | 6-202926 A | 7/1994 |
| JP | 9-69082 | 3/1997 |
| JP | 9-74549 | 3/1997 |
| JP | 10-003745 | 1/1998 |
| JP | 10-240629 | 9/1998 |
| JP | 10-283229 A | 10/1998 |
| JP | 11-39450 A | 2/1999 |
| JP | 11-120057 | 4/1999 |
| JP | 11-328982 | 11/1999 |
| JP | 2001-036523 A | 2/2001 |
| JP | 2001-051889 | 2/2001 |
| JP | 2001-147864 | 5/2001 |
| JP | 2001-197292 A | 7/2001 |
| JP | 2001-230768 | 8/2001 |
| JP | 2001-249836 A | 9/2001 |
| JP | 2001-249855 | 9/2001 |
| JP | 2001-337600 | 12/2001 |
| JP | 2002-7263 A | 1/2002 |
| JP | 2002-026890 | 1/2002 |
| JP | 2002-164881 A | 6/2002 |
| JP | 2002-189648 A | 7/2002 |
| JP | 2003-248557 A | 9/2003 |
| WO | WO 00/08909 | 2/2000 |
| WO | WO 01/41356 A1 | 6/2001 |
| WO | WO 01/69842 A1 | 9/2001 |
| WO | WO 01/069842 A1 | 9/2001 |
| WO | WO 02/075550 A1 | 9/2002 |

OTHER PUBLICATIONS

Japanese Office Action, with English Translation, issued in Japanese Patent Application No. JP 2002-216750, dated Jul. 29, 2008.

* cited by examiner

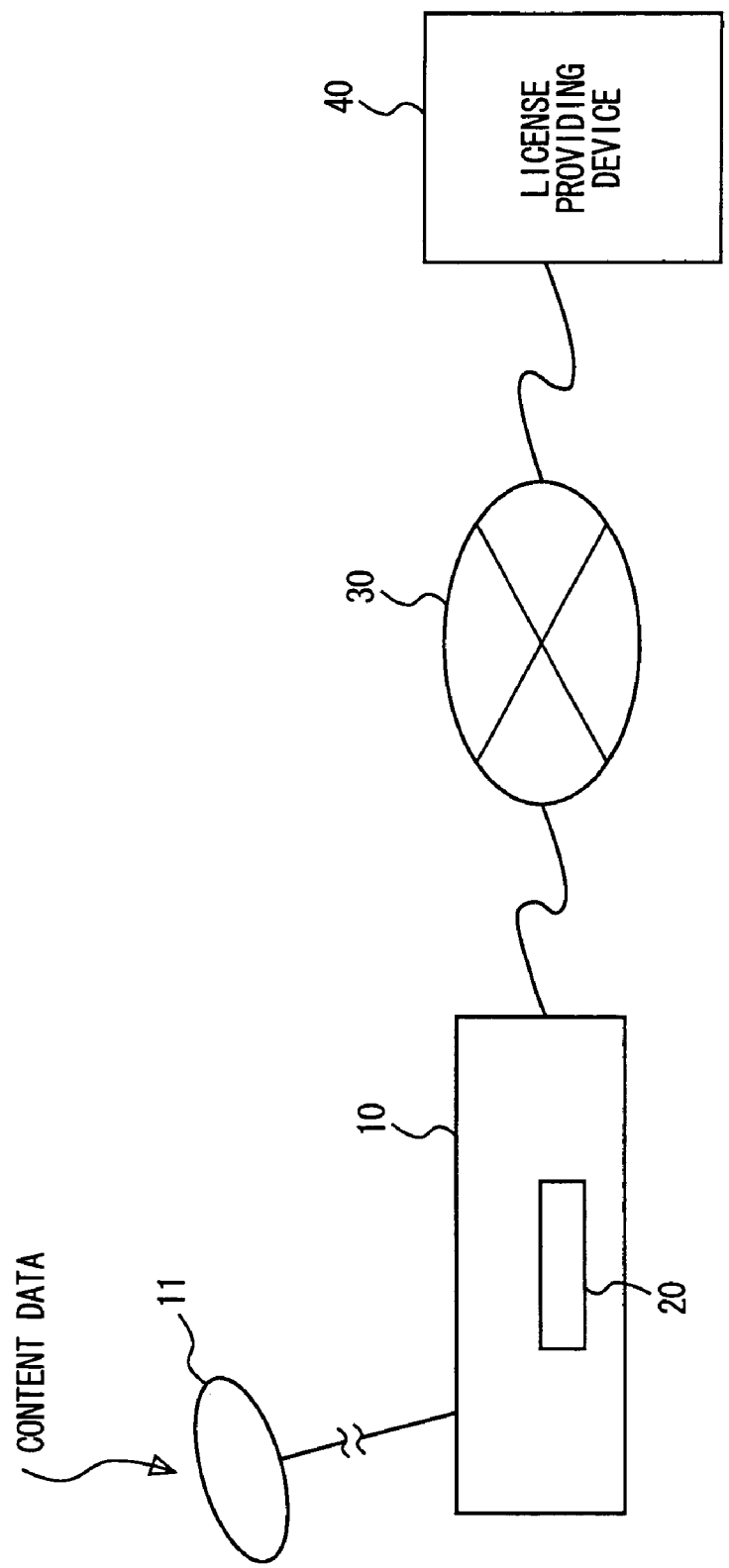

F I G. 2

| SYMBOL | NAME | ATTRIBUTE | CHARACTERISTICS |
|---|---|---|---|
| Dc | DATA | PECULIAR TO DATA | EX.: MUSIC, READING, EDUCATIONAL OR IMAGE DATA, RECORDED AND MANAGED AS ENCRYPTED CONTENT DATA E(Kc,Dc) ENCRYPTED WITH Kc |
| Di | DATA INFORMATION | PECULIAR TO DATA | PLAINTEXT DATA RELATED TO Dc AND INCLUDING DID |
| DID | DATA ID | PECULIAR TO DATA | MANAGEMENT CODE FOR SPECIFYING Dc AND Kc |
| Kc | CONTENT KEY | PECULIAR TO DATA | SYMMETRIC KEY ENCRYPTING/DECRYPTING ENCRYPTED DATA |
| AC | CONTROL INFORMATION | PECULIAR TO LICENSE | RESTRICTIONS RELATED TO REPRODUCTION AND LICENSE HANDLING |
| LID | LICENSE ID | PECULIAR TO LICENSE | MANAGEMENT CODE FOR SPECIFYING LICENSE |
| LIC | LICENSE | PECULIAR TO LICENSE | GENERALLY REPRESENTING Kc//AC//DID//LID |

FIG. 3

| | SYMBOL | NAME | CHARACTERISTIC |
|---|---|---|---|
| LICENSE PROVIDING DEVICE | KPa | CERTIFICATION KEY | PUBLIC DECRYPTION KEY FOR VERIFYING CERTIFICATE BY CERTIFICATION AUTHORITY OPERATED BY LICENSE PROVIDER SIDE |
| | Ks1x | SESSION KEY | TEMPORARY KEY PRODUCED FOR EVERY LICENSE DISTRIBUTION SYMMETRIC KEY |
| DATA STORAGE DEVICE (HARD DISK) | Ka | MASTER KEY | PRIVATE ENCRYPTION KEY TO BE USED FOR PRODUCING CLASS CERTIFICATE OPERATED BY CERTIFICATION AUTHORITY |
| | KPa | CERTIFICATION KEY | PUBLIC DECRYPTION KEY FOR VERIFYING CERTIFICATE BY CERTIFICATION AUTHORITY OPERATED BY LICENSE PROVIDER SIDE |
| | KPcmy | CLASS PUBLIC KEY | ENCRYPTION KEY ASSIGNED TO CLASS (UNIT SUCH AS TYPE) OF DEVICE "y" IS IDENTIFIER IDENTIFYING CLASS |
| | Kcmy | CLASS PRIVATE KEY | ASYMMETRIC DECRYPTION KEY DECRYPTING DATA ENCRYPTED WITH CLASS PUBLIC KEY KPcmy |
| | Icmy | CLASS INFORMATION | INFORMATION DATA OF DEVICE AND CLASS PUBLIC KEY IN EACH CLASS |
| | Cmy | CLASS CERTIFICATE | Cmy=KPcmy//Icmy//E(Ka,H(KPcmy//Icmy)) CORRECTNESS IS VERIFIED WITH CERTIFICATION KEY KPa |
| | KPomz | INDIVIDUAL PUBLIC KEY | INDIVIDUAL PUBLIC ENCRYPTION KEY HAVING VALUE PECULIAR TO EACH DATA STORAGE DEVICE "z" IS IDENTIFIER IDENTIFYING DATA STORAGE DEVICE |
| | Komz | INDIVIDUAL PRIVATE KEY | ASYMMETRIC DECRYPTION KEY DECRYPTING DATA ENCRYPTED WITH INDIVIDUAL PUBLIC KEY KPomz |
| | Ks1x | SESSION KEY | TEMPORARY KEY PRODUCED BY LICENSE PROVIDER SIDE FOR EVERY LICENSE TRANSMISSION SYMMETRIC KEY |
| | Ks2x | SESSION KEY | TEMPORARY KEY PRODUCED BY LICENSE RECEIVER SIDE FOR EVERY LICENSE TRANSMISSION SYMMETRIC KEY |
| REPRODUCING CIRCUIT | KPcpy | CLASS PUBLIC KEY | ENCRYPTION KEY ASSIGNED TO CLASS (UNIT SUCH AS TYPE) OF DEVICE "y" IS IDENTIFIER IDENTIFYING CLASS |
| | Kcpy | CLASS PRIVATE KEY | ASYMMETRIC DECRYPTION KEY DECRYPTING DATA ENCRYPTED WITH CLASS PUBLIC KEY KPcpy |
| | Icpy | CLASS INFORMATION | INFORMATION DATA OF DEVICE AND CLASS PUBLIC KEY IN EACH CLASS |
| | Cpy | CLASS CERTIFICATE | Cpy=KPcpy//Icpy//E(Ka,H(KPcpy//Icpy)) CORRECTNESS IS VERIFIED WITH CERTIFICATION KEY KPa |
| | Ks2x | SESSION KEY | TEMPORARY KEY PRODUCED BY LICENSE RECEIVER SIDE FOR EVERY LICENSE TRANSMISSION SYMMETRIC KEY |

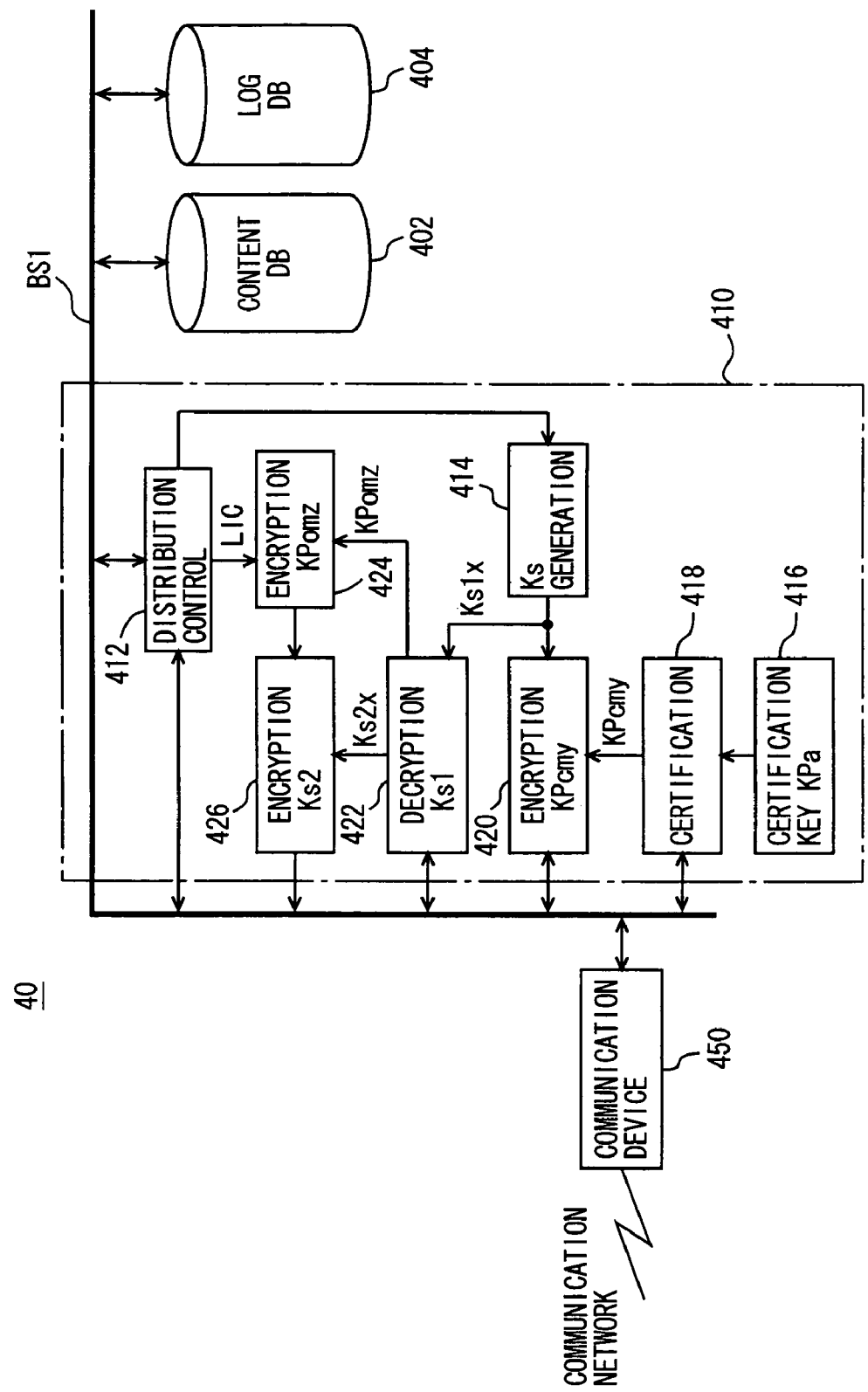

F I G. 8
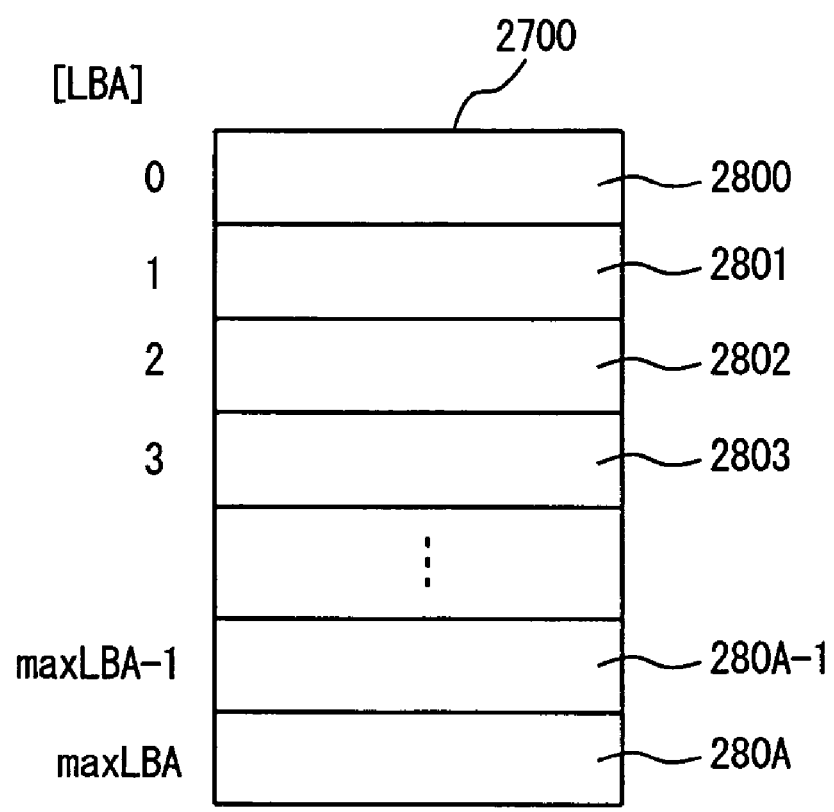

DATA STORAGE DEVICE CAPABLE OF STORING MULTIPLE SETS OF HISTORY INFORMATION ON INPUT/OUTPUT PROCESSING OF SECURITY DATA WITHOUT DUPLICATION

TECHNICAL FIELD

The present invention relates to a data storage device capable of read and write processing of classified data with safety, and particularly to a data storage device, which stores a license for decrypting and reproducing encrypted data obtained by a data distribution system enabling copyright protection, allows multi-access, and particularly can ensure copyright protection of copied information.

BACKGROUND ART

Owing to progress in digital information communication networks and others such as the Internet in recent years, users can now easily access network information through individual-oriented terminals using cellular phones or the like.

In such a digital information communication network, information is transmitted by digital signals. Even when an individual user copies music or video data transmitted via the aforementioned information communication network, it is now possible to obtain copied data without substantially degrading audio and/or image qualities.

Therefore, the right of the copyright owner may be significantly infringed unless appropriate measures are taken for copyright protection when a copyrighted content such as music data or image data is transmitted over the digital information communication network.

However, if copyright protection is given top priority, it may become impossible to distribute content data over the fast-growing digital information communication network. This impairs an interest of the copyright owner, who can essentially collect predetermined copyright royalties for copies of the copyrighted data.

In the above case, it is necessary to inhibit unauthorized further copying of the content data such as copyrighted music data or image data, which was once transmitted to the public over the digital information communication network.

Such a data distribution system has been proposed that a distribution server holding the encrypted content data distributes the encrypted content data to memory cards attached to terminal devices such as cellular phones via the terminal devices. In this data distribution system, a public encryption key of the memory card, which has been verified by a verification authority, and its certificate are transmitted to the distribution server when requesting the distribution of the encrypted content data. After the distribution server confirms the reception of the verified certificate, the encrypted content data and a license for decrypting the encrypted content data are transmitted to the memory card. The license includes a decryption key (which will be referred to as a "content Key" hereinafter) for decrypting the encrypted content data, a license ID for identifying the license, control information for restricting use of the license and others. When distributing the license to the memory card, the distribution server and the memory card generate produce keys, respectively, and the keys are exchanged between the distribution server and the memory card so that an encryption communication path is formed, and the distribution server transmits the license to the memory card via the encryption communication path thus formed. In this operation, the memory card stores the received encrypted content data and the license in an internal memory.

When the encrypted content data stored in the memory card is to be reproduced, the memory card is attached to the cellular phone. In addition to an ordinary speech communication function of the telephone, the cellular phone has a dedicated circuit, which reads out the encrypted content data and the content key from the memory card, decrypts the encrypted content data and reproduces it for external output. For reading the license Key, an encryption communication path is formed between the memory card and the dedicated circuit, and the license Key is transmitted from the memory card to the dedicated circuit via the encryption communication path.

The memory card has a function of shifting or copying the license with respect to another memory card. In this case, the license is transmitted similarly to the case of transmission of the license from the distribution server so that the encryption communication path is formed by functions of both the memory cards on the transmission side and the reception side, and the license is transmitted from the memory card on the transmission side to the memory card on the reception side. The license contains the control information determining whether the license is to be shifted or copied.

The memory card further has a function of performing the following operation. When the license is lost due to accidental interruption of the transmitting or receiving operation, this operation can be resumed, and the last history information relating to input/output of the license is recorded for preventing double transmission of the license, and can be output when necessary. The distribution server or the memory card on the transmission side obtains the history information from the memory card on the reception side, and determines the resuming of the transmission/reception of the license according to this history information. The history information includes the license ID and the status information indicating the transmission and reception.

As described above, the user of the cellular phone receives the encrypted content data and license from the distribution server over the cellular phone network, and stores them in the memory card. Then, the user can reproduce the encrypted content data stored in the memory card, or can shift it to another memory card. Also, the right of the copyright owner can be protected.

However, the conventional memory card holds only the last history information, and the history information relating to the last interruption will be lost when transmission or reception of another license is performed after the interruption. In connection with this, the plurality of items of history information may be stored for improving convenience of the user.

As speeds of access to storage elements and capacities of storage elements have been increasing, it can be presumed that a request for parallel execution of transmission/reception of multiple licenses will occur. For such case, it is necessary to store history information relating at least to the processing performed in parallel.

If the memory card is configured to store the plurality of items of history information for the above purpose, a license received by the memory card may be shifted to another memory card. This causes a problem that history information having different statuses are stored corresponding to the same license ID.

DISCLOSURE OF THE INVENTION

Accordingly, an object of the invention is to provide a data storage device, which can protect a copyright in connection with a license, and can store a plurality of items of history information without overlap for allowing resumption of transmission/reception of the license.

The invention is not restricted to the license for content data, and can be widely applied to various classified data to be kept under confidentiality.

According to the invention, therefore, a data storage device for performing input/output of classified data in accordance with a constant procedure, storing the classified data, and operating to store history information or update at appropriate times the history information in accordance with the constant procedure, includes an interface performing external input/output of data, a data storage portion storing the plurality of classified data, a log storage portion storing a plurality of items of the history information relating to the input/output of the classified data, and a control portion controlling the input/output of the classified data. The log storage portion is provided as a ring buffer circulatively utilizing two or more regions each storing one item of the history information. Each of the plurality of items of the history information stored in the log storage portion includes identification information identifying the classified data storing the history information and being to be input/output. The control portion receives the identification information identifying the classified data to be input/output in accordance with start of input/output processing of the classified data, searches a plurality of regions in the log storage portion in a predetermined order, determines the region storing the earliest item of the history information stored in the log storage portion as the earliest region, and newly stores the history information relating to the input/output processing of the classified data including the received identification information in the determined earliest region.

Preferably, in history information output processing of outputting a part or the whole of the history information in response to an output request for the history information, the control portion receives via the interface the identification information of the classified data to be input/output, searches the plurality of regions in the log storage portion in accordance with a predetermined sequence, determines the earliest region as well as the region storing the latest history information including the received identification information as the latest region, and outputs a part or the whole of the history information stored in the latest region via the interface.

Preferably, in the input processing of the classified data including outputting of the history information, the control portion receives the identification information of the classified data to be input/output via the interface, searches the plurality of regions in the log storage portion in a predetermined sequence, determines the earliest region and the latest region storing the latest history information including the received identification information as the latest region, copies a part or the whole of the history information stored in the determined latest region into the determined earliest region to store the copied history information as new history information relating to the input processing of the classified data, and outputs a part or the whole of the history information stored in the determined earliest region via the interface.

Preferably, in re-output processing of the classified data including inputting of one additional item of the history information recorded in accordance with progress of the constant procedure by another device, the control portion receives the identification information of the classified data to be input/output and the one additional item of the history information via the interface, determines the earliest region and the latest region, and determines whether the classified data is to output or not, based on the history information stored in the determined earliest region and the received one additional item of the history information.

Preferably, in the output processing of the classified data including inputting of one additional item of the history information recorded in accordance with progress of the constant procedure by another device, the control portion receives the identification information of the classified data to be input/output and the one additional item of the history information via the interface, determines the earliest region and the latest region, copies a part or the whole of the history information stored in the determined latest region into the determined earliest region to store the copied history information as the new history information relating to the output processing of the classified data, and determines whether the classified data is to output or not, based on the history information stored in the determined earliest region and the received one additional item of the history information.

Preferably, after the earliest region is determined, the control portion updates at appropriate times the history information stored in the determined earliest region in accordance with progress of the constant procedure before end or interruption of the constant procedure in the input/output processing.

Preferably, each of the plurality of items of the history information further includes a management number for identifying the sequence stored in the log storage portion, and the earliest region storing the earliest information is detected based on the management numbers respectively included in the two items of the history information stored in the two regions arranged continuously in the log storage portion.

Preferably, the log storage portion is in a ring buffer circulatively utilizing regions of N (N is a natural number larger than one) in number, and the management number is formed of a residue system of M (M is a natural number satisfying (N<M)).

Preferably, the control portion obtains each of the management numbers respectively included in the two items of the history information store in the two regions arranged continuously in the log storage portion, determines whether the two items of the history information including the two management numbers are stored continuously or not, based on a difference between the obtained two management numbers, and detects the following region between the two continuous regions as the earliest region when the two items of the history information are discontinuously stored.

According to the invention, therefore, the device can protect the classified data, and can store the plurality of items of the history information relating to the input/output processing of the classified data without overlap for outputting or referring to them.

BRIEF DESCRIPTION OF THE DRAWINGS

FIG. 1 is a schematic view showing a concept of a data distribution system.

FIG. 2 illustrates characteristics of data, information and others transmitted and received in the data distribution system shown in FIG. 1.

FIG. 3 illustrates characteristics of keys, information and others used for cypher communication used in the data distribution system shown in FIG. 1.

FIG. 4 is a schematic block diagram showing a structure of a license providing device shown in FIG. 1.

FIG. 8 shows a structure of a normal data storage portion in the hard disk shown in FIG. 6.

BEST MODES FOR CARRYING OUT THE INVENTION

Figure 5:
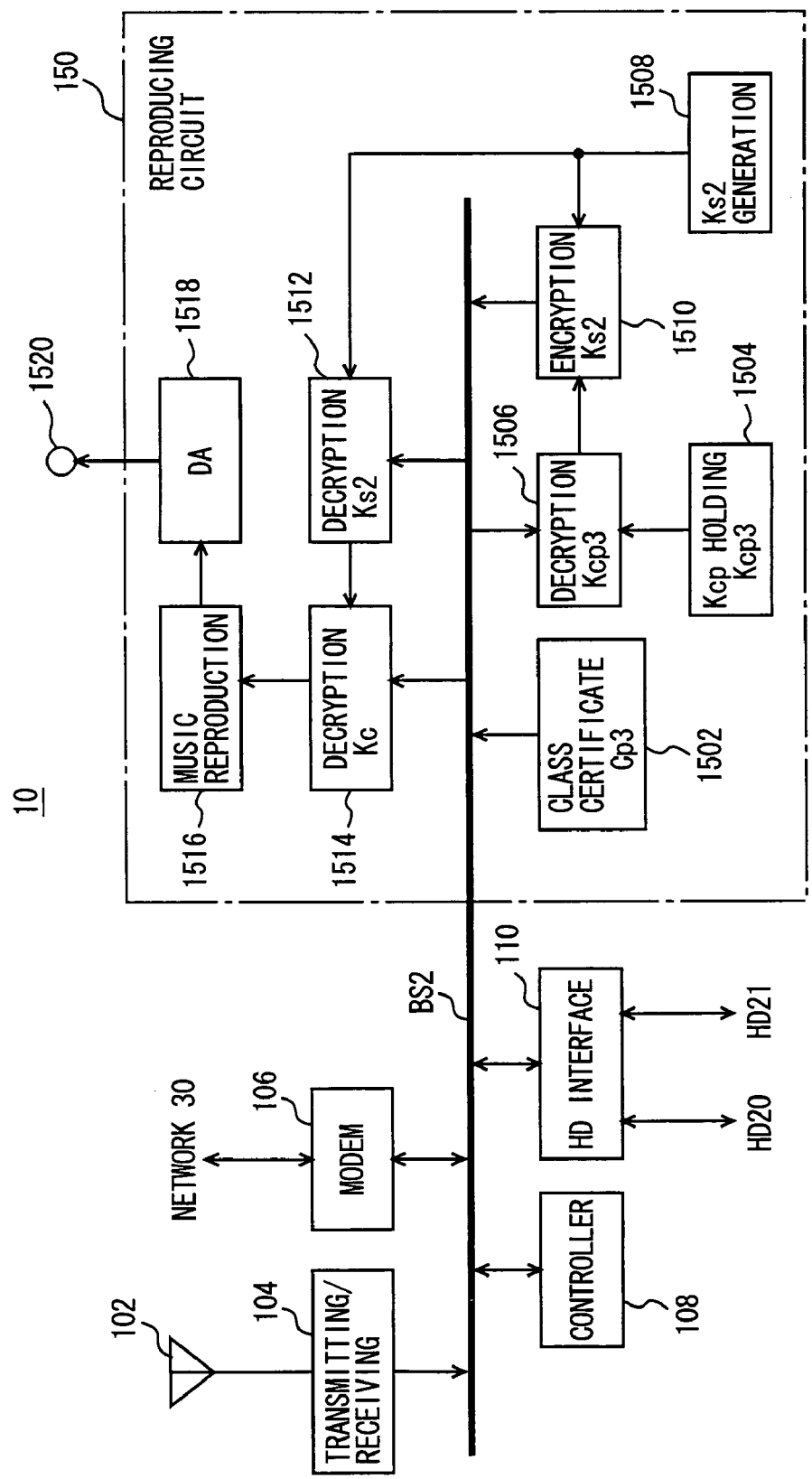
FIG. 5 is a schematic block diagram showing a structure of a terminal device shown in FIG. 1.

Embodiments of the invention will now be described with reference to the drawings. The same or similar parts or portions bear the same reference numbers in the figures, and description thereof is not repeated.

First Embodiment

FIG. 1 is a schematic view showing a concept of a whole structure of a data distribution system, in which a data storage device according to the invention obtains encrypted content data and licenses for decrypting the encrypted content data.

The following description will be given by way of example on a structure of the data distribution system, in which a terminal device 10 receives picture data distributed over a digital broadcasting network, and stores it in a data storage device, i.e., hard disk drive 20 attached to terminal device 10. Also, terminal device 10 receives a license for decrypting the encrypted picture data from a license providing device 40 connected to terminal device 10 over bidirectional network 30, and stores it on hard disk drive 20 for reproducing the encrypted picture data by a dedicated reproduction circuit (not shown) arranged inside terminal device 10. As will be apparent from the following description, the invention is not restricted to the above case, and can be applied to cases, in which a system handles other kinds of copyrighted materials such as content data, image data, music data, educational data, reading or recitation data, book data or program of game. Likewise, the data storage device is not restricted to the hard disk, and may be another data storage device such as a memory card.

Referring to FIG. 1, terminal device 10 receives encrypted picture data, which is distributed over the digital broadcasting network and may also be referred to as "content data" hereinafter, via an antenna 11, and stores it on hard disk 20. License providing device 40, which manages and distributes the license including a content key for decrypting encrypted content data, performs verification processing to determine whether hard disk 20 attached to terminal device 10 accessing thereto for requesting distribution of the license has a valid verification data or not, and thus whether hard disk 20 is a regular data storage device provided with the license managing function or not. Only when hard disk 20 is the regular data storage device, license providing device 40 transmits the license, which is encrypted in a predetermined encryption manner to allow decryption only on hard disk 20, to terminal device 10. When terminal device 10 receives the encrypted license from a modem connected to network 30, it transmits the encrypted license to hard disk 20 attached thereto.

For example, hard disk 20 in FIG. 1 is removable from terminal device 10. Hard disk 20 attached to terminal device 10 receives the encrypted license received by terminal device 10, decrypts the license encrypted for protecting a copyright and store the license on hard disk 20. For reproducing the encrypted content data corresponding to the license, terminal device 10 is supplied with the content key included in the license and the encrypted content data.

A user of terminal device 10 can reproduce the content data, which can be decrypted with the content key in terminal device 10.

According to the above structure, the user of terminal device 10, which received and stored the encrypted content data, can receive the license, and thus can reproduce the content data only when the user uses hard disk 20, which has a license management function and includes regular verification data.

In the foregoing data distribution system, the provider of the encrypted content data is a broadcasting server of a digital broadcasting company or the like. However, it may be license providing device 40 managing the license, or may be a distribution server, which is connected over the Internet or another communication network, other than license providing device 40. Further, it may be a copy from another user. Thus, the encrypted content data itself may be transmitted from any transmission side, and may be received on any reception side. In summary, it is merely required to manage strictly the license allowing decryption of the encrypted content data, and thereby the copyright of the content data can be protected.

According to the embodiment of the invention, the provider of the license required for reproducing the encrypted content data verifies and checks the reception side in the processing of transmitting and receiving the license between hard disk 20, terminal device 10 and license providing device 40, and thereby prevents output of the license to an unauthorized device. When an abnormality or failure occurs during the transmission/reception processing of the license, the system prevents overlap or double presence of the license by determining or specifying the license required for reprocessing, and thereby can resume the abnormally interrupted transmission/reception processing while achieving the copyright protection of the content data. A structure of the system achieving such resumption and copyright protection will now be described.

FIG. 2 illustrates characteristics of data, information and others transmitted and received in the data distribution system shown in FIG. 1.

Data Dc is content data, and is a picture data in this example. Data Dc is encrypted into a form allowing decryption with a content key Kc. Encrypted content data E(Kc, Dc) encrypted into the form allowing decryption with content key Kc is distributed to users of terminal devices 10 by the digital broadcasting network while keeping this form.

In the following description, the expression "E(X, Y)" represents that data Y is encrypted into the form allowing decryption with a decryption key X. Together with data Dc, additional information Di is distributed as plaintext information relating, e.g., to copyright of the content data or server access.

A license ID (LID), which is a management code specifying the license distribution and each license, is transferred between license providing device 40 and hard disk 20 via terminal device 10. The license further includes a data ID (DID), which is a code for identifying data Dc and content key Kc, as well as control information AC, which relates to restrictions on handling of the license and reproduction in the data storage device, and more specifically relates to the number of licenses, function restrictions and others determined in accordance with designation by the user side.

Content key Kc, control information AC, DID and LID are collectively referred as a license LIC hereinafter. DID is identification information allocated to the pair of data Dc and content key Kc, and thus is identification information for identifying encrypted data E(Kc, Dc). In addition to license LIC, DID is also included in additional information Di, which is always handled together with encrypted data E(Kc, Dc) in a manner allowing reference to it.

FIG. 3 illustrates characteristics of data, information and others used for verification in the data distribution system shown in FIG. 1.

Reproduction circuits arranged in the data storage device such as hard disk 20 as well as terminal device 10 are provided with class public keys KPcmy and KPcpy peculiar to them, respectively. Class public keys KPcmy and KPcpy can be decrypted with a class private key Kcmy peculiar to the data storage device and a class private key Kcpy peculiar to the reproduction circuit, respectively. These class public keys and class private keys have values, which depend on the types of the reproduction circuit and the data storage device. These class public keys and class private keys are shared by a unit, which is referred to as a "class". A character "y" represents an identifier for identifying the class. The class depends on a manufacturer, a kind of the product, a production lot and others.

Cmy is employed as a class certificate of the data storage device. Cpy is employed as a class certificate of the reproduction circuit. These class certificates have information depending on the classes of the data storage device and the reproduction circuit.

The data storage device stores its class certificate Cmy in the form of KPcmy//Icmy//E(Ka, H(KPcmy//Icmy)) at the time of shipment. The reproduction circuit stores its class certificate Cpy in the form of KPcpy//Icpy//E(Ka, H(KPcpy//Icpy)) at the time of shipment. Expression of "X//Y" represents coupling between X and Y, and "H(X)" represents a hash value of data X calculated by the hash function. Master key Ka is a private encryption key used for preparing these class certificates. Master key Ka is shared by the whole data distribution system, and is safely managed and operated by a verification authority. Class information Icmy and Icpy are information data including information related to devices in each class and the class public key.

E(Ka, H(KPcmy//Icmy)) and E(Ka, H(KPcpy//Icpy)) are signed data prepared by affixing electronic signatures to KPcmy//Icmy and KPcpy//Icpy, respectively.

The verification authority is a public third organization preparing the signed data, and produces signed data E(Ka, H(KPcmy//Icmy)) and E(Ka, H(KPcpy//Icpy)).

As keys for safely and reliably transmitting license LIC to the data storage device, the system employs an individual public key KPomz set corresponding to each medium, i.e., each data storage device as well as individual private key Komz allowing decryption of the data encrypted with individual public key KPomz. The character "z" in these expressions is an identifier for individually identifying the data storage device.

Every time the data transmission is performed, the data distribution system uses session keys Ks1$x$ and Ks2$x$ produced by license providing device 40, the data storage device (hard disk 20) and terminal device 10.

Session keys Ks1$x$ and Ks2$x$ are individual symmetric keys generated for each "session", i.e., the unit of communication between license providing device 40, the data storage device (hard disk 20) and the reproduction circuit of terminal device 10, or the unit of access thereto. The "session" includes "distribution session" for distributing the license from license providing device 40 to the data storage device (hard disk 20), "copy/shift session" for copying or shifting the license between the data storage devices, and "usage permission session" for outputting the license from the data storage device (hard disk 20) to the reproduction circuit of terminal device 10.

Session keys Ks1$x$ and Ks2$x$ have values peculiar to each session so that these are managed by license providing device 40, the data storage device (hard disk 20) and the reproduction circuit of terminal device 10. More specifically, when the license is to be transmitted or received, session key Ks1$x$ is generated for each session by the transmission side of the license, and session key Ks2$x$ is generated for each session by the reception side of the license. The character "x" is an identifier for identifying a series of processing in the session. In each session, these session keys are mutually transmitted between the devices. Each device receives the session key produced by the other device, and performs the encryption with the received session key. Then, the device transmits license LIC or a part of license LIC including the content key so that the degree of security in the session can be improved.

FIG. 4 is a schematic block diagram showing a structure of license providing device 40 shown in FIG. 1.

License providing device 40 includes a content database (DB) 402 holding the licenses to be managed, a log database 404 storing and holding all communication records in the distribution session for distributing the license at appropriate times, a data processing portion 410 transmitting data to and from content database 402 and log database 404 via a bus BS1 and effecting predetermined processing on it, and a communication device 450 transmitting the data between terminal device 10 and data processing portion 410 over network 30.

Data processing portion 410 includes a distribution control portion 412 for controlling the operation of data processing portion 410 in accordance with the data on bus BS1, a session key generating portion 414 for generating session key Ks1x in the distribution session under control of distribution control portion 412, and a KPa holding portion 416 holding a verification key KPa of hard disk 20 for decrypting signed data E(Ka, H(KPcmy//Icmy)) included in class certificate Cmy of hard disk 20 transmitted from terminal device 10. Data processing portion 410 also includes a verification portion 418, which receives class certificate Cmy transmitted from hard disk 20 via communication device 450 and bus BS1, performs decryption processing on signed data E(Ka, H(KPcmy//Icmy)), which is included in class certificate Cmy, with verification key KPa received from KPa holding portion 416, performs calculation of the hash value of KPcmy//Icmy included in class certificate Cmy, and verifies class certificate Cmy by comparing and checking the results of the above decryption processing and calculation. Data processing portion 410 further includes an encryption processing portion 420 operating in each distribution session to encrypt session key Ks1x produced by session key generating portion 414 with class public key KPcmy extracted from class certificate Cmy by verification portion 418 and output it onto bus BS1, and a decryption processing portion 422 receiving and decrypting the data, which is encrypted with session key Ks1x and is transmitted via bus BS1.

Data processing portion 410 further includes an encryption processing portion 424 encrypting license LIC applied from distribution control portion 412 with individual public key KPomz, which is peculiar to the data storage device and is obtained from decryption processing portion 422, and an encryption processing portion 426, which further encrypts the output of encryption processing portion 424 with session key Ks2x applied from decryption processing portion 422, and provides it onto bus BS1.

Further, individual public key KPomz and session key Ks2x are provided from terminal device 10 after being encrypted with session key Ks1x. Decryption processing portion 422 decrypts them to obtain individual public key KPomz.

An operation of license providing device 40 in the distribution session will be described later in detail with reference to a flowchart.

FIG. 5 is a schematic block diagram showing a structure of terminal device 10 shown in FIG. 1.

Terminal device 10 includes an antenna 102 receiving a signal transmitted over the digital broadcasting network, a receiving portion 104, which operates to convert the signal received from antenna 102 into data by demodulating it, or operates to modulate data to be transmitted from antenna 102 and apply it to antenna 102, a modem 106 connecting terminal device 10 to network 30, a bus BS2 transmitting data between various portions in terminal device 10, a controller 108 controlling an operation of terminal device 10 via bus BS2, and a hard disk interface portion 110 controlling transmission of data between hard disk 20 and bus BS2.

Terminal device 10 further includes a verification data holding portion 1502 holding class certificate Cpy already described. It is assumed that an identifier y identifying the class of terminal device 10 is equal to three (y=3).

Terminal device 10 also includes a Kcp holding portion 1504 holding a class private key Kcp3, which is a decryption key peculiar to the class, and a decryption processing portion 1506, which decrypts the data received from bus BS2 with class private key Kcp3 to obtain session key Ks1x generated by hard disk 20.

Terminal device 10 further includes a session key generating portion 1508 generating a session key Ks2x, which is used for encrypting the data transmitted to and from hard disk 20, based on a random number or the like in the usage permission session of reproducing the content data stored on hard disk 20, an encryption processing portion 1510 operating in the operation of receiving content key Kc from hard disk 20 to encrypt session key Ks2x generated by session key generating portion 1508 with session key Ks1x obtained from decryption processing portion 1506, and provide it onto bus BS2, a decryption processing portion 1512 decrypting the data on bus BS2 with session key Ks2x, and providing content key Kc, a decryption processing portion 1514, which receives encrypted content data E(Kc, Dc) from bus BS2, and decrypts it with content key Kc transmitted from decryption processing portion 1512 to provide data Dc to a reproducing portion 1516, reproducing portion 1516 receiving the output of decryption processing portion 1514 and reproducing the contents, a D/A converter 1518 converting the output of reproducing portion 1516 from digital signals to analog signals, and a terminal 1520 for providing the output of D/A converter 1518 to an external output device (not shown) such as a display monitor.

In FIG. 5, a region surrounded by dotted line defines a reproduction circuit 150, which is a dedicated circuit for reproducing the picture data by decrypting the encrypted content data. For improving security, reproduction circuit 150 is preferably formed of a semiconductor device of one-chip structure. Further, it is preferable that reproduction circuit 150 is formed of an anti-tamper module effectively preventing analysis, which may be executed externally.

Operations in the respective sessions of various components of terminal device 10 will be described later in detail with reference to flowcharts.

Terminal device 10 described above has a function of receiving the encrypted content data, a function of receiving a distributed license and a function of reproducing encrypted content data when usage permission is given. However, these functions may be achieved by different devices, respectively, as is apparent from the fact that hard disk 20 is the data storage device removably attached terminal device 10. This can be easily achieved by attaching devices achieving the intended functions to hard disk 20.

Figure 6:
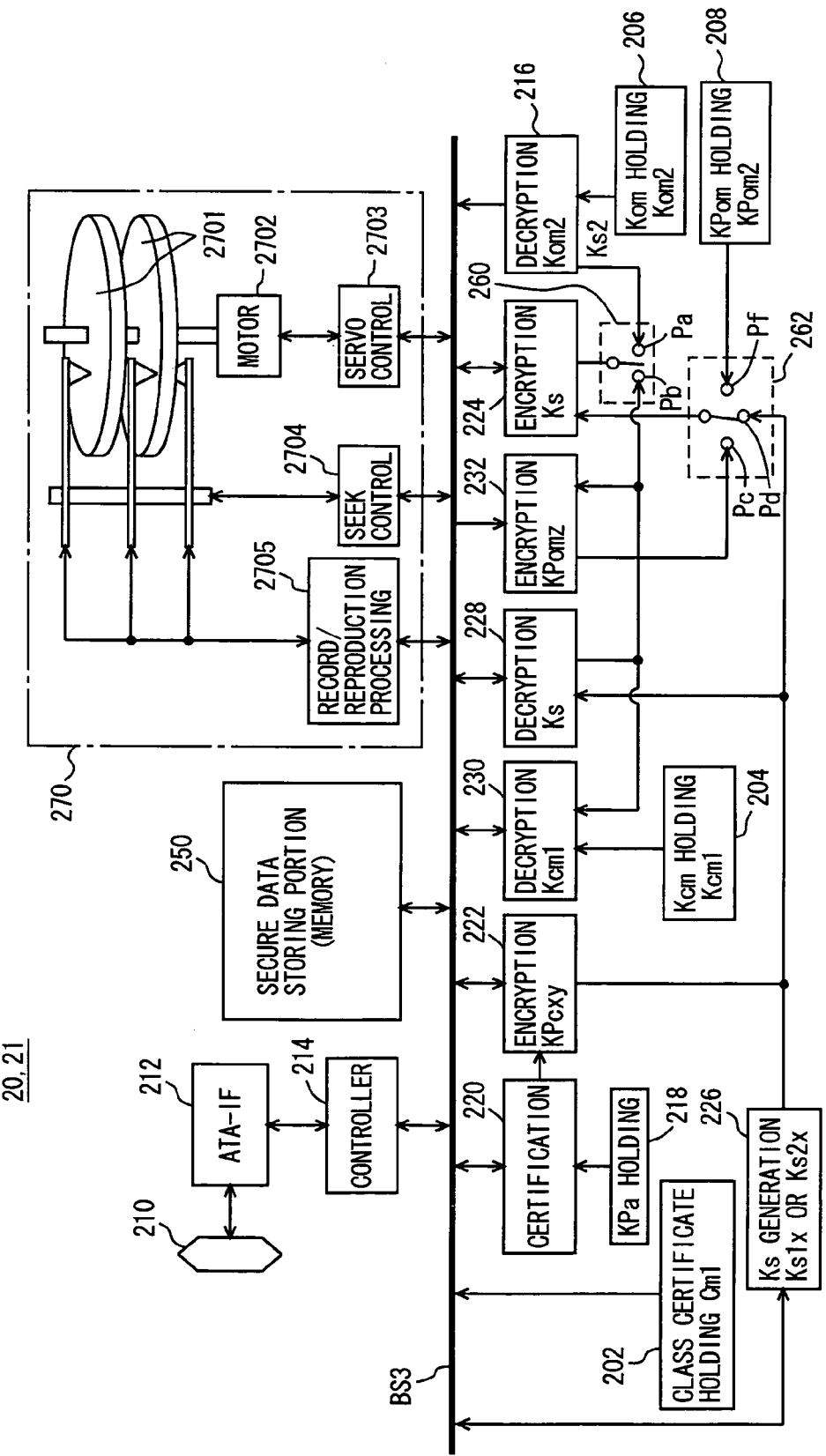
FIG. 6 is a schematic block diagram showing a structure of a hard disk attached to the terminal device shown in FIG. 1.

FIG. 6 is a schematic block diagram showing a structure of hard disk 20 shown in FIG. 1.

As already described, a pair of class public key KPcmy and class private key Kcmy as well as a pair of individual public key KPomz and individual private key Komz are employed for the data storage device, i.e., hard disk 20. In hard disk 20, identifier y identifying them is equal to 1, and identifier z is equal to 2 (z=2).

Hard disk 20 includes a verification data holding portion 202, which holds verification data KPcm1//Icm1//E(Ka, H(KPcm1//Icm1)) as class certificate Cm1, a Kcm holding portion 204 holding class private key Kcm1, a Kom holding portion 206 holding individual private key Kom2, and a KPom holding portion 208 holding individual public key KPom2 allowing decryption with individual private key Kom2.

As described above, owing to provision of the encryption key of the data storage device, i.e., hard disk 20, the distributed content data and the encrypted content key for each data storage device can be managed independently of those for the other data storage devices, as will be described below.

Hard disk 20 further includes an ATA (AT-Attachment) interface portion 212, which transmits signals via hard disk interface portion 110 of terminal device 10 and terminal 210, a bus BS3 serving as a data transmission path in hard disk 20, a decryption processing portion 216 decrypting the data, which is provided from ATA interface portion 212 via a controller 214 onto bus BS3, with individual private key Kom2 provided from Kom holding portion 206, and providing license LIC, which is distributed from license providing device 40, to a secure data storage portion 250, a verification portion 220, which receives verification key KPa from a KPa holding portion 218, and decrypts the data provided onto bus BS3 with verification key KPa to provide a result of the decryption to controller 214, and an encryption processing portion 224 encrypting the data, which is selectively applied via a selector switch 262, with session key Ks1$x$ or Ks2$x$ applied selectively by a selector switch 260, and providing it onto bus BS3.

Hard disk 20 further includes a session key generating portion 226 generating session keys Ks1$x$ and Ks2$x$ in each of the distribution, copy/shift and usage permission sessions, an encryption processing portion 222 encrypting session key Ks1$x$ generated by session key generating portion 226 with class public key KPcpy of reproduction circuit 150 of terminal device 10 obtained by verification portion 220 or with class public key KPcmy of another data storage device (which is a hard disk 21 in this example), and providing it onto bus BS3, and a decryption processing portion 228 receiving the data, which is encrypted with session key Ks2$x$ provided from bus BS3, and decrypting it with session key Ks1$x$ or Ks2$x$ obtained from session key generating portion 226.

Hard disk 20 further includes a decryption processing portion 230 decrypting the data on bus BS3 with class private key Kcm1 paired with class public key KPcm1, and an encryption processing portion 232, which encrypts license LIC with individual public key KPomz (z≠2) received from hard disk 21 on the reception side when license LIC is output for shifting or copying it from hard disk 20 to hard disk 21.

Hard disk 20 further includes a secure data storage portion 250 receiving license LIC for reproducing encrypted content data E(Kc, Dc) and the log, which is a record of processing of the sessions processed by hard disk 20, from bus BS3, and storing them. License LIC is stored in a license region of secure data storage portion 250, and the log is stored in a log memory of secure data storage portion 250. Secure data storage portion 250 is formed of, e.g., a semiconductor memory.

Figure 7:
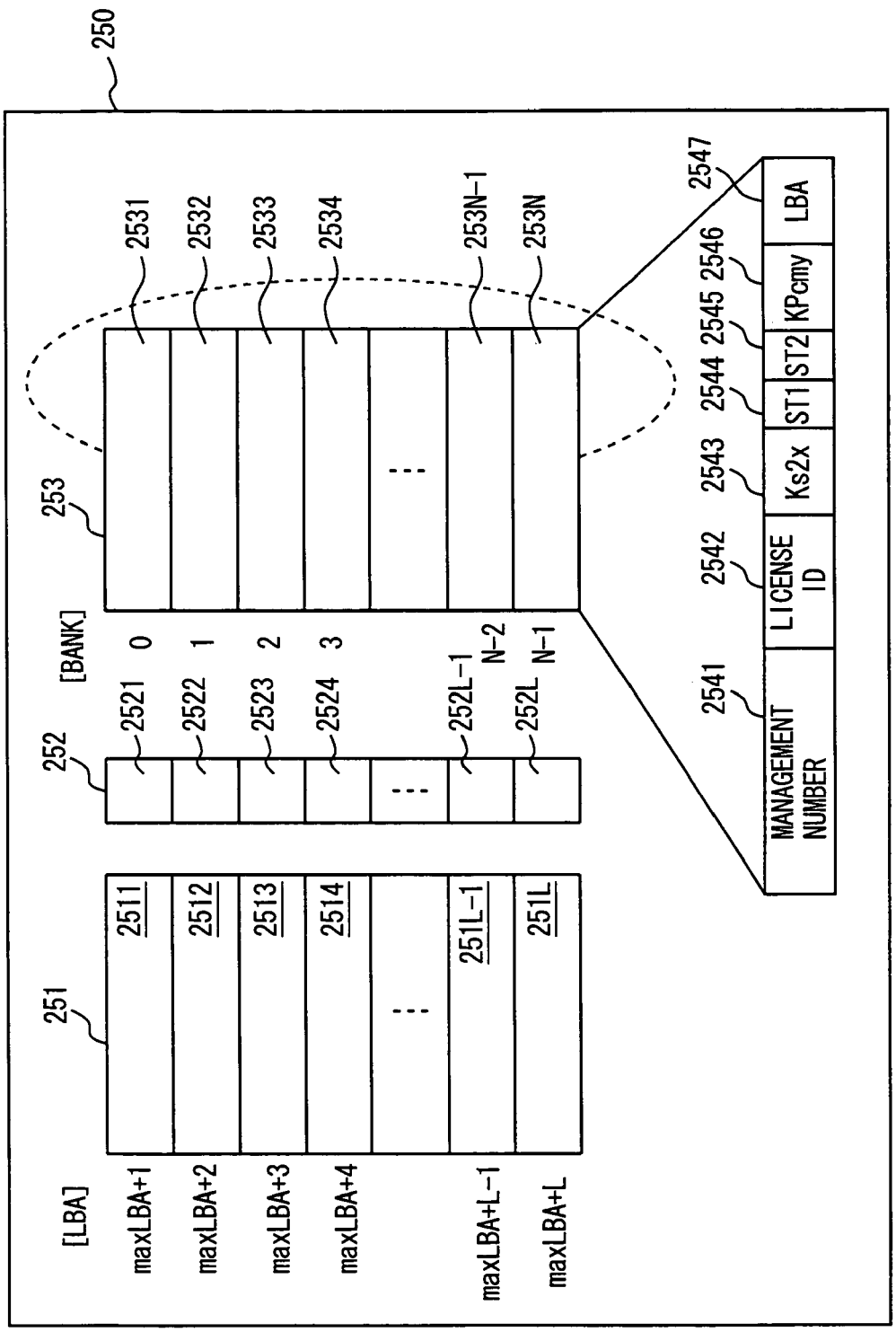
FIG. 7 shows a structure of a secure data storage portion in the hard disk shown in FIG. 6.

FIG. 7 shows a memory structure in secure data storage portion 250.

Referring to FIG. 7, secure data storage portion 250 includes a license region 251, a validity flag region 252 and a log memory 253.

License region 251 is formed of regions 2511-251L of L (L: natural number) in number, and stores one license (content key Kc, control information AC, license ID (LID) and data ID (DID)) in each of regions 2511-251L.

Each of the licenses stored in regions 2511-251L is managed according to an address, which will be referred to as a "LBA" or "logical block address", hereinafter. All the licenses LIC stored or read in the respective sessions are designated by the LBAs.

It is assumed that LBAs of maxLBA+1-maxLBA+L are assigned to regions 2511-251L, respectively. For example, LBA of maxLBA+3 designates license LIC stored in region 2513. In this state, LBAs of 0-maxLBA are assigned to normal data storage region 270, as will be described later in detail.

It is already stated that license region 251 has LBAs of maxLBA+1-maxLBA+L following LBAs of 0-maxLBA assigned to normal data storage region 270. However, this does not restrict the LBAs assigned to license region 251. The LBAs assigned to license region 251 may take some other values provided that LBAs of L in number assigned to license region 251 can designate regions 2511-251L, respectively. Also, the values of LBAs assigned to license region 251 may overlap the LBAs assigned to normal data storage region 270, or may be independent of those.

Validity flag region 252 is provided corresponding to the LBAs designating storage positions on secure data storage portion 250, and stores flags indicating validities of the license stored in positions designated by the corresponding LBAs.

Validity flag region 252 is formed of regions 2521-252L, which store "valid" or "invalid" of licenses LIC stored in corresponding regions 2511-251L, respectively.

When validity flag region 252 stores the flag of "valid", license LIC stored in the storage position on secure data storage portion 250, which is designated by the LBA corresponding to the flag, can be used, and the user can read content key Kc in this license LIC according to usage permission for decrypting the corresponding encrypted content data and reproducing the content data. Also, the user can shift or copy this license LIC to another data storage device.

When validity flag region 252 stores the flag of "invalid", license LIC stored in the storage position on secure data storage portion 250, which is designated by the LBA corresponding to the flag, cannot be used, and controller 214 of hard disk 20 rejects the license LIC provided from this LBA. This state is the same as the erased state. Therefore, the user cannot reproduce the content data corresponding to this license LIC. The flag in validity flag region 252 becomes "valid" in response to new storage of the license, and becomes "invalid" in response to shift of the license.

Log memory 253 is a ring memory formed of regions 2531-253N of N (N is a natural number) in number each storing one item of history information, which relates to input/output of the license to or from hard disk 20, and will be referred to as "log" hereinafter. Regions 2531-253N are named as banks 0-(N−1) for specifying the regions, respectively. Therefore, bank n (n is in a residue system of N) indicates region 253($n$−1) on the log memory.

Log memory 253 stores a plurality of logs in a ring-like fashion. More specifically, log memory 253 starts storing of the log from region 2531 specified by bank 0. After log memory 253 stores the log in region 253N specified by bank (N−1), log memory 253 returns the destination to region 2531 specified by bank 0 for storing the logs.

The log stored in each of regions 2531-253N in log memory 253 includes a management number region 2541, a license ID (LID) region 2542, a Ks2$x$ region 2543, an ST1 region 2544, an ST2 region 2545, a KPcmy region 2546 and an LBA region 2547.

Management number region 2541 stores management numbers representing a storage sequence, in which the logs are stored in banks 0-(N−1), respectively. The management numbers are in the residue system of M (M is a natural number larger than N(M>N)), and are assigned in ascending order. Owing to storage of the management numbers, it is possible to retrieve the banks storing the latest log or the earliest logs. More specifically, assuming that the log of the management number 1 is first stored in bank 0, the management number region 2541 of this log stores the management number "1". Every time a new log is stored in accordance with input/output of the licenses, the banks starting from bank 2 are successively used, and management number region 2541 of the new log stores the management number prepared by incrementing by one the management number stored in the management number region 2541 of the latest log, which is stored in the bank immediately preceding the bank storing the new log. Thereby, by reading the management numbers from the management number regions 2541 of the logs stored in regions 2531-253N, it is possible to determine based on the management numbers whether the log in question is new or old. This determination is performed as follows. When the continuous two banks n and n+1 (n is in a residue system of N) hold inconsecutive management numbers, bank n holds the latest log, and bank (n+1) holds the earliest log. This will be described later in detail.

In the following description of the expressions and arithmetic operations relating to the management numbers, the numbers of the banks designating regions 2531-253N of log memory 253 are in the residue system, unless otherwise specified.

License ID region 2542 stores license ID (LID) specifying license LIC to be a target of the session. Ks2x region 2543 stores session key Ks2x produced by the data storage device on the reception side of license LIC in the session.

ST1 region 2544 stores a status ST1 representing a state of processing in the session, which is being performed. ST2 region 2545 stores a status ST2 representing a storage state of the license corresponding to the license ID stored in license ID region 2542.

In the operation of outputting the license by shifting or copying, KPcmx region 2546 operates in the data storage device on the transmission side to store class public key KPcmx of the data storage device on the reception side. LBA region 2547 stores the LBA indicated for reading or storing license LIC in each session.

In accordance with progress of processing of a series of session, the data in the respective regions described above are updated or referred to. Status ST1 represents one of four statuses of "waiting for reception", "received", "waiting for transmission" and "transmitted", and status ST2 represents one of three statuses of "data present", "no data" and "shifted".

When the session is interrupted due to an unexpected failure occurred during the session, a storage state of license LIC, which is being transmitted or received in the interrupted session, is determined based on the license ID stored in license ID region 2541 of log memory 253 as well as the LBA stored in LBA region 2547, and status ST2 is updated according to a result of this determination. The transmission side of the license in the interrupted session receives license LIC, session key Ks2x and statuses ST1 and ST2, which are stored in log memory 253 on the license reception side, and checks the contents of the log recorded on the transmission side and received license LIC, session key Ks2x and statuses ST1 and ST2. Thereby, it is determined whether re-transmission of the license is allowed or not.

Session key Ks2x is stored for specifying each session, and the fact that session key Ks2x is shared represents that the designation of the license to be transmitted and the processing thereof are shared.

When the output log is output, a storage state of the license in secure data storage portion 250 is stored in status ST2 based on license ID (LID) and LBA stored in log memory 253, whereby the output log is materialized.

Details will be described later with reference to flowcharts illustrating the respective sessions.

Referring to FIG. 6 again, description will now be given on the data storage portion of hard disk 20. Hard disk 20 further includes normal data storage portion 270 storing the encrypted content data. Normal data storage portion 270 includes a disk-like magnetic record medium 2701 storing the data, an electric motor 2702 rotating magnetic record medium 2701, a servo-controller 2703 controlling motor 2702, a seek control portion 2704 controlling a position of a magnetic head on magnetic record medium 2701, and a record/reproduction processing portion 2705 instructing the magnetic head to record or reproduce the data.

Hard disk 20 further includes a controller 214 controlling the operations in hard disk 20 such as external transmission and reception of the data via ATA interface portion 212, determination relating to the output of license based on control information AC and management of secure data storage portion 250.

The structures except for normal data storage portion 270, ATA interface portion 212 and terminal 210 are formed in the anti-tamper module region.

Referring to FIG. 8, normal data storage portion 270 has the same structure as a known general hard disk, and includes a data storage portion 2700. Data storage portion 2700 stores the encrypted content data, data belonging to the encrypted content data, license table and others in each of regions 2800-280A (A is equal to maxLBA, which is a natural number). The LBAs of 0-maxLBA are assigned to regions 2800-280A so that regions 2800-280A can be designated by the LBAs of 0-maxLBA, respectively. Data such as encrypted content data are provided to or from designated regions 2800-280A.

The license table is an information table representing a relationship between the encrypted content data and the licenses. By referring to the license table, it is possible to specify the license corresponding to the encrypted content data and the LBA, where the license is stored. Accordingly, the contents of the license table are changed when the encrypted content data is stored or deleted, or when the license is stored, removed or deleted.

In hard disk 20, therefore, the data and license can be provided to or from normal data storage portion 270, which can be designated by the LBAs of 0-maxLBA, and secure data storage portion 250 (more specifically, license memory 251), which can be designated by the subsequent LBAs of maxLBA+1-maxLBA+L.

The values of LBAs in normal data storage region 270 and license region 251 are not restricted to the values in this embodiment.

Secure data storage portion 250 has an anti-tamper structure ensuring the anti-tamper properties ensured, e.g., by employing means for preventing direct access, which may be externally attempted via ATA interface portion 212 with an ordinary access command.

It has been stated that secure data storage portion 250 of hard disk 20 is entirely formed of the semiconductor memory. However, a part or the whole of secure data storage portion 250 may be configured to store data on magnetic record medium 2701 provided that the anti-tamper properties are ensured.

Operations in the respective sessions of the data distribution system shown in FIG. 1 will now be described.

[Distribution]

First, description will be given on the operation of distributing the license from license providing device 40 to hard disk 20 attached to terminal device 10 in the data distribution system shown in FIG. 1.

Figure 9:
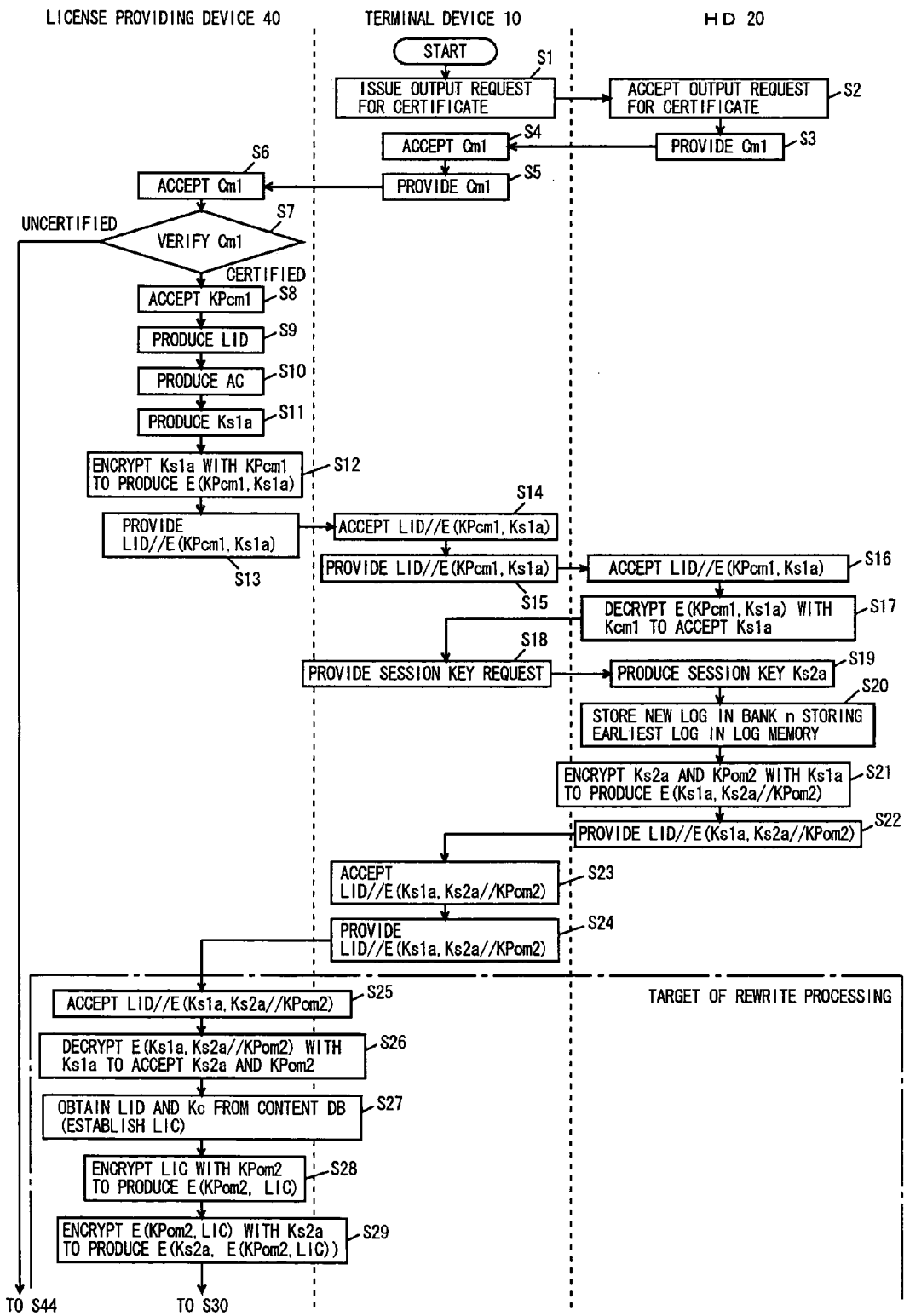
FIG. 9 is a first flowchart in the first embodiment for illustrating distribution processing in the data distribution system shown in FIG. 1.
Figure 10:
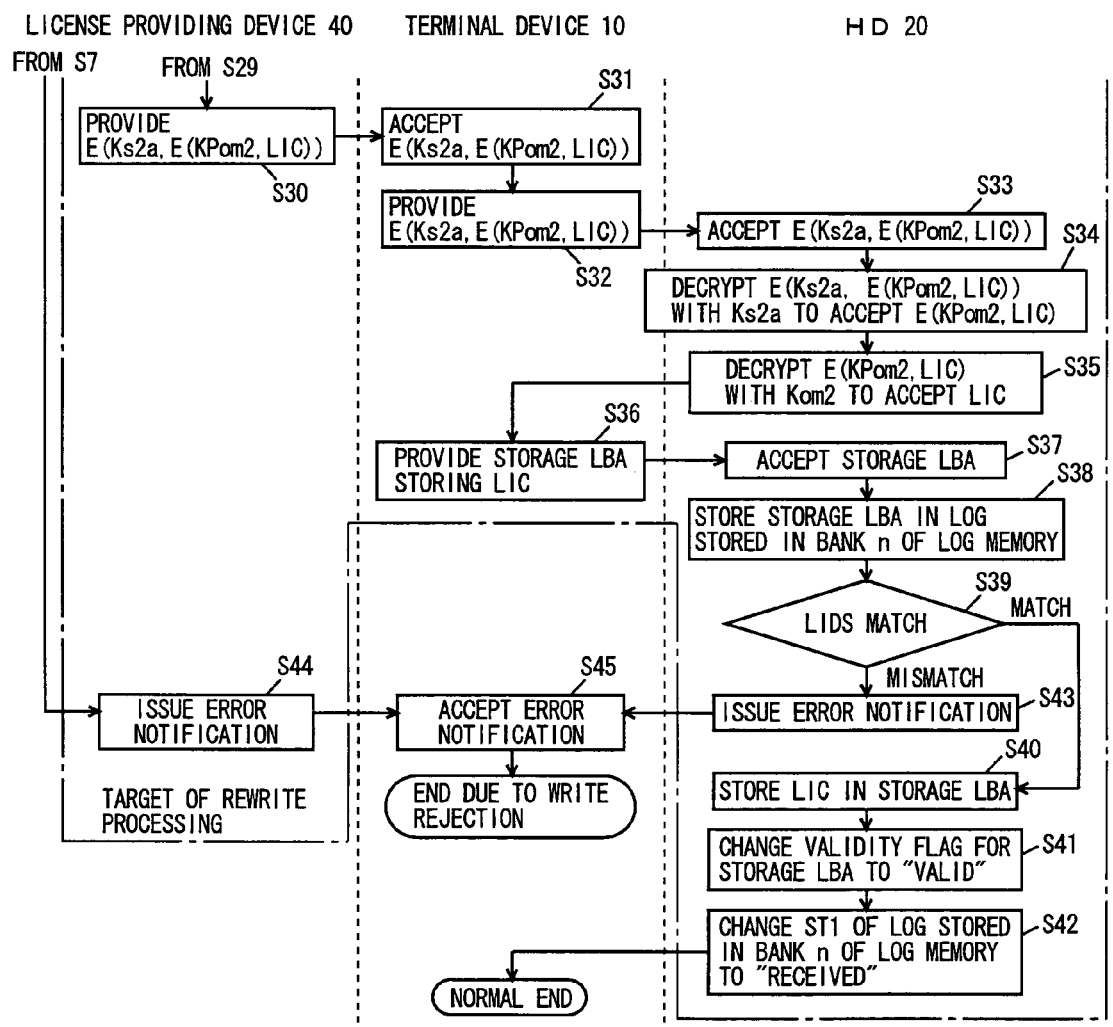
FIG. 10 is a second flowchart in the first embodiment for illustrating distribution processing in the data distribution system shown in FIG. 1.

FIGS. 9 and 10 are first and second flowcharts illustrating processing (distribution session) of the data distribution system shown in FIG. 1, respectively. More specifically, these flowcharts illustrate the processing, in which a user of terminal device 10 requests, via user's terminal device 10, the license distribution of the encrypted content data, and thereby the license is distributed from license providing device 40 to hard disk 20 attached to terminal device 10, and is stored on hard disk 20.

Before start of the processing in FIG. 9, the user of terminal device 10 connects terminal device 10 to network 30 via modem 106, and thereby connects terminal device 10 to license providing device 40 via network 30. The following description is based on the premise that the above operations are already performed.

Referring to FIG. 9, when the user of terminal device 10 requests the distribution of the license of intended content data, controller 108 of terminal device 10 provides an output request for the class certificate to hard disk 20 via bus BS2 and hard disk interface portion 110 (step S1). When controller 214 of hard disk 20 accepts the output request for the class certificate via terminal 210 and ATA interface portion 212 (step S2), it reads class certificate Cm1=KPcm1//Icm1//E(Ka, H(KPcm1//Icm1)) from verification data holding portion 202 via bus BS3, and provides class certificate Cm1 to terminal device 10 via ATA interface portion 212 and terminal 210 (step S3).

When controller 108 of terminal device 10 accepts class certificate Cm1 transmitted from hard disk 20 via hard disk interface portion 110 and bus BS2 (step S4), it transmits class certificate Cm1 thus accepted to license providing device 40 via modem 106 and network 30 (step S5).

When license providing device 40 receives class certificate Cm1 from terminal device 10 (step S6), it verifies whether received class certificate Cm1 is correct or not (step S7). The verifying processing is performed as follows.

When license providing device 40 accepts class certificate Cm1=KPcm1//Icm1//E(Ka, H(KPcm1//Icm1)), verification portion 418 decrypts signed data E(Ka, H(KPcm1//Icm1)), which is included in class certificate Cm1 provided from hard disk 20, with verification key KPa to extract hash value H(KPcm1//Icm1). Further, verification portion 418 calculates the hash value of KPcm1//Icm1 included in class certificate Cm1, and compares it with the hash value extracted from class certificate Cm1. When distribution control portion 412 determines, from the result of the decryption by verification portion 418, that the foregoing decryption was performed and the values of the two hash values matches each other, distribution control portion 412 certifies that class certificate Cm1 accepted from hard disk 20 is a correct certificate.

When class certificate Cm1 is certified in step S7, distribution control portion 412 accepts class public key KPcm1 (step S8). Next processing is performed in a step S9. When the class certificate is not certified, distribution control portion 412 does not accept class certificate Cm1, and provides an error notification to terminal device 10 (step S44 in FIG. 10). When terminal device 10 accepts the error notification (step S45 in FIG. 10), the distribution session ends.

When class public key KPcm1 is accepted in step S8, distribution control portion 412 produces license ID (LID) (step S9), and further produces control information AC (step S10). Session key generating portion 414 generates a session key Ks1a for distribution (step S11). Encryption processing portion 420 encrypts session key Ks1a with class public key KPcm1, which corresponds to hard disk 20 and is obtained by encryption processing portion 420, and thereby encrypted data E(KPcm1, Ks1a) is produced (step S12).

Distribution control portion 412 handles license ID (LID) and encrypted session key Ks1a as one data series LID//E(KPcm1, Ks1a), and provides it toward terminal device 10 via bus BS1 and communication device 450 (step S13).

When terminal device 10 receives LID//E(KPcm1, Ks1a) over network 30 (step S14), it provides received LID//E(KPcm1, Ks1a) to hard disk 20 (step S15). Controller 214 of hard disk 20 accepts LID//E(KPcm1, Ks1a) via terminal 210 and ATA interface portion 212 (step S16). Controller 214 provides accepted E(KPcm1, Ks1a) to decryption processing portion 230 via bus BS3. Decryption processing portion 230 performs the decryption processing with class private key Kcm1, which is peculiar to hard disk 20 and is held in Kcm holding portion 204, to obtain and accepts session key Ks1a (step S17).

When controller 214 of hard disk 20 confirms the acceptance of session key Ks1a produced by license providing device 40, it notifies terminal device 10 of this acceptance via ATA interface portion 212 and terminal 210. When controller 108 of terminal device 10 accepts, via hard disk interface portion 110 and bus BS2, the notification that hard disk 20 accepted session key Ks1a, it provides a notification, which requests production of the session key, to hard disk 20 via bus BS2 and hard disk interface portion 110 (step S18). When controller 214 of hard disk 20 accepts the notification of request for session key production via terminal 210 and ATA controller 212, controller 214 instructs session key generating portion 226 to generate a session key. Session key generating portion 226 generates a session key Ks2a (step S19).

Controller 214 retrieves the bank storing the earliest log in log memory 253 of secure data storage portion 250, and stores the new management number, the license ID accepted in step S16, session key Ks2a produced in step S19 and "waiting for reception" in management number region 2541, license ID region 2542, Ks2a region 2543 and ST1 region 2544 in the bank ($0 \leq n \leq N-1$) thus retrieved (step S20). Therefore, the log stored in the bank n becomes the latest log. In this state, all the contents of the other regions forming the log may be set to "0", or may be unchanged.

Figure 11:
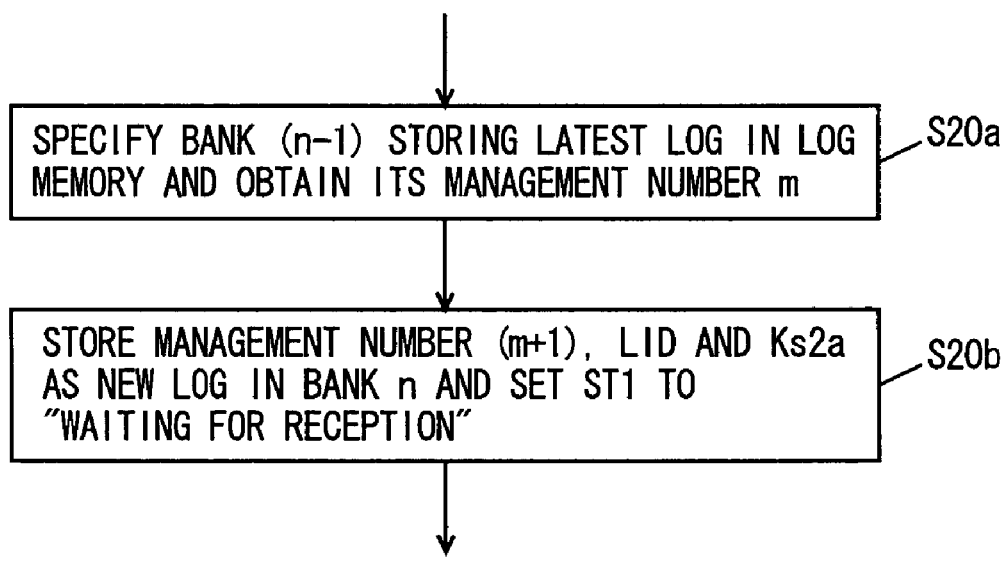
FIG. 11 is a flowchart for illustrating specific operations in a step S20 in FIG. 9.

Referring to FIG. 11, specific operations in step S20 will now be described. FIG. 11 is a flowchart illustrating specific operations in step S20. After step S19, controller 214 specifies bank (n−1), which corresponds to the log region storing the latest log, in log memory 253, and obtains management number m included in the history information, which is stored in the log region designated by bank (n−1) (step S20a).

Figure 12:
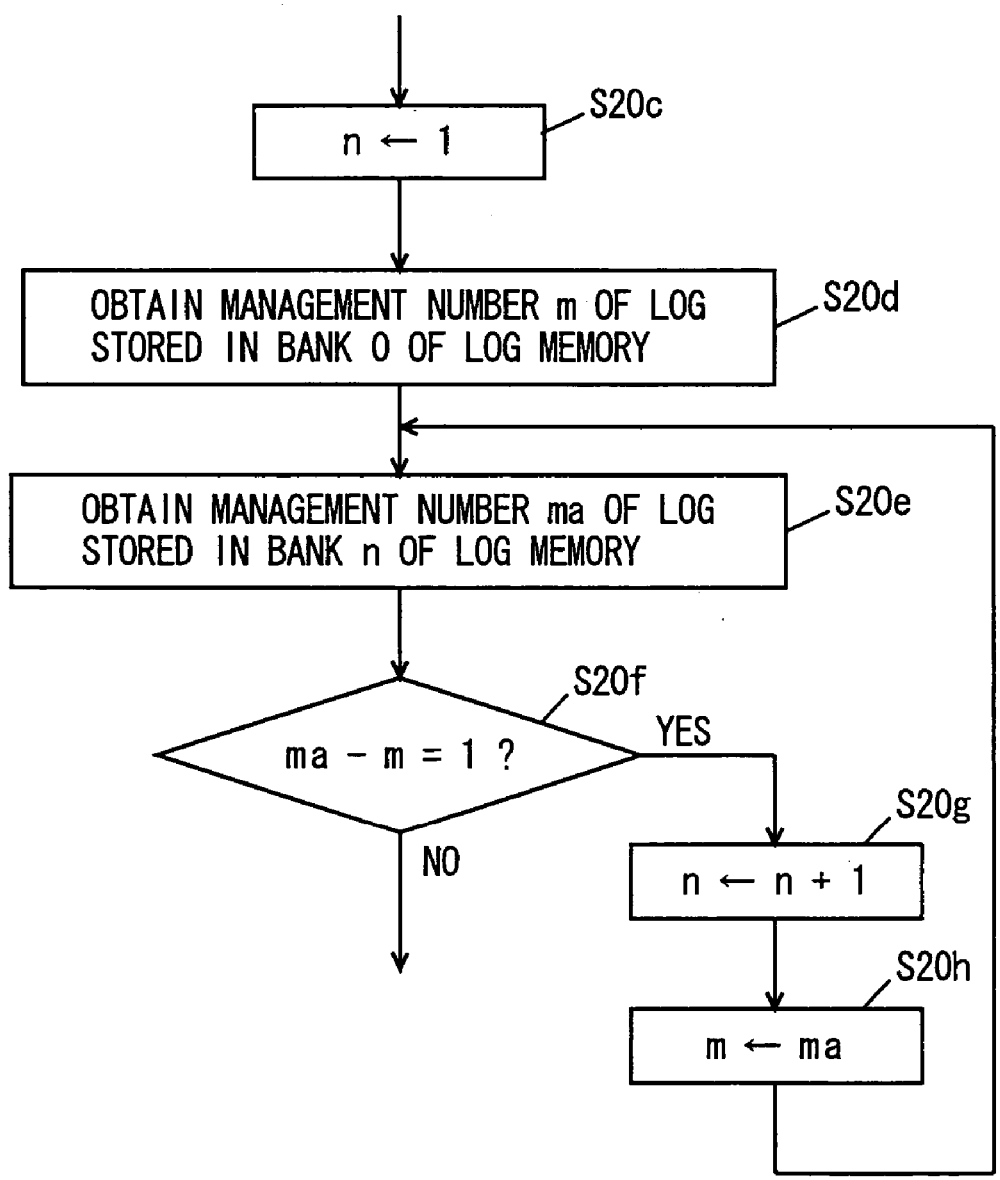
FIG. 12 is a flowchart for illustrating specific operations in a step S20a in FIG. 11.

Referring to FIG. 12, specific operations in step S20a will now be described. FIG. 12 is a flowchart illustrating step S20 further in detail. After step S19, controller 214 assigns a bank number 1 of bank 1 indicating region 2532 to variable n (step S20c), obtains the management number stored in bank 0, and substitutes it into a variable m (step S20d). Controller 214 obtains the management number stored in bank n of log memory 253, and substitutes it into a variable ma (step S20e). After calculating (ma−m), it is determined whether the result of this calculation is "1" or not (step S20f). If the result of calculation is "1", controller 214 substitutes (n+1) obtained by adding 1 into variable n (step S20g), and substitutes the management number, which was substituted into variable ma, into variable m (step S20g). Thereafter, steps S20e-S20h are repeated.

If the results of calculation are not equal to "1", controller 214 determines that bank (n−1) is a region bearing the latest log, and ends the obtaining of latest management number m. Thereby, the operation moves to step S20b in FIG. 11. In this state, the earliest log is stored in bank n.

If it is determined in step S20f that the result of calculation is "1", steps S20g, S20h, S20e and S20f are successively performed. This represents the fact that, if the result of calculation is "1", management numbers m and ma, which are substituted into variables m and ma, respectively, are consecutive, and banks (n−1) and n store the logs successively. Thus, the above is achieved because a difference between the management numbers stored in the consecutive banks is equal to "1" in the case where the regions in log memory 253 are used cyclically according to the bank numbers, and the management numbers are also used cyclically in a residue system of M. Therefore, it is determined that bank (n−1) does not store the latest log. The situation of bank n is not clear. Then, the determination is effected on the next region, and the log stored in bank n is determined. More specifically, the determination is performed based on the management number of the log stored in bank n and the management number of the log stored in the next region, i.e., bank (n+1). According to the flowchart, (n+1) is substituted into n in step S20g so that the determination is effected on the next region.

In this manner, a loop formed of steps S20f, S20g, S20h and S20e is repeated. Thereby, it is determined whether the management numbers stored in the consecutive regions from bank 0 to bank (N−1) are consecutive or not. It is the number of bank 0, with which bank (N−1) is compared. As described above, the calculation relating to the numbers of banks is performed in the residue system of N. Thus, the relationships of (n−1=N−1) and (n=0) are present when determining bank (N−1).

When the result of calculation is not "1" in step S20f, it is determined that the log stored in bank (n−1) is the latest log. This is because the management numbers of two logs stored in banks (n−1) and n are not consecutive. Thus, the consecutive logs bear the consecutive management numbers, respectively, as already described. Conversely, the logs bearing the inconsecutive management numbers are not consecutive.

For specifying bank (n−1) according to FIG. 12, the logs including the predetermined management numbers must be stored in all the regions 2531-253N of log memory 253, i.e., banks 0-(N−1) by initializing log memory 253 before shipment of hard disk 20. The logs having the management numbers of the same value are stored in all the banks, or the logs having the management numbers of the consecutive values (inconsecutive at one point) are stored in the consecutive banks, respectively. Values in other regions of the logs are not restricted.

Referring to FIG. 11 again, after obtaining the bank (n−1) storing the latest history information (log) as well as the management number m stored in bank (n−1) in the foregoing manner, controller 214 stores management number of (m+1), license ID accepted in step S16 and session key Ks2a accepted in step S19 in bank n, and sets status ST1 of ST1 region 2544 to "waiting for reception" (step S20b). Thereby, the operation in step S20 illustrated in FIG. 9 ends, and the operation moves to step S21.

Referring to FIG. 9 again, encryption processing portion 224 encrypts one data series formed of session key Ks2a and individual public key KPom2, which are applied by successively selecting contacts Pd and Pf of selector switch 262, with session key Ks1a applied from decryption processing portion 230 via contact Pb of selector switch 260, and thereby produces E(Ks1a, Ks2a//KPom2) (step S21). Encryption processing portion 224 provides E(Ks1a, Ks2a//KPom2) onto bus BS3. Controller 214 accepts encrypted data E(Ks1a, Ks2a//KPom2) provided onto bus BS3, and provides data LID//E(Ks1a, Ks2a//KPom2), which is one data series formed of the accepted data and license ID (LID), to terminal device 10 via ATA interface portion 212 and terminal 210 (step S22).

When terminal device 10 accepts data LID//E(Ks1a, Ks2a//KPom2) from hard disk 20 (step S23), it provides the accepted data to license providing device 40 over network 30 (step S24).

When license providing device 40 receives data LID//E(Ks1a, Ks2a//KPom2) (step S25), decryption processing portion 422 executes the decryption processing with session key Ks1a, and accepts session key Ks2a produced by hard disk 20 and individual public key KPom2 of hard disk 20 (step S26).

Distribution control portion 412 obtains data ID (DID) and content key Kc corresponding to license ID (LID) from content database 402 (step S27), and produces license LIC=Kc//AC//DID//LID, which is one data series formed of data ID (LID) and content key Kc thus obtained as well as license ID (LID) and control information AC.

Distribution control portion 412 provides license LIC thus produced to encryption processing portion 424. Encryption processing portion 424 encrypts license LIC with individual public key KPom2 of hard disk 20 obtained by decryption processing portion 422, and thereby produces encrypted data E(KPom2, LIC) (step S28). Encryption processing portion 426 encrypts encrypted data E(KPom2, LIC) received from encryption processing portion 424 with session key Ks2a received from decryption processing portion 422 to produce encrypted data E(Ks2a, E(KPom2, LIC)) (step S29).

Referring to FIG. 10, distribution control portion 412 provides encrypted data E(Ks2a, E(KPom2, LIC)) to terminal device 10 via bus BS1 and communication device 450 (step S30). When terminal device 10 accepts encrypted data E(Ks2a, E(KPom2, LIC)) over network 30 (step S31), it provides the encrypted data thus accepted to hard disk 20 (step S32).

Controller 214 of hard disk 20 accepts encrypted data E(Ks2a, E(KPom2, LIC)) via terminal 210 and ATA interface portion 212 (step S33), and provides it onto bus BS3. Decryption processing portion 228 decrypts data E(Ks2a, E(KPom2, LIC)) provided onto bus BS3 with session key Ks2a provided from session key generating portion 226, and hard disk 20 accepts encrypted license E(KPom2, LIC) prepared by encrypting license LIC with individual public key KPom2 (step S34). Decryption processing portion 228 provides encrypted license E(KPom2, LIC) onto bus BS3.

According to the instruction of controller 214, decryption processing portion 216 decrypts encrypted license E(KPom2, LIC) with individual private key Kom2 to accept license LIC (step S35).

When controller 214 of hard disk 20 confirms the acceptance of license LIC, it notifies terminal device 10 of the acceptance via ATA interface portion 212 and terminal 210. When controller 108 of terminal device 10 accepts, via hard disk interface portion 110 and bus BS2, the notification of acceptance of license LIC by hard disk 20, controller 108 provides the LBA (i.e., the storage LBA), at which received license LIC is stored in secure data storage portion 250 of hard disk 20, to hard disk 20 via bus BS2 and hard disk interface portion 110 (step S36). Controller 214 of hard disk 20 accepts the storage LBA of destination of license LIC via terminal 210 and ATA interface portion 212 (step S37), and stores the accepted storage LBA in LBA region 2547 of the log stored in bank n of log memory 253 (step S38).

Controller 214 compares license ID (LID) included in accepted license LIC with license ID (LID) accepted in step S16, and determines whether these match with each other or not (step S39). When the matching is confirmed, controller 214 determines that accepted license LIC is correct, and stores accepted license LIC at the LBA, which is received from terminal device 10, in secure data storage portion 250 (step S40).

When controller 214 stores license LIC at the designated LBA, it sets the flag corresponding to this LBA of validity flag region 252 to "valid" (step S41). Controller 214 further sets status ST1 of ST1 region 2544 in the log stored in bank n of log memory 253 to "received" (step S42), and notifies terminal device 10 of the fact that the series of processing in the distribution session ends.

When terminal device 10 accepts the notification of the end of processing provided from hard disk 20, the distribution session in the data distribution system normally ends.

When controller 214 determines in step S39 that the mismatching of LID occurs and accepted license LIC is not correct, it provides an error notification to terminal device 10 (step S43), and terminal device 10 receives the error notification (step S45) so that the processing ends.

In the distribution processing illustrated in FIGS. 9 and 10, license providing device 40 records logs, although not described. In connection with this, as shown in FIG. 4, however, license providing device 40 is provided with log database 404 having a sufficient storage capacity, and the logs of respective steps in the distribution session are stored. Log database 404 also stores accounting information related to transmission of the license.

In the series of steps for distribution processing illustrated in FIGS. 9 and 10, a failure may occur during the processing between steps S25 and S44, and thereby the processing may be interrupted. In this case, rewrite processing may be performed. For example, the interruption may occur due to various reasons such as power-off of terminal device 10 during the processing, a failure on the side of license providing device 40 or a failure in communication between terminal device 10 and license providing device 40. When the interruption of processing occurs during a period from the end of step S22, in which all the contents of the output log except for status ST2 stored in log memory 253 of hard disk 20 are stored, to step S44, hard disk 20 can be supplied with the license by performing the rewrite processing. Since the foregoing processing is configured to perform the rewrite processing according to the determination of terminal device 10, the rewrite processing is to be performed when the interruption occurs during the processing from step S25 to step S44 except for the processing in the period from step S22 to step S24, during which terminal device 10 can determine the progress of processing. When the interruption occurs in the steps other than the above, it is determined that license providing device 40 has not provided the license, and the processing starting from the initial step is performed in accordance with the flowcharts of FIGS. 9 and 10.

Likewise, the processing performed in license providing device 40 from step S25 to step S30, before which license providing device 40 outputs the license, is not handled as the target case of the rewrite processing if it is possible to specify the step, in which the interruption of processing occurred, and thereby is handled as the case, in which the processing starting from the initial step is to be performed in accordance with the flowcharts of FIGS. 9 and 10.

[Rewrite in Distribution]

Figure 13:
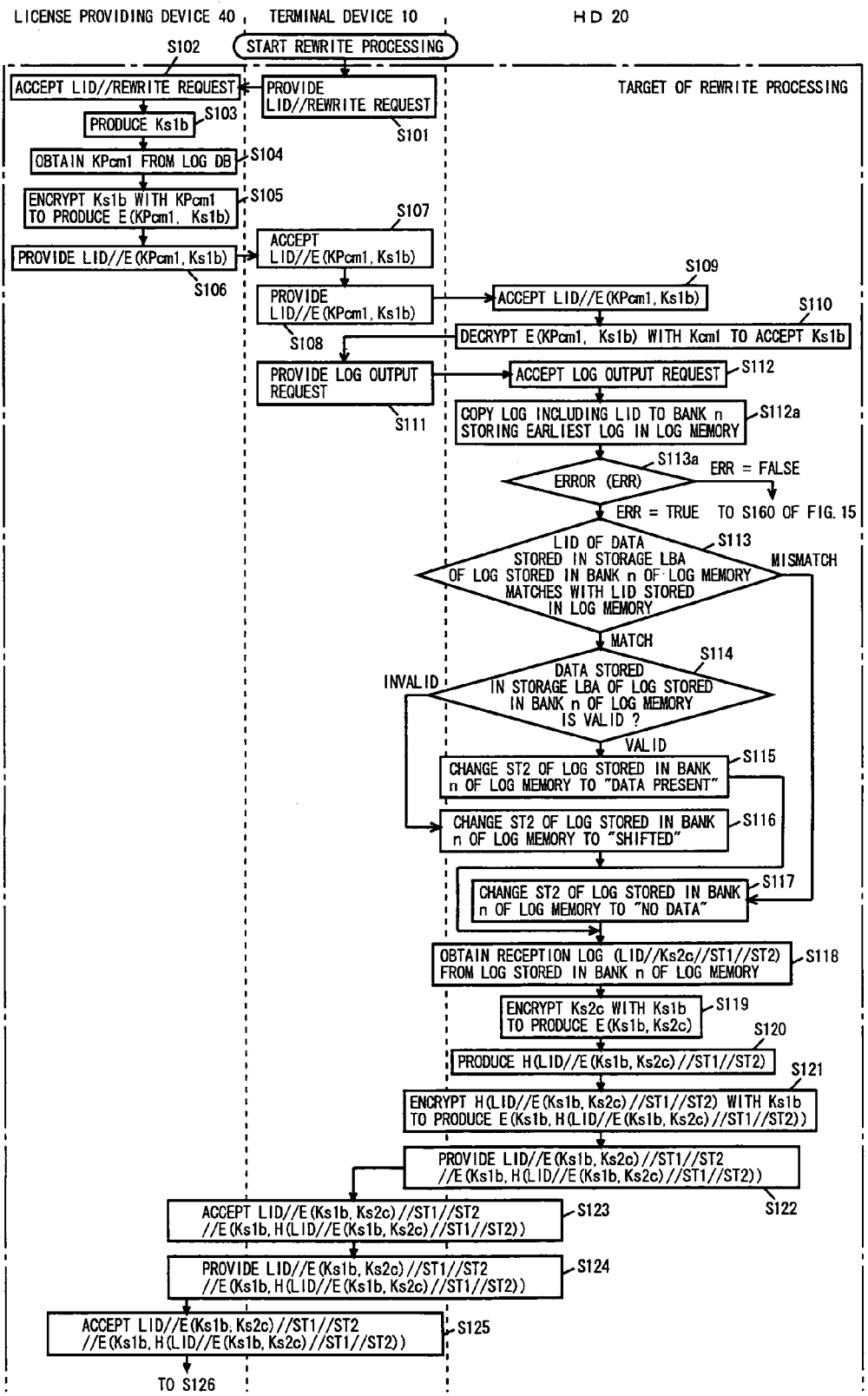
FIG. 13 is a first flowchart in the first embodiment for illustrating rewrite processing during the distribution processing in the data distribution system shown in FIG. 1.
Figure 14:
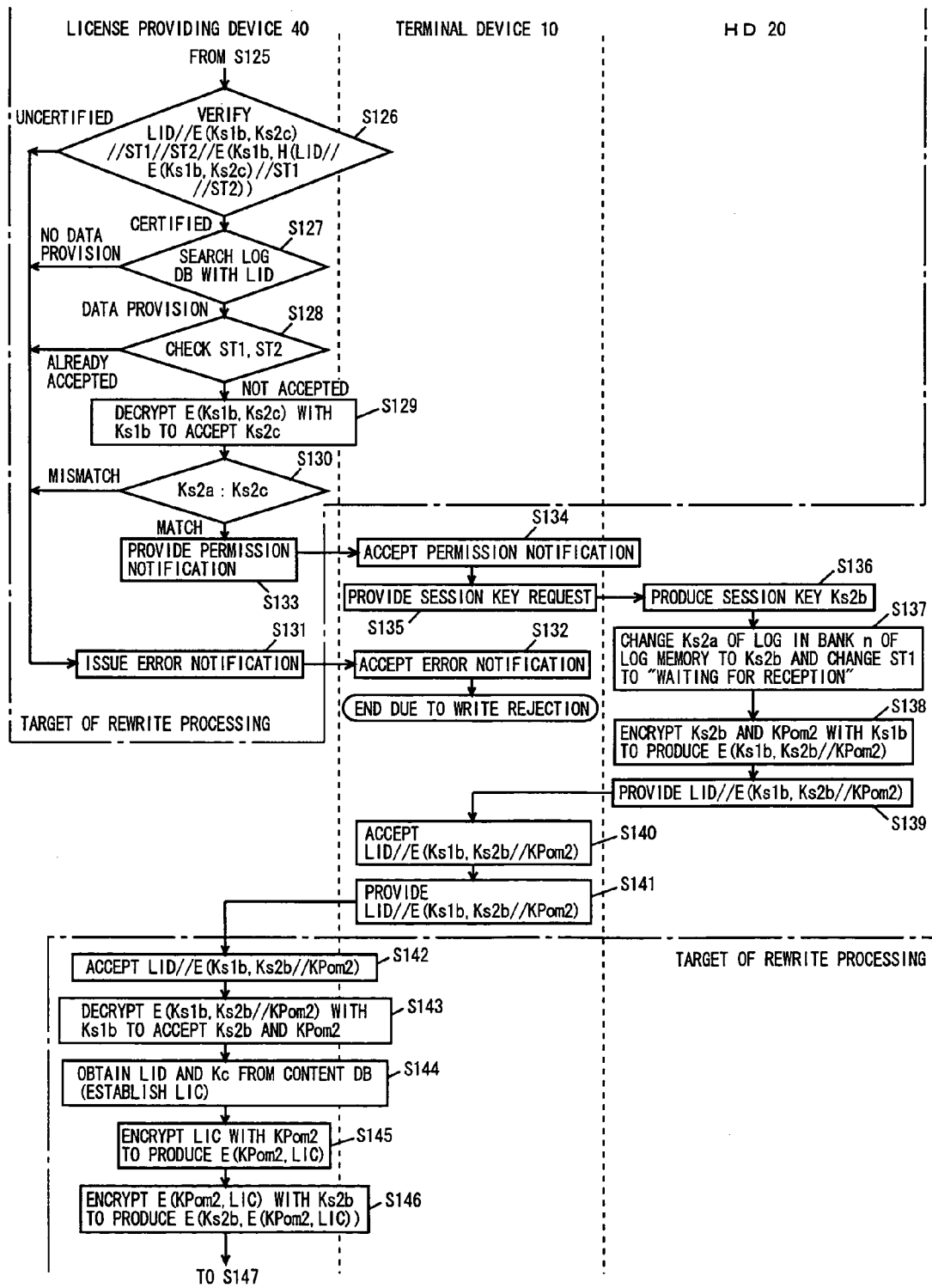
FIG. 14 is a second flowchart in the first embodiment for illustrating the rewrite processing during the distribution processing in the data distribution system shown in FIG. 1.
Figure 15:
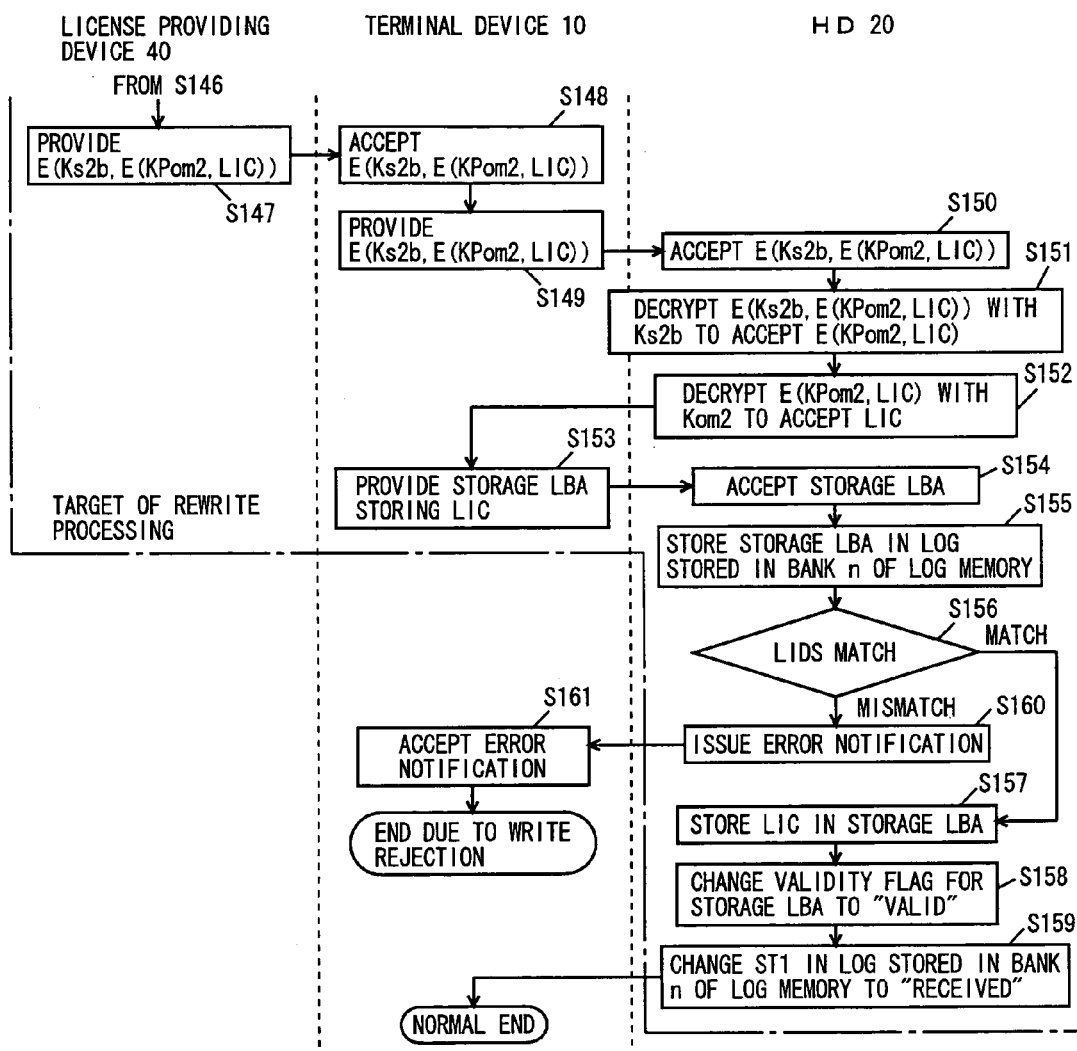
FIG. 15 is a third flowchart in the first embodiment for illustrating the rewrite processing during the distribution processing in the data distribution system shown in FIG. 1.
Figure 16:
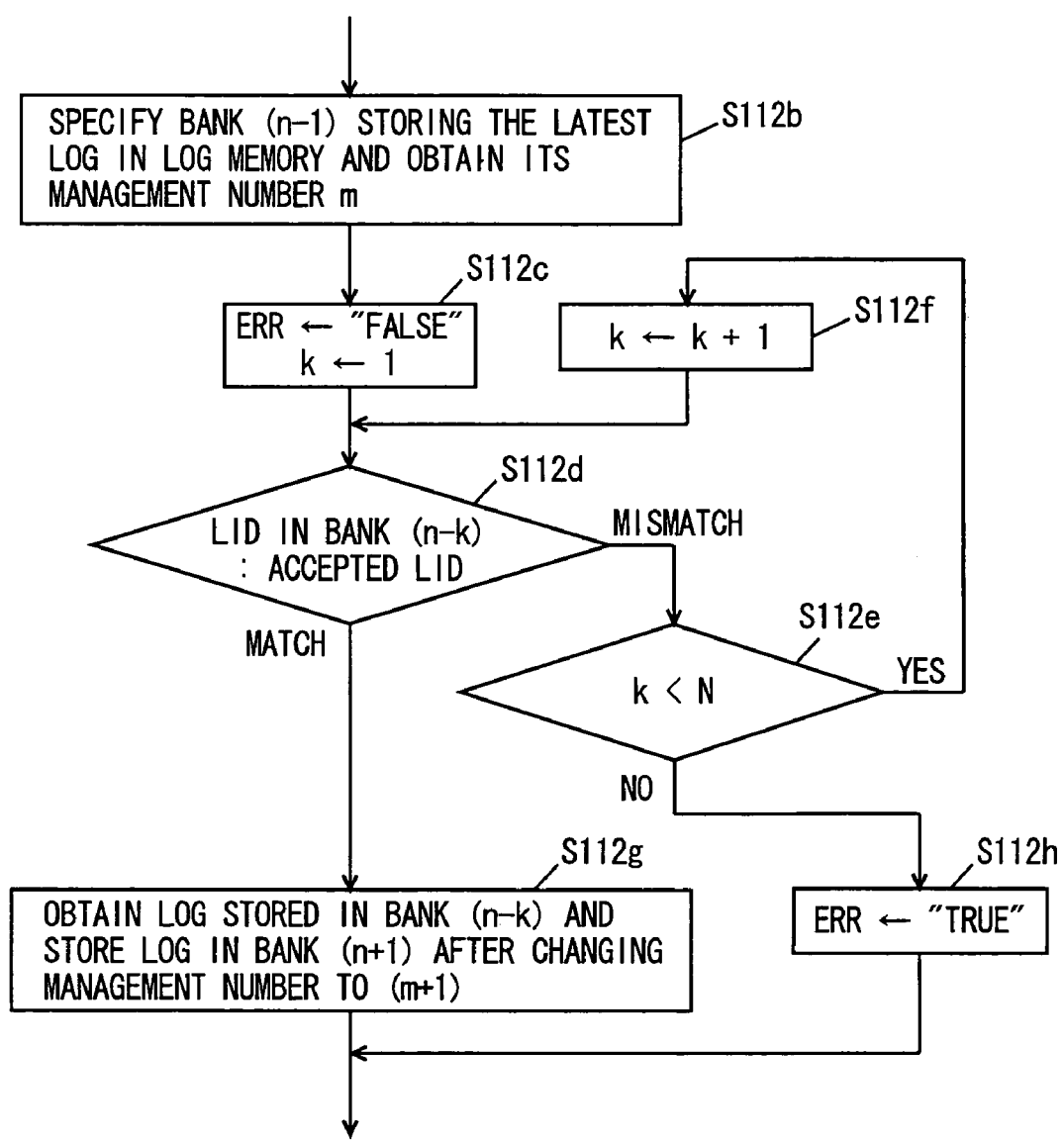
FIG. 16 is a flowchart for illustrating specific operations in a step S112a illustrated in FIG. 13.

FIGS. 13 to 15 are first to third flowcharts illustrating the rewrite processing performed when a failure occurred during the processing from step S25 to step S44 in the distribution processing illustrated in FIGS. 9 and 10. FIG. 16 is a flowchart for illustrating specific operations performed in a step S112$a$ in FIG. 13.

Referring to FIG. 13, when terminal device 10 determines that a failure occurred during the processing from step S25 to step S44, it provides a request for LID//rewriting of license LIC to license providing device 40 over network 30 (step S101). When distribution control portion 412 accepts the LID//rewrite request via communication device 450 and bus BS1 (step S102), it instructs session key generating portion 414 to produce the session key. Session key generating portion 414 receiving the instruction produces a session key Ks1$b$ for the rewrite processing (step S103). Distribution control portion 412 obtains class public key KPcm1 corresponding to hard disk 20 from log database 404 storing the log of transmission to and from hard disk 20 in this session (step S104), and provides it to encryption processing portion 420. Encryption processing portion 420 receiving class public key KPcm1 encrypts class public key KPcm1 with session key Ks1$b$ to produce E(KPcm1, Ks1$b$) (step S105). Distribution control portion 412 provides LID//E(KPcm1, Ks1$b$) to terminal device 10 via bus BS1 and communication device 450 (step S106).

When terminal device 10 accepts LID//E(KPcm1, Ks1$b$) over network 30 (step S107), it provides accepted LID//E (KPcm1, Ks1$b$) to hard disk 20 (step S108). Controller 214 of hard disk 20 accepts LID//E(KPcm1, Ks1$b$) via terminal 210 and ATA interface portion 212 (step S109). Controller 214 provides accepted E(KPcm1, Ks1$b$) to decryption processing portion 230 via bus BS3. Decryption processing portion 230 decrypts it with class private key Kcm1, which is held by Kcm holding portion 204 and is peculiar to hard disk 20, to provide session key Ks1$b$ so that session key Ks1$b$ is accepted (step S110).

When controller 214 of hard disk 20 confirms the acceptance of session key Ks1$b$ produced by license providing device 40, it provides a notification of the acceptance to terminal device 10 via ATA interface portion 212 and terminal 210. When controller 108 of terminal device 10 accepts, via hard disk interface portion 110 and bus BS2, the notification that hard disk 20 accepted session key Ks1$b$, it provides an output request for the log to hard disk 20 via bus BS2 and hard disk interface portion 110 (step S111).

When controller 214 of hard disk 20 accepts the notification of output request for the log via terminal 210 and ATA interface portion 212 (step S112), it performs the copying of the log (step S112$a$).

Referring to FIG. 16, specific operations in step S112$a$ will now be described. Controller 214 specifies bank (n−1) storing the latest log in log memory, and obtains management number m of the log stored in bank (n−1) (step S112$b$). In step S112$b$, specific operations are performed in accordance with flowcharts of FIGS. 11 and 12.

After step S112$b$, controller 214 substitute "1" into a variable k (k is a natural number satisfying (1≧k≧N), and substitutes "false" into a variable ERR (step S112$c$), and determines whether license ID (LID) stored in bank (n−k) matches with license ID (LID) accepted in step S109 or not. More specifically, controller 214 determines whether license ID (LID) stored in the latest log detected in step S112$b$ matches with license ID (LID) accepted in step S109 or not.

When the two license IDs (LID) do not match, controller 214 determines whether k is smaller than N (N: total number of banks) (step S112e). When k is equal to or larger than N, confirmation relating to all the banks is completed, and thus, it is confirmed that the log storing the LID matching with accepted license ID (LID) is not stored. Thereby, the next processing is performed in step S112h, and "true" is substituted into variable ERR (step S112h). The operation returns to step S113A in FIG. 13, and variable ERR is determined.

Referring to FIG. 13 again, controller 214 determines variable ERR (step S113a). If the processing returned from step S112h in FIG. 16, variable ERR is "true", and indicates that the log storing the license ID in question is not stored in log memory 253. Therefore, the processing can be continued no longer. Therefore, the operation moves to a step S160 illustrated in FIG. 15, and an error notification is issued to terminal device 10 (step S160). Terminal device 10 accepts the error notification (step S161) so that the writing is rejected, and a series of operations end.

Referring to FIG. 16, when controller 214 determines in a step S112e that k is smaller than N, checking of all the banks is not completed so that (k−1) is substituted into variable k for determining the log older by one than the last determined log (step S112f), and the operation moves to a step S112d. Controller 214 determines whether license ID (LID) stored in bank (n−k) matches with license ID (LID) accepted in step S109 or not. In this case, variable k is "2" so that controller 214 determines whether license ID (LID) of the log stored in bank (n−2) matches with license ID (LID) accepted in step S109 or not. When the two license IDs (LID) do not match with each other, processing in steps S112e, S112f and S112d is executed.

As described above, controller 214 determines whether license ID (LID) stored in each bank matches with license ID (LID) accepted in step S109 while changing the bank to be determined from the latest log toward the earliest log. These operations in steps S112e, S112f and S112d are repeated until license ID (LID) matching with license ID (LID) accepted in step S109 is detected, or until checking of all the banks is completed. Since the bank number is in the residue system of N, the checking of license ID is performed in the order of banks (n−1)(k=1), (n−2)(k=2), ---, 1(k=n−1), 0(k=n), (N−1)(k=n+1), --- and n (k=N).

When two license IDs (LID) match in step S112d, controller 214 obtains the log stored in bank (n−k), and stores the log thus obtained in bank n after changing management number m of the obtained log to (m+1) (step S112g). Thus, in the case where log memory 253 stores the log(s) including the license ID(s) (LID) matching with license IDs (LID) transmitted from license providing device 40, controller 214 copies the log (the latest log if there are two or more matching logs) into bank n storing the earliest log. In this case, only the management number is not copied, and a value obtained by adding one to the management number of the log stored in the last bank (n−1) is recorded so that the copied log may be handled as the new log. Therefore, the earliest log is deleted, and the new log corresponding to the rewrite processing, which is being performed, is stored in place of the deleted log.

Thereafter, the operation moves to step S113a illustrated in FIG. 13.

Referring to FIG. 13 again, controller 214 stores variable ERR (step S113a). When the operation moves from step S112a illustrated in FIG. 16, variable ERR is "false", and it is determined that the log storing the license ID in question is copied into bank n so that controller 214 determines that the processing can be continued, and next processing is performed in step 5113 to determine whether license ID (LID) of license LIC, which is recorded in the storage LBA stored in bank n of log memory 253, matches with license ID (LID) stored in log memory 253 or not (step S113).

When controller 214 determines that both license IDs (LID) match with each other, the distribution processing is performed until license LIC is received from license providing device 40, and it is recognized that hard disk 20 has accepted license LIC. Thereby, controller 214 checks the flag stored in validity flag region 252 corresponding to the license, which is stored in the region designated by the LBA stored in bank n of log memory 253, and checks the validity of the license (step S114).

When controller 214 determines that the license is valid, it changes status ST2 of the log stored in bank n of log memory 253 to "data present", and then performs the next processing (step S118). When controller 214 determines in step S114 that the license is invalid, it changes status ST2 of the log stored in bank n of log memory 253 to "shifted", and then performs the new processing in step S118.

In step S113, when controller 214 determines that compared license IDs (LID) do not match with each other, it changes status ST2 of the log stored in bank n of log memory 253 to "no data" (step S17).

When the processing is performed to change status ST2, controller 214 obtains license ID (LID), statuses ST1 and ST2, and a session key Ks2c from log memory 253 (step S118). In this case, session key Ks2a is stored in bank n of log memory 253 because this processing is performed in connection with interruption of the distribution session according to the flowcharts of FIGS. 9 and 10. However, session key Ks2c obtained from bank n of log memory 253 is illustrated for the sake of description. Controller 214 provides session key Ks2c thus obtained to encryption processing portion 224 via bus BS3.

Encryption processing portion 224 encrypts session key Ks2c obtained from bus BS3 with session key Ks1b, which is applied from decryption processing portion 230 via contact Pb of selector switch 260, and produces E(Ks1b, Ks2c) (step S119). Encryption processing portion 224 provides E(Ks1b, Ks2c) thus produced onto bus BS3. Controller 214 accepts E(Ks1b, Ks2c) on bus BS3, produces one data series LID//E(Ks1b, Ks2c)//ST1//ST2 from E(Ks1b, Ks2c) together with the data obtained in step S118, and produces hash value H(LID//E(Ks1b, Ks2c)//ST1//ST2) by using the hash function (step S120). Controller 214 provides hash value H(LID//E(Ks1b, Ks2c)//ST1//ST2) to encryption processing portion 224 via bus BS3.

Encryption processing portion 224 encrypts hash value H(LID//E(Ks1b, Ks2c)//ST1//ST2) obtained from bus BS3 with session key Ks1b, which is applied from decryption processing portion 230 via contact Pb of selector switch 260, to produce E(Ks1b, H(LID//E(Ks1b, Ks2c)//ST1//ST2)) (step S121). Encryption processing portion 224 provides E(Ks1b, H(LID//E(Ks1b, Ks2c)//ST1//ST2)) thus produced onto bus BS3. Data series LID//E(Ks1b, H(LID//E(Ks1b, Ks2c)//ST1//ST2)) will be referred to as a "reception log", and E(Ks1b, H(LID//E(Ks1b, Ks2c)//ST1//ST2) is signed data prepared by effecting electronic signature on the reception log with session key Ks1b. The purpose of encrypting session key Ks2c stored in log memory 253 with session key Ks1b is to eliminate the possibility of flow-out of the license due to leakage of session key Ks2c.

When controller 214 accepts the signed data transmitted from bus BS3, it produces signed reception log LID//E(Ks1b, Ks2c)//ST1//ST2//E(Ks1b, H(LID//E(Ks1b, Ks2c)//ST1//ST2)) using the reception log obtained in step S118, and provides it to terminal device 10 via ATA interface portion 212 and terminal 210 (step S122).

When terminal device 10 accepts signed reception log LID//E(Ks1b, Ks2c)//ST1//ST2//E(Ks1b, H(LID//E(Ks1b, Ks2c)//ST1//ST2)) transmitted from hard disk 20 (step S123), it provides the accepted data to license providing device 40 over network 30 (step S124). License providing device 40 receives signed reception log LID//E(Ks1b, Ks2c)//ST1//ST2//E(Ks1b, H(LID//E(Ks1b, Ks2c)//ST1//ST2)) over network 30 (step S125).

Referring to FIG. 14, license providing device 40 verifies signed reception log LID//E(Ks1b, Ks2c)//ST1//ST2//E(Ks1b, H(LID//E(Ks1b, Ks2c)//ST1//ST2)) thus received (step S126). The verifying processing is performed as follows.

When distribution control portion 412 accepts the signed reception log, it provides the second half of the signed reception log, i.e., signed data E(Ks1b, H(LID//E(Ks1b, Ks2c)//ST1//ST2)) to decryption processing portion 422. Also, distribution control portion 412 instructs generation of session key Ks1b. Decryption processing portion 422 decrypts signed data E(Ks1b, H(LID//E(Ks1b, Ks2c)H/ST1//ST2)) with session key Ks1b, and extracts the hash value calculated by hard disk 20. Distribution control portion 412 calculates the hash value of the first half of the signed reception log, i.e., reception log LID//E(Ks1b, Ks2c)//ST1//ST2, and compares it with the hash value calculated by hard disk 20 after decryption by decryption processing portion 422. When distribution control portion 412 determines that the two hash values match with each other, license providing device 40 certifies that the data series received from hard disk 20 includes the correct data.

When the signed reception log received from hard disk 20 is certified in step S126, distribution control portion 412 searches log database 404 based on accepted license ID (LID) (step S127). When distribution control portion 412 determines that accepted license ID (LID) is stored in log database 404, and is surely the license provided to hard disk 20, it checks the contents of accepted statuses ST1 and ST2 (step S128).

When status ST1 is "waiting for reception", and status ST2 is "no data", distribution control portion 412 determines that hard disk 20 has not accepted license LIC, which was to be transmitted to hard disk 20, due to a certain failure. Thereby, distribution control portion 412 provides encrypted data E(Ks1b, Ks2c) included in the received data series to decryption processing portion 422, and decryption processing portion 422 decrypts it with session key Ks1b to obtain session key Ks2c. Decrypted session key Ks2c is provided to distribution control portion 412 via bus BS1, and is accepted by distribution control portion 412 (step S129).

Distribution control portion 412 compares session key Ks2a, which was being handled when the failure occurred, with the currently accepted session key Ks2c (step S130). When distribution control portion 412 determines that session key Ks2a matches with session key Ks2c, it provides a permission notification for rewriting of license LIC to terminal device 10 (step S133).

In contrast to the above, the data series received from hard disk 20 may not be certified in step S126. Also, in step S127, license ID (LID) received from hard disk 20 may not be stored in log database 404, and cannot be determined as the ID of the license provided to hard disk 20. In step S128, it may be determined that license LIC is accepted in hard disk 20. In step S130, it may be determined that session keys Ks2a and Ks2c do not match with each other. In these cases, distribution control portion 412 determines that re-transmission of the license is impossible, and issues an error notification via bus BS1 and communication device 450 to terminal device 10 (step S131). When terminal device 10 accepts the error notification over network 30 (step S132), the processing ends. Thus, license providing device 40 rejects the rewriting of the license, and the processing ends.

When controller 108 of terminal device 10 accepts the permission notification, which is issued in step S133 by license providing device 40, in a step S134, it issues a request notification for production of the session key for hard disk 20 to hard disk 20 via bus BS2 and hard disk interface portion 110 (step S135).

When hard disk 20 accepts the request notification for production of the session key issued from terminal device 10 based on the rewrite processing permission notification provided from license providing device 40, it produces new session key Ks2b (step S136), and replaces session key Ks2c (=Ks2a) recorded in the log of bank n of log memory 253 with session key Ks2b. Also, it changes status ST1 of the log to "waiting for reception" (step S137).

Processing in and after step S138 is performed similarly to that illustrated in FIGS. 9 and 10 except for that session key Ks2b is newly produced and used instead of session key Ks2a in the series of processing from step S21 to the end of the processing illustrated in FIGS. 9 and 10. Therefore, description of a series of processing starting from step S138 is not repeated.

When the interruption occurs in the rewrite processing during the distribution of the license illustrated in the flowcharts of FIGS. 13 to 15, processing is performed as follows. When the interruption occurs in any one of steps S101-S131, S133 and S142-S160, the rewrite processing can be performed in accordance with the flowcharts of FIGS. 13 to 15. When interruption occurs in any one of steps S134-S141, the license distribution processing illustrated in the flowcharts of FIGS. 9 and 10 is restarted from the initial step so that the processing can be resumed.

As described above, it is confirmed that hard disk 20 attached to terminal device 10 holds correct class certificate Cm1. After this confirmation, the encryption keys (session keys), which are produced by license providing device 40 and hard disk 20, respectively, are mutually transmitted with class public key KPcm1, which is transmitted together with class certificate Cm1 including it. Each side executes the encryption with the received encryption key, and transmits the encrypted data to the opposite party so that mutual certification can be practically performed in the processing of transmitting the encrypted data between the opposite sides. Thereby, it is possible to prohibit the unauthorized distribution of the license to the hard disk, and the security of the data distribution system can be improved.

Further, even when the license distribution processing is interrupted, the signed reception log on hard disk 20, which is the data storage device on the reception side, is transmitted to license providing device 40 so that the re-transmission of the license can be performed safely without performing double distribution of the license.

[Copy/Shift]

Figure 17:
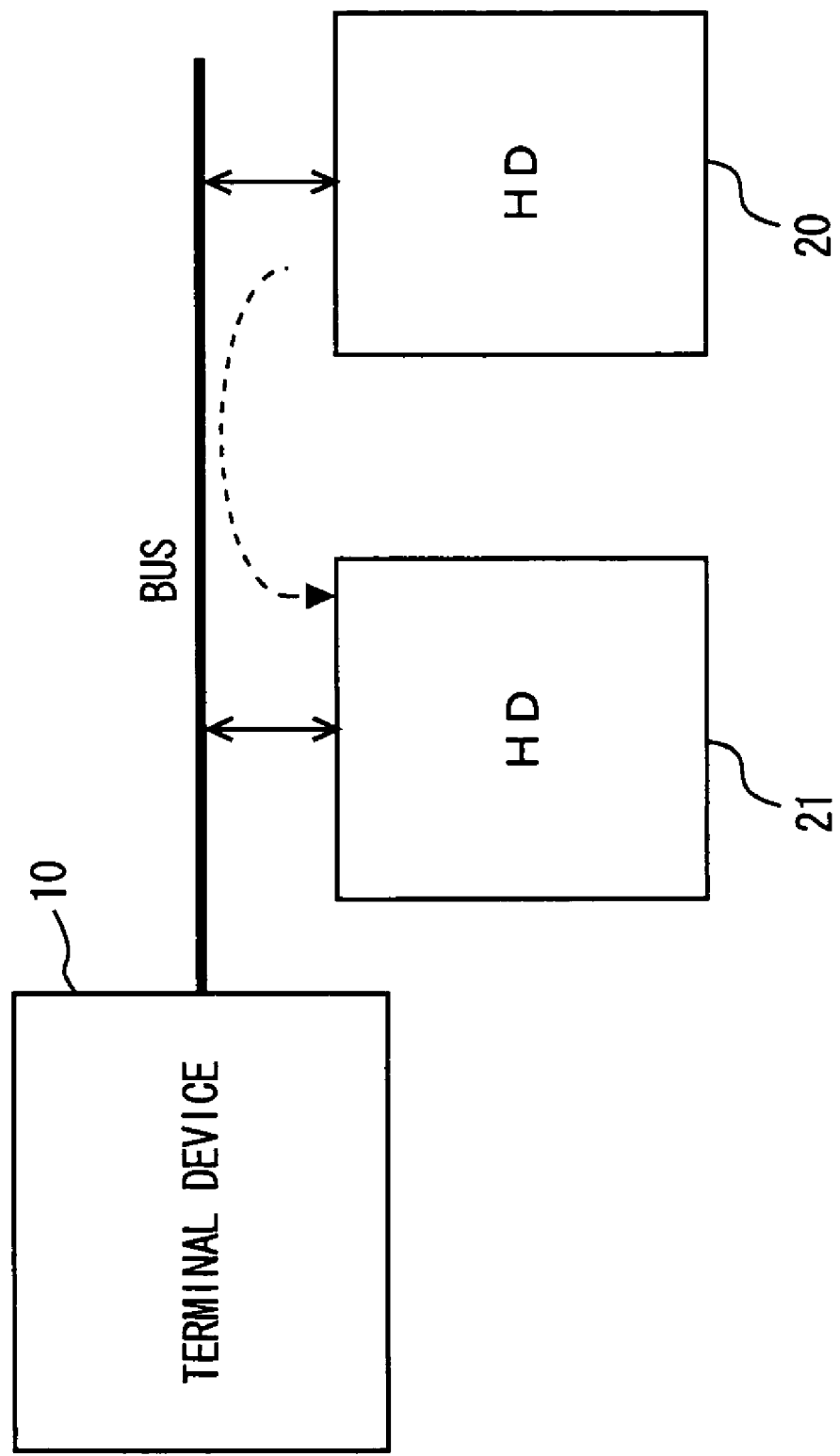
FIG. 17 is a schematic view showing a concept of a system structure performing copy/shift processing.

FIG. 17 is a schematic view showing a concept of a system structure performing copy/shift processing. Referring to FIG. 17, two data storage devices, i.e., two hard disks 20 and 21 can be attached to terminal device 10, and the license can be copied or shifted from hard disk 20 to hard disk 21 via terminal device 10.

Since hard disk 21 is a data storage device different from hard disk 20, it holds individual public key KPom5 and individual private key Kom5 different from those of hard disk 20.

In this case, identifier z of hard disk 21 is equal to 5 (z=5), and thus is different from z of hard disk 20 equal to 2. In the following description, the class of hard disk 21 is equal to that of hard disk 20, and thus is equal to one (y=1). Thus, each of hard disks 20 and 21 holds class certificate Cm1=KPcm1// Icm1//E(Ka, KPcm1//Icm1) and class private key Kcm1. However, if the class of hard disk 21 is different from the class of hard disk 20 (i.e., y≠1), the class certificate and the class private key are different from those of hard disk 20, similarly to the individual public key and individual private key.

Figure 18:
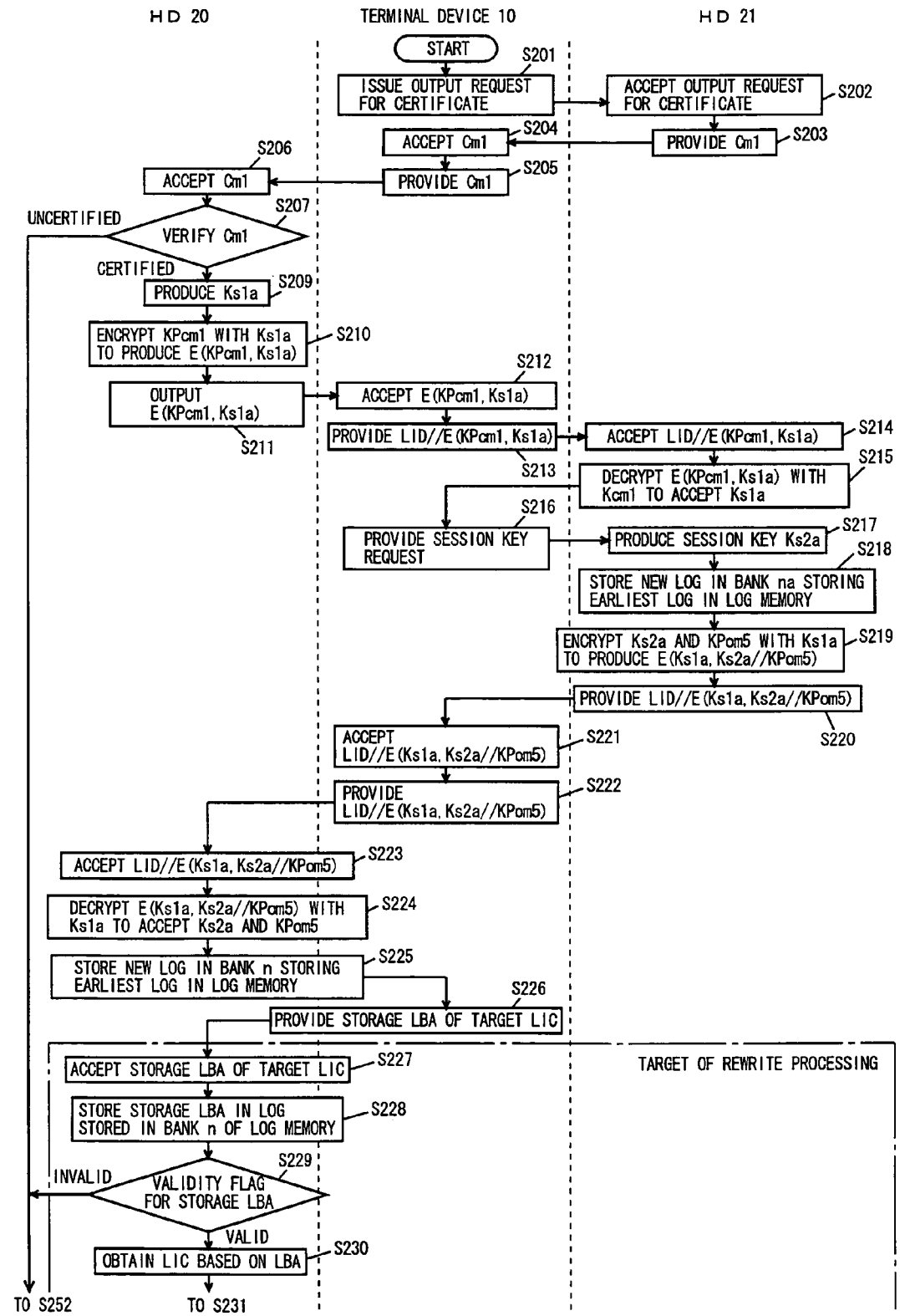
FIG. 18 is a first flowchart in the first embodiment for illustrating the copy or shift processing in the system shown in FIG. 17.
Figure 19:
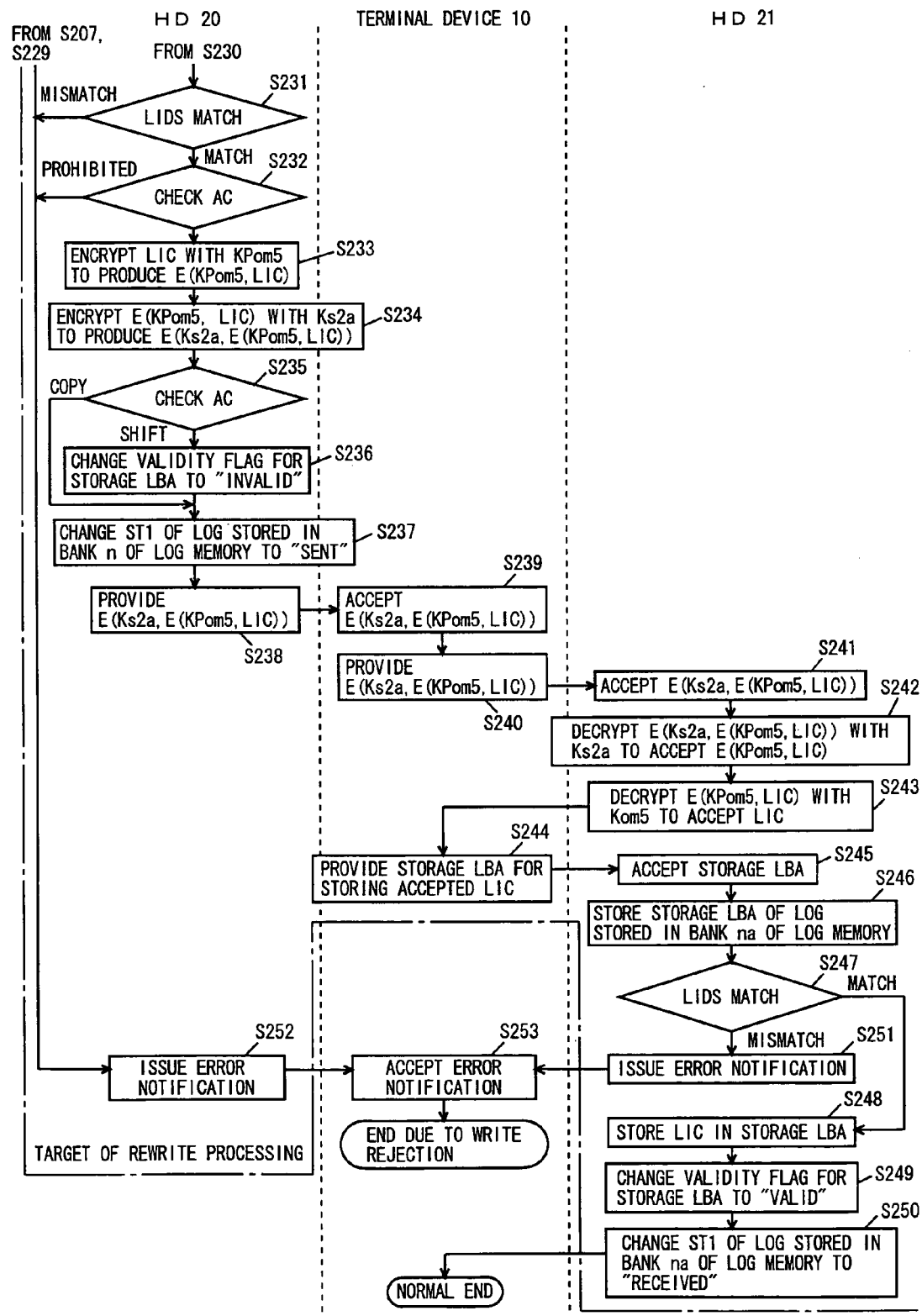
FIG. 19 is a second flowchart in the first embodiment for illustrating the copy or shift processing in the system shown in FIG. 17.

FIGS. 18 and 19 are first and second flowcharts illustrating the processing (copy/shift session) of the system allowing the copy/shift of the license shown in FIG. 17, respectively. In the illustrated processing, the user of terminal device 10 requests, from terminal device 10, the copy or shift of the license of the encrypted content data so that the license is copied or shifted from hard disk 20 attached to terminal device 10 to hard disk 21 via terminal device 10.

Referring to FIG. 18, when the user of terminal device 10 requests the copy or shift of the license for the intended content data, controller 108 of terminal device 10 issues an output request for the class certificate to hard disk 21 via bus BS2 and hard disk interface portion 110 (step S201). When controller 214 of hard disk 21 accepts the output request for the class certificate via terminal 210 and ATA interface portion 212 (step S202), it reads class certificate Cm1=KPcm1// Icm1//E(Ka, H(KPcm1//Icm1)) from verification data holding portion 202, and provides class certificate Cm1 to terminal device 10 via ATA interface portion 212 and terminal 210 (step S203).

When terminal device 10 receives class certificate Cm1 from hard disk 21 (step S204), it transmits received class certificate Cm1 to hard disk 20 (step S205).

When hard disk 20 receives class certificate Cm1 of hard disk 21 from terminal device 10 (step S206), it verifies whether accepted class certificate Cm1 of hard disk 21 is the correct class certificate or not (step S207). The verifying processing is the same as the processing of license providing device 40 illustrated in step S207, and therefore detailed description thereof is not repeated.

When controller 214 determines in step S207 that it is not the correct class certificate of hard disk 21, controller 214 issues an error notification to terminal device 10 without approving and accepting class certificate Cm1 of hard disk 21 (step S252 in FIG. 19). When terminal device 10 accepts the error notification (S253 in FIG. 19), the distribution session ends.

When it is determined in step S207 that class certificate Cm1 of hard disk 21 is the correct certificate, controller 214 of hard disk 20 approves class certificate Cm1 of hard disk 21, and controls session key generating portion 226 to generate session key Ks1a so that session key generating portion 226 produces session key Ks1a (step S209).

Encryption processing portion 222 encrypts session key Ks1a with class public key KPcm1 of hard disk 21 obtained by verification portion 220 to produce encrypted data E(KPcm1, Ks1a) (step S210).

Controller 214 provides encrypted data E(KPcm1, Ks1a) to terminal device 10 via ATA interface portion 212 and terminal 210 (step S211).

When terminal device 10 accepts encrypted data E(KPcm1, Ks1a) (step S212), it provides accepted encrypted data E(KPcm1, Ks1a) to hard disk 21 (step S213). Terminal device 10 has already obtained license ID (LID) by referring to a management file in advance. The management file is a data file storing management data for managing a relationship between the encrypted content data and the licenses stored on hard disk 20, and is stored in normal data storage portion 270. The contents of the management file are updated in response to recording or erasing of the encrypted content data as well as writing, shifting and erasing of the license.

Controller 214 of hard disk 21 accepts LID//E(KPcm1, Ks1a) via terminal 210 and ATA interface portion 212 (step S214). Then, controller 214 provides E(KPcm1, Ks1a) to decryption processing portion 230 via bus BS3. Decryption processing portion 230 decrypts it with class private key Kcm1, which is held by Kcm holding portion 204 and is peculiar to hard disk 21, to obtain and accept session key Ks1a (step S215).

When controller 214 of hard disk 21 confirms the acceptance of session key Ks1a produced by hard disk 20, it notifies terminal device 10 of the acceptance via ATA interface portion 212 and terminal 210. When terminal device 10 accepts the notification that hard disk 21 accepted session key Ks1a, terminal device 10 issues to hard disk 21 a notification of production request for the session key (step S216). When controller 214 of hard disk 21 accepts the notification of production request for the session key via terminal 210 and ATA controller 212, it instructs session key generating portion 226 to produce the session key. Session key generating portion 226 produces session key Ks2a (step S217).

Session key generating portion 226 provides session key Ks2a produced thereby to controller 214 via bus BS3, and controller 214 receives session key Ks2a. Controller 214 searches the bank storing the earliest log, and newly stores the log for the session, which is being processed (step S218). Specific operations in step S218 are performed in accordance with the flowcharts of FIGS. 11 and 12. However, it is assumed that bank na stores the earliest log for distinguish the processing in hard disk 21 from the results of the similar processing in hard disk 20. Thus, variable n in the flowcharts of FIGS. 11 and 12 is merely replaced with variable na.

Accordingly, a new management number obtained by adding one to the management number of the log stored in bank (na−1) as well as the license ID (LID) accepted in step S214 and session key Ks2a are stored in bank na of log memory 253, and status ST1 is set to "waiting for reception".

Subsequently, encryption processing portion 224 of hard disk 21 encrypts one data series formed of session key Ks2a and individual public key KPom5, which are applied by successively switching selector switch 262 between contacts Pd and Pf, with session key Ks1a applied via contact Pb of selector switch 260 from decryption processing portion 230, and thereby produces E(Ks1a, Ks2a//KPom5) (step S219). Encryption processing portion 224 provides E(Ks1a, Ks2a// KPom5) onto bus BS3. Controller 214 accepts encrypted data E(Ks1a, Ks2a//KPom5) provided onto bus BS3, and provides one series of data LID//E(Ks1a, Ks2a//KPom5), which is formed of the accepted encrypted data and license ID (LID), to terminal device 10 via ATA interface portion 212 and terminal 210 (step S220).

When terminal device 10 accepts LID//E(Ks1a, Ks2a// KPom5) from hard disk 21 (step S221), it outputs the accepted data to hard disk 20 (step S222).

Figure 20:
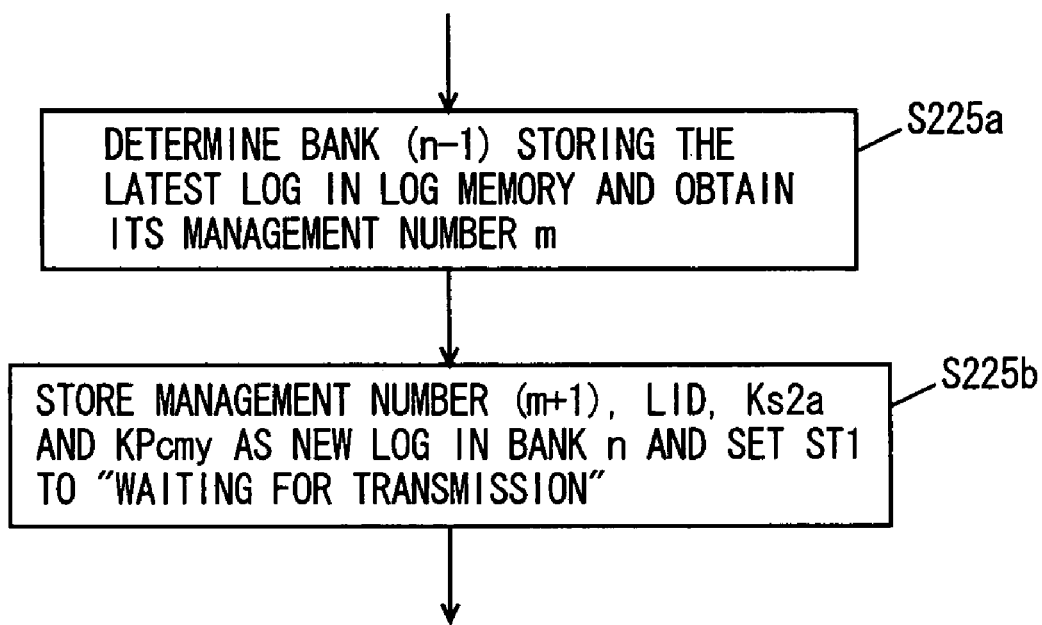
FIG. 20 is a flowchart for illustrating specific operations in a step S218 shown in FIG. 18.

When hard disk 20 accepts data LID//E(Ks1a, Ks2a// KPom5) via terminal 210 and ATA interface portion 110 (step S223), decryption processing portion 228 performs the decryption processing with session key Ks1a to extract and accept session key Ks2a produced by hard disk 21 as well as individual public key KPom5 of hard disk 21 (step S224). Decryption processing portion 228 provides the decrypted session key Ks2a to controller 214 via bus BS3, and controller 214 receives session key Ks2a. Controller 214 stores the log of the session, which is being processed, in the bank storing the earliest log (step S225). Specific operations in step S225 are executed in accordance with a flowchart of FIG. 20. Referring to FIG. 20, step S225 includes a step S225a, in which bank (n−1) storing the latest log in log memory 253 is specified, and management number m stored in bank (n−1) is obtained, and a step S225b, in which management number (m+1), license ID (LID), session key Ks2a and class public key KPcmy are stored in bank n, and the status region is set to "waiting for transmission". Specific operations in step S225a are executed in accordance with the flowchart of FIG. 12. Therefore, in accordance with the flowcharts of FIGS. 20 and 12, controller 214 stores license ID (LID) accepted in step S223 and session key Ks2a accepted in step S224 in bank n, and sets status ST1 to "waiting for transmission".

When the processing in step S225 ends, controller 214 of hard disk 20 notifies terminal device 10 of the ending via ATA interface portion 212 and terminal 210. When controller 108 of terminal device 10 accepts the notification transmitted from hard disk 20 via hard disk interface portion 110 and bus BS2, it provides the LBA (storage LBA) of secure data storage portion 250 of hard disk 20, at which license LIC to be transmitted from hard disk 20 to hard disk 21 is stored, to hard disk 20 via bus BS2 and hard disk interface portion 110 (step S226). When controller 214 of hard disk 20 accepts the LBA of the storage LBA of license LIC to be transmitted via terminal 210 and ATA interface portion 212 (step S227), it stores the accepted storage LBA in log memory 253 of secure data storage portion 250 (step S228).

Controller 214 determines whether the flag in validity flag region 252 corresponding to license LIC stored at the accepted storage LBA is "valid" or "invalid" (step S229). When the validity flag is "valid", controller 214 obtains the license LIC, which is to be stored at the storage LBA (step S230).

Referring to FIG. 19, when controller 214 obtains target license LIC, it compares license ID (LID) included in license LIC with license ID (LID), which is accepted in step S223 and is stored in the log stored in bank na of log memory 253, and checks whether these IDs match with each other or not (step S231). When controller 214 confirms the matching, it determines control information AC included in obtained license LIC, and checks whether a restriction is imposed on the use or not (step S232).

When controller 214 determines that control information AC does not prohibit the use of license LIC, it applies obtained license LIC to encryption processing portion 232. Encryption processing portion 232 encrypts license LIC with individual public key KPom5 of hard disk 21 obtained by decryption processing portion 228 to produce encrypted data E(KPom5, LIC) (step S233). Encryption processing portion 232 provides encrypted data E(KPom5, LIC) to encryption processing portion 224 via a selector switch Pc, and encryption processing portion 224 encrypts the encrypted data received from encryption processing portion 232 with session key Ks2a received from decryption processing portion 228 to produce encrypted data E(Ks2a, E(KPom5, LIC)) (step S234).

Based on control information AC included in target license LIC, controller 214 then determines whether the transmission of license LIC from hard disk 20 to hard disk 21 is "shift" or "copy" (step S235). When controller 214 determines that it is "shift", it sets the flag in validity flag region 252 corresponding to target license LIC, i.e., storage LBA to "invalid" (step S236). When controller 214 determines that it is "copy", license LIC in question may be left on hard disk 20 so that it starts next processing in a step S237 without changing the flag in validity flag region 252.

When the processing of validity flag region 252 ends, controller 214 changes status ST1 of the log stored in bank n of log memory 253 to "transmitted" (step S237), and transmits encrypted data E(Ks2a, E(KPom5, LIC)) to terminal device 10 via ATA interface portion 212 and terminal 210 (step S238).

In some cases, i.e., when the flag in validity flag region 252 corresponding to the storage LBA accepted in step S229 is "invalid", when matching of license IDs (LID) does not occur in step S231, or when control information AC included in obtained license LIC prohibits the use of obtained license LIC in step S232, controller 214 issues the error notification to terminal device 10 (step S252). When terminal device 10 accepts the error notification (step S253), the processing ends.

When terminal device 10 accepts encrypted data E(Ks2a, E(KPom5, LIC)) provided from hard disk 20 in step S238 (step S239), it provides the encrypted data thus accepted to hard disk 21 (step S240).

Controller 214 of hard disk 21 accepts encrypted data E(Ks2a, E(KPom5, LIC)) via terminal 210 and ATA interface portion 212 (step S241), and provides it onto bus BS3. Decryption processing portion 228 decrypts data E(Ks2a, E(KPom5, LIC)) provided onto bus BS3 with session key Ks2a provided from session key generating portion 226, and hard disk 21 accepts encrypted license E(KPom5, LIC) prepared by encrypting license LIC with individual public key KPom5 (step S242). Decryption processing portion 228 provides encrypted license E(KPom5, LIC) onto bus BS3.

In accordance with the instruction of controller 214, decryption processing portion 215 decrypts encrypted license E(KPom5, LIC) with individual private key Kom5, and hard disk 21 accepts license LIC (step S243).

When controller 214 confirms the acceptance of license LIC, it notifies terminal device 10 of the acceptance via ATA interface portion 212 and terminal 210. When controller 108 of terminal device 10 receives the notification of acceptance of license LIC by hard disk 21 via hard disk interface portion 110 and bus BS2, it provides the LBA (i.e., storage LBA), at which received license LIC is to be stored in secure data storage portion 250 of hard disk 21, to hard disk 21 via hard disk interface portion 110 (step S244). When controller 214 of hard disk 21 accepts the storage LBA for storing license LIC via terminal 210 and ATA interface portion 212 (step S245), it stores the accepted storage LBA in LBA region 2544 of the log stored in bank n of log memory 253 (step S246).

Controller 214 compares license ID (LID) included in accepted license LIC with license ID (LID) accepted in step S214, and determines whether these IDs match with each other or not (step S247). When these IDs match with each other, controller 214 determines that accepted license LIC is correct, and stores accepted license LIC in the region corresponding to the storage LBA, which is received from terminal device 10, in secure data storage portion 250 (step S248).

When controller 214 stores license LIC at the designated storage LBA, it sets the flag, which corresponds to the storage LBA, in validity flag region 252 to "valid" (step S249). Controller 214 sets status ST1 of the log stored in bank n of log memory 253 to "received" (step S250), and notifies, via ATA interface portion 212 and terminal 210, terminal device 10 of the fact that the series of processing in the copy/shift session ends.

When terminal device 10 accepts the processing end notification transmitted from hard disk 21, the session of copy/shift from hard disk 20 to hard disk 21 normally ends.

When mismatch occurs between the LIDs in step S247, controller 214 determines that the accepted license LIC is not correct, and issues the error notification to terminal device 10 via ATA interface portion 212 and terminal 210 (step S251). When terminal device 10 accepts the error notification (step S253), the session of copy/shift from hard disk 20 to hard disk 21 abnormally ends.

Similarly to the distribution session, rewrite processing is to be performed when interruption occurs in the series of processing of the copy/shift session illustrated in FIGS. 18 and 19 due to a failure during the processing from step S227 to step S252.

In the copy/shift session illustrated in FIGS. 18 and 19, the rewrite processing is performed when the interruption occurs during the processing from step S227 to step S235 for the following reasons. The series of processing from step S227 to step S235 is internal processing, and it is impossible to specify the step, in which processing of terminal device 10 failed, among the steps from step S227 to step S238. Therefore, it is assumed that step S236 was executed to invalidate the license in all the cases, and thus the rewrite processing is to be performed as described above.

For the following reasons, the rewrite processing is performed when the interruption occurs during the processing from step S236 to step S247. In the shift processing, the license on hard disk 20 is invalidated in step S236, and the valid license is not present on hard disk 21 during the above period. Therefore, if the processing is interrupted during the above period, the target license is lost.

The rewrite processing is also performed when the interruption occurs during the processing from step S248 to step S250 for the following reasons. Steps S249 and S250 are performed after the writing of license in step S248, and thus primary processing are already completed before these steps. However, terminal device 10 cannot determine the end of step S248 so that it is assumed that step S248 has not ended, and it is configured to perform the rewrite processing for steps S248 to step S250. When the rewrite processing is performed after the end of step S248, rewriting will be rejected in the rewrite processing.

The rewrite processing is further performed when the interruption occurs during the processing in step S251 for the following reasons. The processing in step S251 is primarily interrupted only in an extremely special case, but it is impossible to determine the fact that the processing is interrupted in step S251. Therefore, the system is configured to perform the rewrite processing in connection with step S251.

When it is determined in terminal device 10 that the session is the copy of the license as described above, or when it is possible to specify the step, in which the processing is interrupted, among steps S227-S235 and steps S249-S251, the rewrite processing is not necessarily required, and it is merely required to execute the copy/shift session illustrated in FIGS. 18 and 19 again.

[Rewrite in Copy/Shift]

Figure 21:
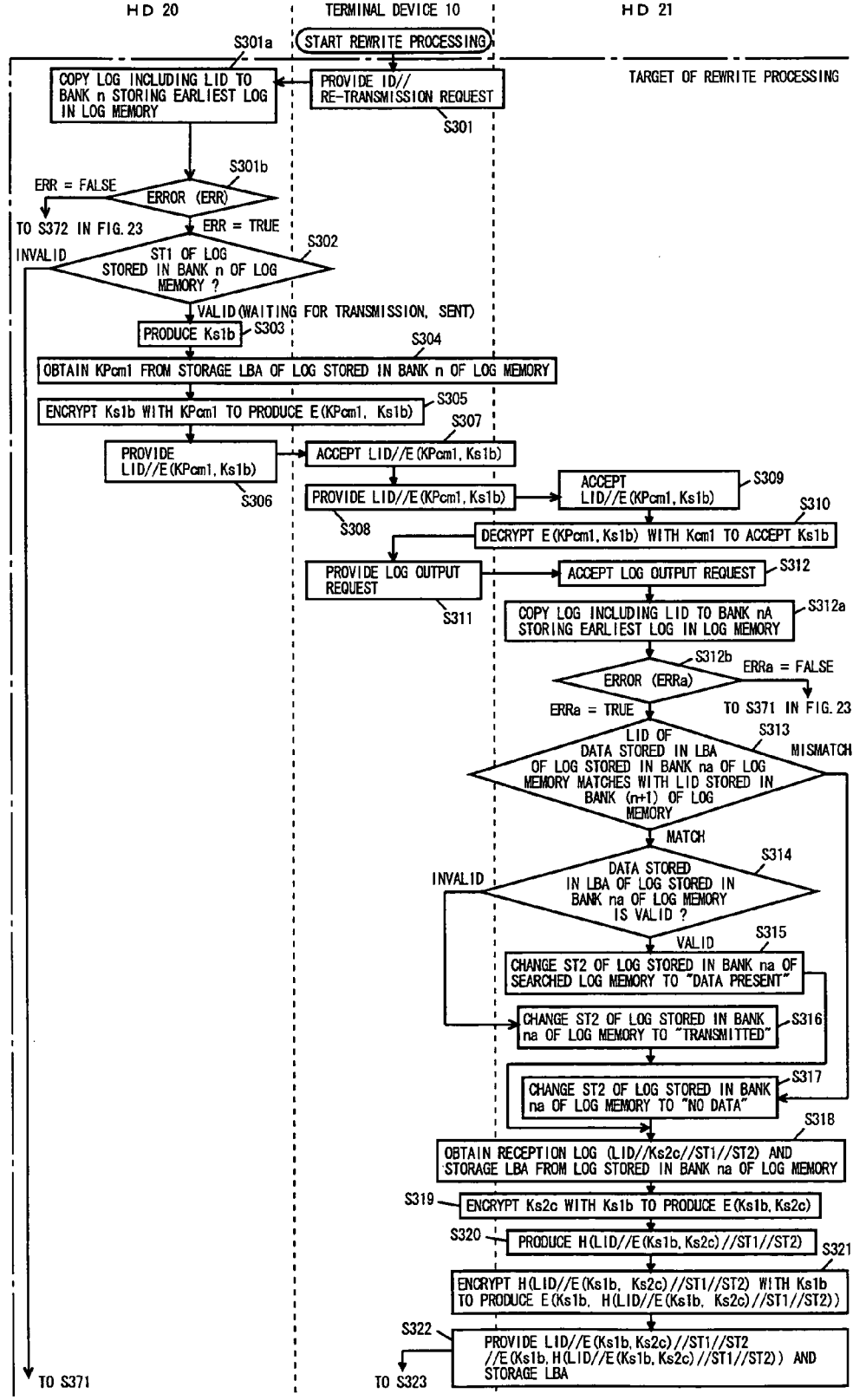
FIG. 21 is a first flowchart in the first embodiment for illustrating rewrite processing during the copy or shift processing in the system shown in FIG. 17.
Figure 22:
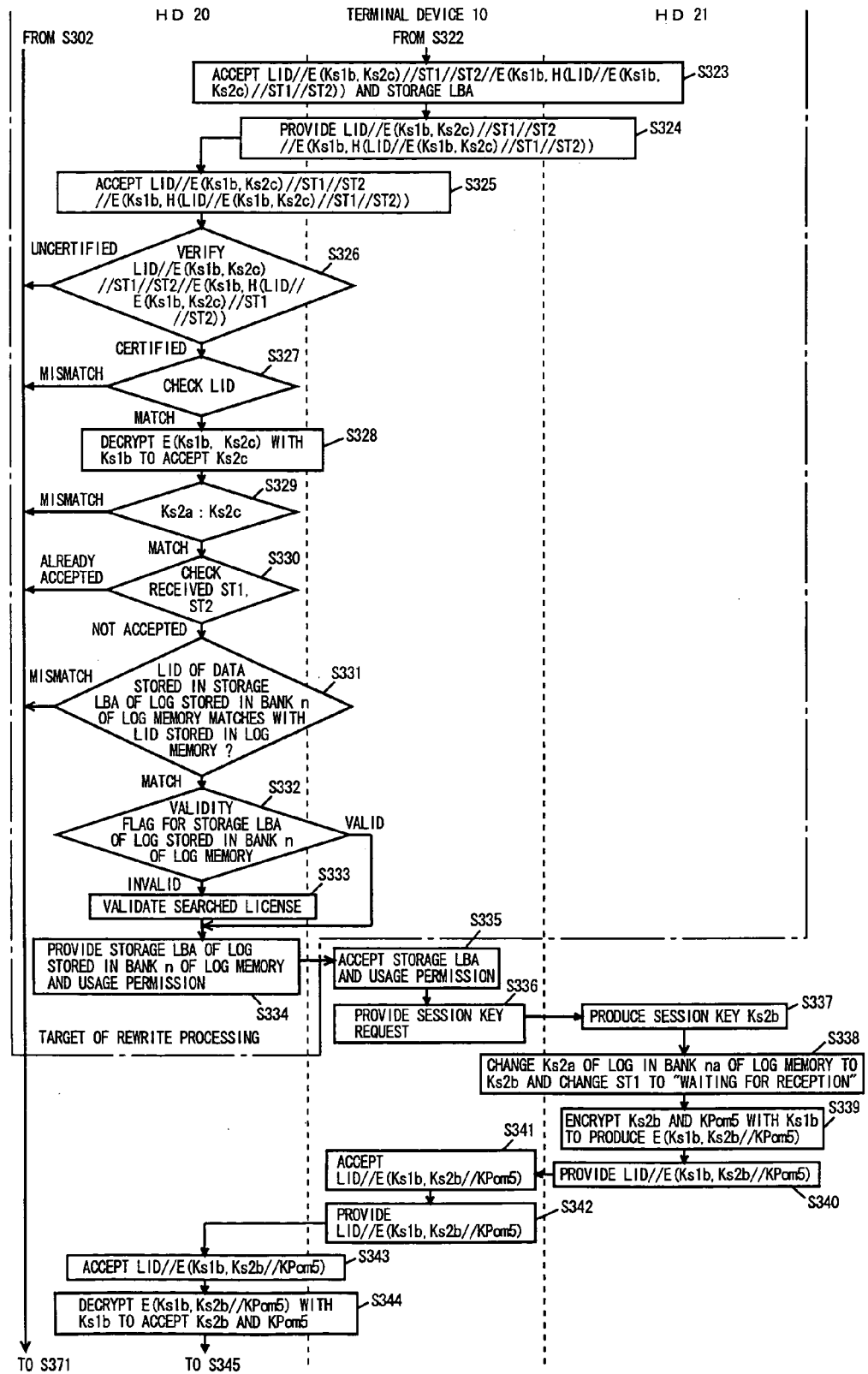
FIG. 22 is a second flowchart in the first embodiment for illustrating rewrite processing during the copy or shift processing in the system shown in FIG. 17.
Figure 23:
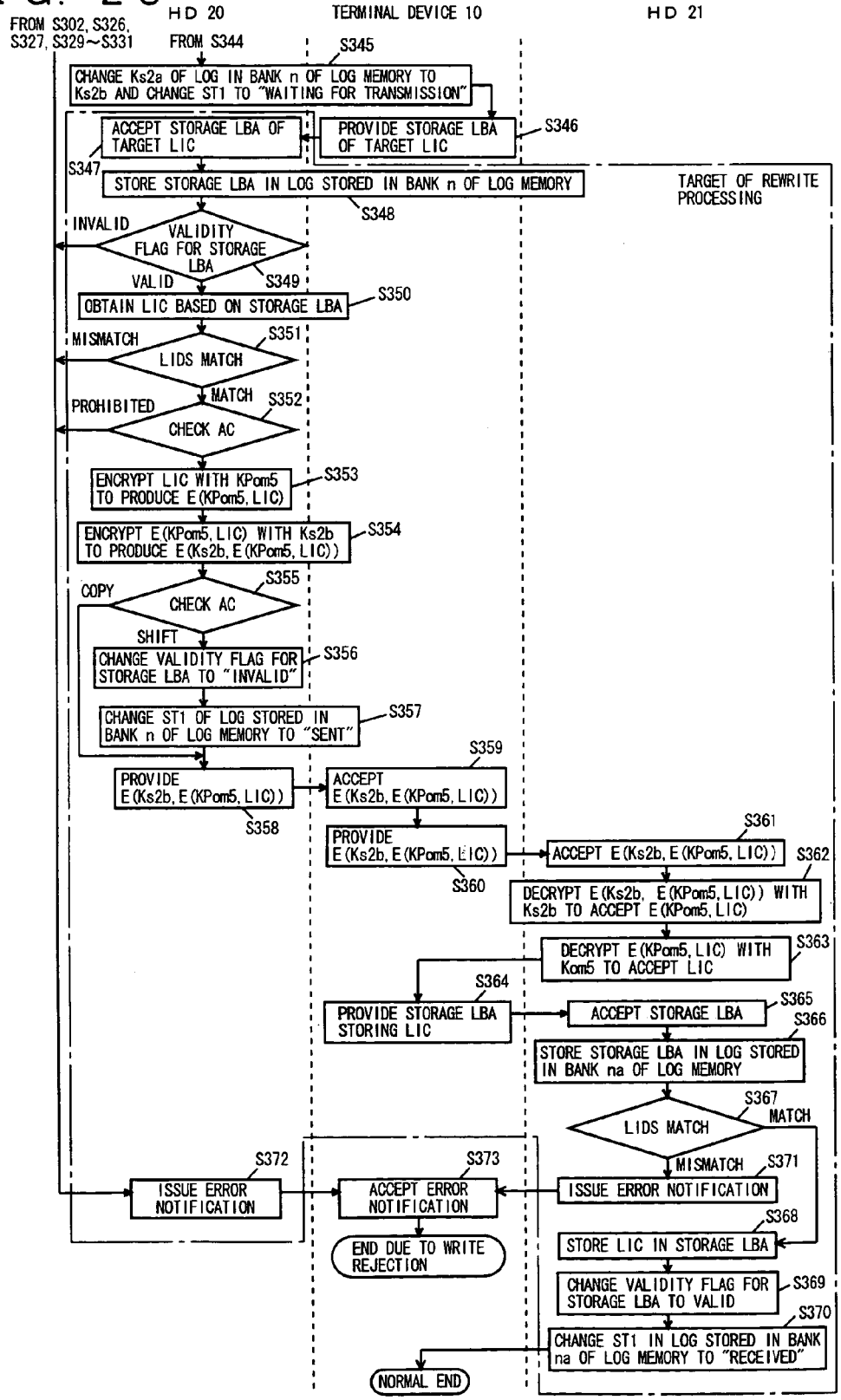
FIG. 23 is a third flowchart in the first embodiment for illustrating rewrite processing during the copy or shift processing in the system shown in FIG. 17.

FIGS. 21 to 23 are first to third flowcharts, respectively. These flowcharts illustrate the rewrite processing performed when a failure occurred during processing from step S227 to step S252 in the processing flow of the copy/shift session illustrated in FIGS. 18 and 19.

Referring to FIG. 21, when terminal device 10 determines that a failure occurred during the processing from step S227 to step S252, it provides license ID (LID) and a request for retransmitting license LIC as the data series of LID//(re-transmission request) to hard disk 20 (step S301). Controller 214 of hard disk 20 accepts LID//(re-transmission request) via terminal 210 and ATA interface portion 212 (step S301a), and copies the log (301b). In this copying processing, it is determined whether log memory 253 stores the log including the LID accepted in step S301a or not. If stored, the log including the LID accepted in step S301a is copied to bank n storing the earliest log in log memory 253, and variable ERR is set to "false". If log memory 253 does not store the log including the LID accepted in step S301a, variable ERR is set to "true". Specific operations in this copy processing are performed in accordance with the flowchart of FIG. 16.

Controller 214 determines the result of processing in step S301a, and thus determines whether variable ERR is "true" or "false" (step S301b). If it is "true", this represents that the log including the accepted LID was copied to bank n. Therefore, the processing moves to a next step S302 for starting the processing in response to the re-transmission request. If it is "false", this represents that the log including the accepted LID was not stored in log memory 253, and thus input/output processing of license LIC specified by the accepted LID was not performed in hard disk 20. Therefore, it is determined that it is impossible to respond to the re-transmission request, and next processing is performed in a step S372 in FIG. 23 to issue the error notification to terminal device 10. When terminal device 10 accepts the error notification (step S373), the processing ends.

In hard disk 20, when it is determined in step S301b that variable ERR is "false", controller 214 confirms the state of status ST1 of the log, which is copied to and stored in bank n of log memory 253 (step S302). When status ST1 is neither "waiting for transmission" nor "transmitted", i.e., when it is not on the transmission side of the license in the copy/shift session, controller 214 performs the next processing in a step S371 illustrated in FIG. 23.

When status ST1 is "waiting for transmission" or "transmitted", controller 214 of hard disk 20 instructs session key generating portion 226 to produce the session key, and session key generating portion 226 produces session key Ks1$b$ (step S303). When session key Ks1$b$ is produced, controller 214 obtains class public key KPcm1 of hard disk 21, which is the destination of shift/copy of license LIC and was accepted before the interruption, from the log stored in bank n of log memory 253 (step S304). In the above processing, class public key KPcm1 stored in the log is used without accepting class certificate Imc1 from hard disk 21, i.e., the destination of shift/copy again. The purpose of this is to prevent leakage of license LIC due to spoofed attack in the rewrite processing. For accepting class certificate Imc1 again, it is necessary to determine whether the class certificate accepted in the interrupted processing is the same as the class certificate accepted in the rewrite processing or not. For example, the class public key, which is included in class certificate Imc1 accepted in the rewrite processing, is compared with the class public key recorded in the log, and thereby it is determined whether the rewrite processing is to be performed or not.

In hard disk 20, encryption processing portion 222 encrypts session key Ks1$b$ with class public key KPcm1 to produce encrypted data E(KPcm1, Ks1$b$) (step S305). Controller 214 provides encrypted data E(KPcm1, Ks1$b$) thus produced to terminal device 10 via ATA interface portion 212 and terminal 210 as data series LID//E(KPcm1, Ks1$b$) (step S306).

Terminal device 10 accepts encrypted data LID//E(KPcm1, Ks1$b$) (step S307), and provides accepted LID//E(KPcm1, Ks1$b$) to hard disk 21 (step S308).

Controller 214 of hard disk 21 accepts LID//E(KPcm1, Ks1$b$) via terminal 210 and ATA interface portion 212 (step S309), and provides E(KPcm1, Ks1$b$) to decryption processing portion 230 via bus BS3. Decryption processing portion 230 performs the decryption with class private key Kcm1, which is peculiar to hard disk 21 and is held by Kcm holding portion 204, to obtain and accept session key Ks1$b$ (step S310).

When controller 214 of hard disk 21 confirms the acceptance of session key Ks1$b$ produced by hard disk 20, it notifies terminal device 10 of the acceptance via ATA interface portion 212 and terminal 210. When controller 108 of terminal device 10 accepts the notification transmitted from hard disk 21 via hard disk interface portion 110 and bus BS2, it issues a request, which requests output of the log stored in log memory 253 of hard disk 21 to hard disk 20, to hard disk 21 via bus BS2 and hard disk interface portion 110 (step S311). Controller 214 of hard disk 21 accepts the output request for the log via terminal 210 and ATA controller 212 (step S312). Similarly to step S301$a$ in hard disk 20, copying of the log is performed (step S312$a$). In this copying operation, it is determined whether log memory 253 has stored the log including the LID accepted in step S309 or not. If stored, the stored log including the LID is copied to bank na storing the earliest log in log memory 253, and a variable ERRa is set to "false". If log memory 253 has not stored the log including LID accepted in step S309, variable ERRa is set to "true". Specific operations in step S312$a$ are performed in accordance with the flowchart of FIG. 16. For distinguishing the processing in hard disk 21 from the results of similar processing in hard disk 20, variable n is represented as variable na, and variable ERR is represented as variable ERRa. Thus, in the flowchart of FIG. 12 corresponding to step S112$b$ in FIG. 16, variable n is replaced with variable na, and variable ERR is replaced with variable ERRa.

Controller 214 determines the results of processing in step S312$a$, and thus determines whether ERRa is "true" or "false" (step S312$b$). If the result is "false", this represents that the log including accepted LID was copied to bank na so that the operation moves to a next step S313 for starting the processing responding to the re-transmission request. If the result is "true", this represents that the log including accepted LiD was not stored in log memory 253, and thus hard disk 21 did not perform the input/output processing of license LIC specified by LID accepted in step S313. Therefore, it is determined that it is impossible to respond to the re-transmission request, and the next processing is performed in step S371 in FIG. 23 to issue an error notification to terminal device 10. When the error notification is accepted in terminal device 10 (step S373), the processing ends.

In hard disk 21, when it is determined in step S312$b$ that ERRa is "false", controller 214 determines whether license ID (LID) of license LIC stored in the region, which corresponds to the storage LBA of the log stored in bank na of log memory 253, matches with license ID (LID) of the log stored in bank na of log memory 253 or not (step S313).

When these license IDs (LID) match with each other, controller 214 further checks the flag in validity flag region 252 corresponding to the storage LBA of the log, which is stored in bank na of log memory 253, and determines whether license LIC is valid or invalid (step S314). When the flag in validity flag region 252 is "valid", controller 214 changes status ST2 of the log stored in bank na of log memory 253 to "data present" (step S315), and next processing starts in a step S318. When the flag in validity flag region 252 is "invalid", controller 214 changes status ST2 of the log, which is stored in bank na of log memory 253, to "transmitted" (step S316), and next processing starts in step S318.

When license IDs (LID) do not match in step S313, controller 214 changes status ST2 of the log, which is stored in bank na of log memory 253, to "no data" (step S317).

When status ST2 changes, controller 214 obtains license ID (LID), statuses ST1 and ST2, session key Ks2$c$ and storage LBA from bank na of log memory 253 (step S318). In this case, session key Ks2$a$ is stored in the log of the current processing stored in log memory 253 of hard disk 21 because the current processing is performed in connection with the interruption of the distribution session according to the flowcharts of FIGS. 9 and 10, but session key Ks2$c$ obtained from bank n of log memory 253 is illustrated for the sake of description. Controller 214 provides session key Ks2$c$ thus obtained to encryption processing portion 224 via bus BS3.

Encryption processing portion 224 encrypts session key Ks2$c$ with session key Ks1$b$, which is applied from decryption processing portion 230 via contact Pb of selector switch 260, and produces E(Ks1$b$, Ks2$c$) (step S319). Encryption processing portion 224 provides E(Ks1$b$, Ks2$c$) thus produced onto bus BS3. Controller 214 accepts E(Ks1$b$, Ks2$c$) on bus BS3, produces one reception log LID//E(Ks1$b$, Ks2$c$)//ST1//ST2 from E(Ks1$b$, Ks2$c$) and the data obtained in step S318, and produces hash value H(LID//E(Ks1$b$, Ks2$c$)//ST1//ST2) (step S320). Controller 214 provides hash value H(LID//E(Ks1$b$, Ks2$c$)//ST1//ST2) to encryption processing portion 224 via bus BS3.

Encryption processing portion 224 encrypts hash value H(LID//E(Ks1$b$, Ks2$c$)//ST1//ST2) obtained from bus BS3 with session key Ks1$b$, which is applied from decryption processing portion 230 via contact Pb of selector switch 260, to produce signed data E(Ks1$b$, H(LID//E(Ks1$b$, Ks2$c$)//ST1//ST2)) (step S321). Encryption processing portion 224 provides E(Ks1$b$, H(LID//E(Ks1$b$, Ks2$c$)//ST1//ST2)) thus produced onto bus BS3.

When controller 214 obtains the signed data from bus BS3, it produces signed reception log LID//E(Ks1$b$, Ks2$c$)//ST1//ST2//E(Ks1$b$, H(LID//E(Ks1$b$, Ks2$c$)//ST1//ST2)) using the reception log obtained in step S318, and provides it and the storage LBA to terminal device 10 via ATA interface portion 212 and terminal 210 (step S322).

Referring to FIG. 22. When terminal device 10 accepts signed reception log LID//E(Ks1$b$, Ks2$c$)//ST1//ST2//E(Ks1$b$, H(LID//E(Ks1$b$, Ks2$c$)//ST1//ST2)) and the storage LBA from hard disk 21 (step S323), it provides the accepted data to hard disk 20 (step S324).

When controller 214 of hard disk 20 accepts signed reception log LID//E(Ks1$b$, Ks2$c$)//ST1//ST2//E(Ks1$b$, H(LID//E(Ks1$b$, Ks2$c$)//ST1//ST2)) (step S325), it verifies the signed reception log thus accepted (step S326). The verifying processing is performed as follows.

When controller 214 of hard disk 20 accepts the signed reception log, it provides the second half of the signed reception log thus accepted, i.e., signed data E(Ks1$b$, H(LID//E(Ks1$b$, Ks2$c$)//ST1//ST2)) to decryption processing portion 228, and instructs session key generating portion 226 to generate session key Ks1$b$. Decryption processing portion 228 decrypts signed data E(Ks1$b$, H(LID//E(Ks1$b$, Ks2$c$)//ST1//ST2)) with session key Ks1$b$ produced. Controller 214 of hard disk 20 calculates the hash value of the first half of the signed reception log, i.e., reception log LID//E(Ks1$b$, Ks2$c$)//ST1//ST2, and compares it with the hash value extracted by decryption processing portion 228. When controller 214 of hard disk 20 determines from that the two hash values matched, it is certified in hard disk 20 that the reception log received from hard disk 21 includes the correct data.

When the reception log is certified in step S326, controller 214 of hard disk 20 compares license ID (LID) included in the reception log certified in step S325 with license ID (LID) stored in bank n of log memory 253 (step S327).

When these license IDs (LID) match with each other, controller 214 provides encrypted data E(Ks1b, Ks2c) included in the reception log to decryption processing portion 228, and decryption processing portion 228 decrypts it with session key Ks1b, which is received from session key generating portion 226, to accept session key Ks2c (step S328). Session key Ks2c obtained by the decryption is provided to controller 214 via bus BS3. Then, controller 214 compares session key Ks2a, which was being used when a failure occurred, and thus is recorded in the log of bank n, with currently session key Ks2c included in the currently approved reception log (step S329). When controller 214 determines that matching occurs between session keys Ks2a and Ks2c, it checks the contents of accepted statuses ST1 and ST2 (step S330).

When status ST1 of the received reception log is "waiting for reception" and status ST2 of the reception log is "no data", controller 214 of hard disk 20 determines that license LIC, which was to be transmitted to hard disk 21, is not accepted by hard disk 21 due to a certain failure. Thereby, controller 214 of hard disk 20 further determines whether license ID (LID) of license LIC, which is stored in the storage LBA of the log stored in bank n of log memory 253, matches with license ID (LID) of the log stored in bank n of log memory 253 or not (step S331). When these license IDs (LID) match with each other, controller 214 of hard disk 20 checks the flag in validity flag region 252 corresponding to the storage LBA of the log stored in bank n of log memory 253, and determines whether the license LIC is valid or not (step S332). When the flag in validity flag region 252 is "invalid", controller 214 changes the flag in validity flag region 252 to "valid" (step S333). When the flag in validity flag region 252 is "valid", controller 214 starts next processing in a step S334. Controller 214 provides the storage LBA of the log in bank n of log memory 253 as well as usage permission to terminal device 10 via ATA interface portion 212 and terminal 210 (step S334).

When controller 108 of terminal device 10 receives the storage LBA, at which target license LIC is to be stored, from hard disk 20 via hard disk interface portion 110 and bus BS2 (step S335), controller 108 issues a request notification for production of the session key to hard disk 21 via bus BS2 and hard disk interface portion 110 (step S336).

When hard disk 21 accepts the production request notification for the session key provided from terminal device 10, it produces session key Ks2b (step S337), and changes session key Ks2c (Ks2a) stored in the log of bank na in log memory 253 to session key ks2b. Also, it changes status ST1 of the log to "waiting for reception" (step S338).

A series of processing starting from a step S339 is performed similarly to the series of processing from step S219 to the end illustrated in FIGS. 18 and 19 except for that session key Ks2b is newly produced and used in stead of session key Ks2a. Therefore, the series of processing following step S339 will not be described.

However, the processing may be ended after step S335 to leave the license on hard disk 20. In this case, the license can be shifted again in accordance with the flowcharts of FIGS. 18 and 19.

In connection with the interruption of the rewrite processing during the shifting or writing of the license according to the flowcharts of FIGS. 21-23, when the processing is interrupted in any one of steps S301-S344 and steps S347-S371, the rewrite processing can be performed in accordance with the flowcharts of FIGS. 21-23 again. When the processing is interrupted in any one of steps S325-S346, the processing of shifting or copying the license may be performed by starting it from the initial step according to the flowcharts of FIGS. 18 and 19, and thereby the processing can be resumed.

In this manner, in connection with the copying or shifting of the license between the plurality of hard disks attached to terminal device 10, processing is performed by determining that class certificate Cm1 received from hard disk 21, i.e., the destination of shifting or copying is valid, and the encryption keys (session keys) are produced by and are transmitted between the respective hard disks, between which the copying or shifting of the licenses are performed with class public key KPcm1 transmitted together with class certificate Cm1 including it. Each hard disk performs the encryption with the encryption key thus received, and transmits the encrypted data to the opposite party. Thereby, it is possible to prohibit the unauthorized copying and shifting of the license to the hard disk. Further, the mutual certification can be practically performed in the processing of transmitting and receiving the encrypted data. Thereby, it is possible to protect the license from spoofing of the destination, and the security of the system can be improved.

Further, when the interruption occurs in the copy/shift session for the license, processing is performed similarly to that in the distribution session, and thus is performed as follows. The reception log for license LIC, which is to be handled by the copy/shift session in hard disk 21, i.e., the data storage device on the reception side, is transmitted to hard disk 20, i.e., the data storage device on the transmission side, and the processing is performed in hard disk 20 to perform comparison of the contents of the log stored in log memory 253 of hard disk and license LIC, which is stored in secure data storage portion 250 and is specified by the LBA stored in this log. Further, the flag stored in validity flag region 252 is referred to. Thereby, in the case where the interrupted copy/shift session is the processing of shifting the license, the rewrite processing can be performed safely without allowing overlap or double existence of licenses, which can be used in the two data storage devices, i.e., hard disks 20 and 21.

As described above, the invention provides the data storage device and the processing manners or procedures, which can perform rapid processing while avoiding the loss of license LIC due to the interruption of the copy/shift session, and also provides the data storage device and the processing manners or procedures, which can achieve safe processing and reliable copyright protection even when the rewrite processing is to be performed.

Processing steps S202, S203, S214, S215, S217-S220, S241-S243, S245-S251, S309, S310, S312-S322, S337-S340, S361-S363 and S365-S371 of hard disk 21 in FIGS. 18-23 are the same as processing steps S2, S3, S16, S17, S19-S22, S33-S35, S37-S43, S109, S110, S112-S122, S136-S139, S150-S152 and S154-S1160 of hard disk 20 in FIGS. 9, 10, 13-15, respectively. Thus, the processing of hard disk 21 for shifting or copying the license is the same as the processing of hard disk 20 for distributing the license. These kinds of processing are all performed in the data storage devices, i.e., hard disks 20 and 21 as the processing for writing the licenses in the data storage devices.

[Usage Permission]

Referring to FIG. 5 again, hard disk 20 serving as the data storage device is attached to terminal device 10 provided with reproduction circuit 150 for reproducing the content data, and hard disk 20 gives the permission of use of the content data to reproduction circuit 150 in terminal device 10.

Figure 24:
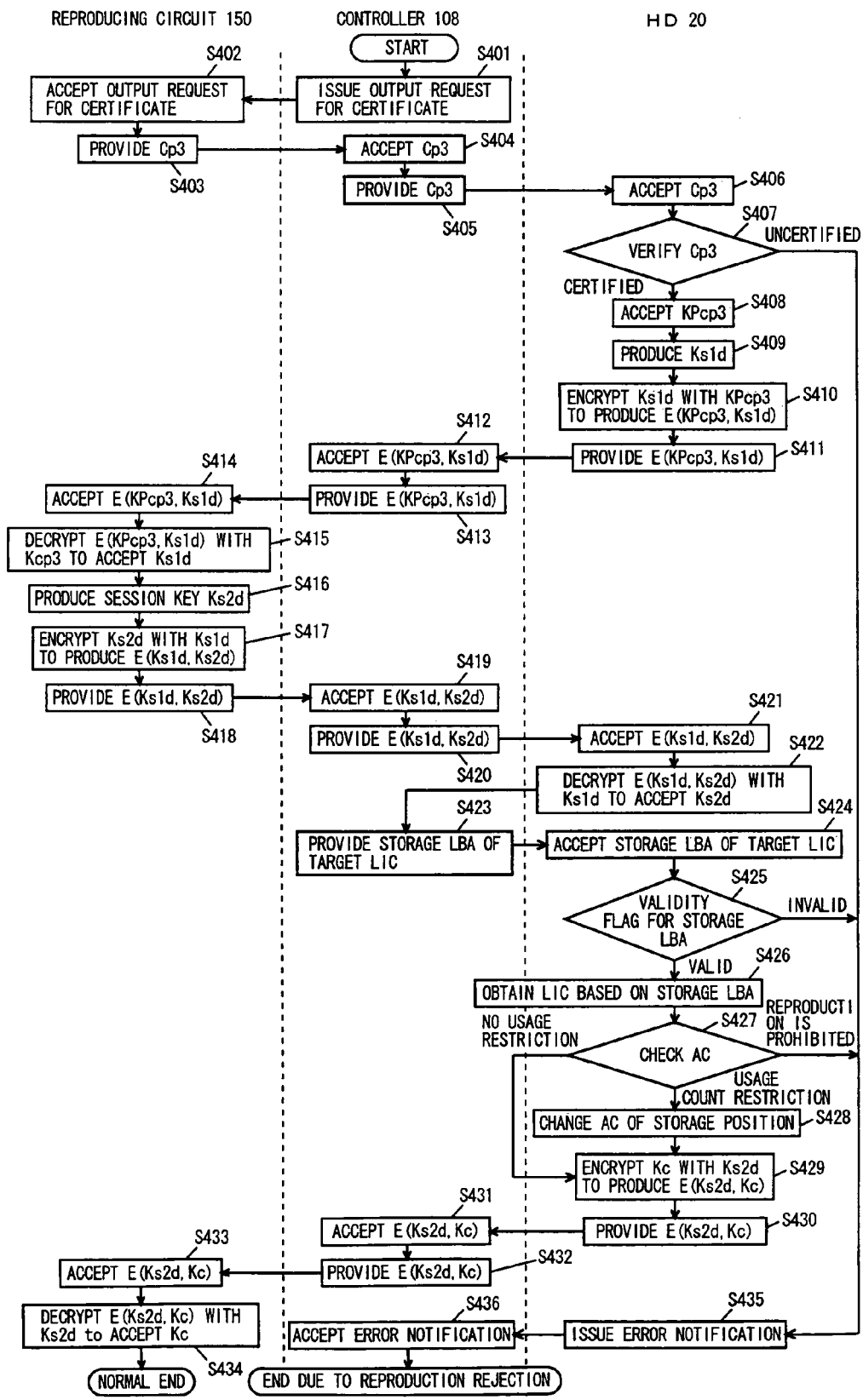
FIG. 24 is a flowchart for illustrating usage permission processing for a terminal device shown in FIG. 5.

FIG. 24 is a flowchart illustrating processing (usage permission session), in which the user of terminal device 10 provides a reproduction request for the encrypted content data from terminal device 10, and thereby hard disk 20 attached to terminal device 10 gives the permission of use to reproduction circuit 150 in terminal device 10.

Referring to FIG. 24, when the user of terminal device 10 requests the reproduction of the intended content data, controller 108 of terminal device 10 issues an output request for the class certificate to reproduction circuit 150 via bus BS2 (step S401). When verification data holding portion 1502 in reproduction circuit 150 receives the output request for the class certificate from bus BS2 (step S402), it provides class certificate Cp3=KPcp3//Icp3//E(Ka, H(KPcp3//Icp3)) held thereby onto bus BS2 (step S403).

Controller 108 accepts class certificate Cp3 transmitted from bus BS2 (step S404), and provides accepted class certificate Cp3 to hard disk 20 via bus BS2 and hard disk interface portion 110 (step S405).

Hard disk 20 accepts class certificate Cp3 transmitted from terminal device 10 (step S406), and verifies whether accepted class certificate Cp3 is correct or not (step S407). The verifying processing is performed in the same manner as that already described in connection with step S207 in the copy/shift session, and therefore description thereof is not repeated.

When it is determined in step S407 that class certificate Cp3 is correct, controller 214 approves class certificate Cp3, and accepts class public key KPcp3 included in class certificate Cp3 (step S408). Next processing is then performed in a step S409. When class certificate Cp3 is not correct, controller 214 does not approve class certificate Cp3, and issues an error notification to terminal device 10 without accepting class certificate Cp3 (step S435). When terminal device 10 accepts the error notification (step S436), the usage permission session ends.

When class public key KPcp3 is accepted in step S408, session key generating portion 226 of hard disk 20 produces session key Ks1$d$ (step S409). Encryption processing portion 222 encrypts session key Ks1$d$ with accepted class public key KPcp3 to produce encrypted data E(KPcp3, Ks1$d$) (step S410).

Controller 214 receives encrypted data E(KPcp3, Ks1$d$) from encryption processing portion 222 via bus BS3, and provides it to terminal device 10 via ATA interface portion 212 and terminal 210 (step S411).

In terminal device 10, controller 108 accepts encrypted data E(KPcp3, Ks1$d$) via hard disk interface portion 110 and bus BS2 (step S412), and controller 108 provides encrypted data E(KPcp3, Ks1$d$) thus accepted to reproduction circuit 150 via bus BS2 (step S413). Decryption processing portion 1506 of reproduction circuit 150 accepts encrypted data E(KPcp3, Ks1$d$) from bus BS2 (step S414), and performs the decryption with class private key Kcp3, which is held by Kcp holding portion 1504 and is peculiar to reproduction circuit 150, to produce and accept session key Ks1$d$ (step S415).

When session key Ks1$d$ is accepted, session key generating portion 1508 produces a session key Ks2$d$ (step S416), and provides session key Ks2$d$ thus produced to encryption processing portion 1510. Encryption processing portion 1510 encrypts session key Ks1$d$ received from decryption processing portion 1506 with session key Ks2$d$ to produce encrypted data E(Ks1$d$, Ks2$d$) (step S417). Encryption processing portion 1510 provides encrypted data E(Ks1$d$, Ks2$d$) onto bus BS2 (step S418).

Controller 108 accepts encrypted data E(Ks1$d$, Ks2$d$) from bus BS2 (step S419), and provides the accepted data to hard disk 20 via bus BS2 and hard disk interface portion 110 (step S420).

Controller 214 of hard disk 20 accepts encrypted data E(Ks1$d$, Ks2$d$) via terminal 210 and ATA interface portion 212 (step S421), and provides the accepted data onto bus BS3. Decryption processing portion 228 decrypts encrypted data E(Ks1$d$, Ks2$d$) provided onto bus BS3 with session key Ks1$d$ applied from session key generating portion 226, and session key Ks2$d$ is accepted in hard disk 20 (step S422). When session key Ks2$d$ is accepted, controller 214 issues the notification of the acceptance to terminal device 10 via ATA interface portion 212 and terminal 210.

When controller 108 of terminal device 10 receives, via hard disk interface portion 110 and bus BS2, the notification that session key Ks2$d$ is accepted in hard disk 20, it provides the LBA, at which secure data storage portion 250 stores target license LIC corresponding to the requested content data, to hard disk 20 via bus BS2 and hard disk interface portion 110.

When controller 214 of hard disk 20 accepts the LBA of target license LIC via terminal 210 and ATA interface portion 212 (step S424), it determines whether the flag of validity flag region 252 corresponding to license LIC stored at the accepted LBA is "valid" or "invalid" (step S425).

When the flag in validity flag region 252 is "valid", controller 214 obtains target license LIC from secure data storage portion 250 based on the accepted LBA (step S426). Controller 214 determines the contents of control information AC included in obtained license LIC (step S427). If control information AC designates the number of allowed times of use, controller 214 increments the number of allowed times of use by one, and next processing is performed in a step S429. If control information AC does not restrict the times of reproduction, controller 214 provides content key Kc included in obtained license LIC onto bus BS3.

Encryption processing portion 224 encrypts content key Kc, which is provided onto bus BS3, with session key Ks2$d$ received from decryption processing portion 228 to produce encrypted data E(Ks2$d$, Kc) (step S429), and provides the data thus produced onto bus BS3. Controller 214 provides encrypted data E(Ks2$d$, Kc) from bus BS3 to terminal device 10 via ATA interface portion 212 and terminal 210 (step S430).

Controller 108 of terminal device 10 accepts encrypted data E(Ks2$d$, Kc) via hard disk interface portion 110 and bus BS2 (step S431), and provides the accepted data onto bus BS2 (step S432).

When decryption processing portion 1512 of reproduction circuit 150 accepts encrypted data E(Ks2$d$, Kc) from bus BS2 (step S433), it decrypts encrypted data E(Ks2$d$, Kc) with session key Ks2$d$ applied from session key generating portion 1508. Thereby, reproduction circuit 150 accepts content key Kc (step S434), and the series of processing of usage permission session normally ends.

When the flag of validity flag region 252 is "invalid" in a step S425, or when contents in control information AC cannot be reproduced in a step S427, controller 214 issues an error notification to terminal device 10 (step S435), and terminal device 10 accepts the error notification (step S436) so that the usage permission session ends.

As described above, in connection with the usage permission given from the data storage device, i.e., hard disk 20 to reproduction circuit 150 in terminal device 10, content key Kc is likewise transmitted to reproduction circuit 150 after confirming that reproduction circuit 150 holds correct class certificate Cp3 and that class public key KPcp3 transmitted together with class certificate Cp3 including it is valid. Thereby, unauthorized reproduction of the content data can be prohibited.

Although not illustrated in the flowcharts, when reproduction circuit 150 is permitted to reproduce the content, and accepts content key Kc, decryption processing portion 1514 decrypts encrypted content data E(Kc, Dc) provided from hard disk 20, and reproducing portion 1516 reproduces data Dc obtained by decryption processing portion 1514 so that D/A converter 1518 performs digital-to-analog conversion to provide reproduction signals to terminal 1520 connected to a monitor or a speaker.

As described above, hard disk 20 achieves the following five kinds of processing by the cypher technique for performing the storage and management of input/output while safely protecting the license from leakage:

(1) Write processing of receiving and storing the license provided from another device (license providing device or another hard disk) (i.e., processing of hard disk 20 in FIGS. 9 and 10, and processing of hard disk 21 in FIGS. 21-23).

(2) Rewrite processing performed by resuming the interrupted write processing (i.e., processing of hard disk 20 in FIGS. 13-15, and processing of hard disk 21 in FIGS. 21-23).

(3) Providing processing of shifting or copying the license to another hard disk (i.e., processing of hard disk 20 in FIGS. 16-18).

(4) Re-providing processing performed by resuming the shift/copy processing after interruption of the providing processing (rewrite processing as a provider of the license, and processing of hard disk 20 in FIGS. 21-23).

(5) Usage permission processing of providing content key Kc to the reproduction circuit for the purpose of decrypting the encrypted content data (i.e., processing of hard disk 20 in FIG. 24).

All the description already given relates to the license for the content data. However, the target is not limited to the foregoing license, and may be expanded to general classified data to be handled under confidentiality. This is because the foregoing means and manners can protect the confidentiality of data, and can achieve the object of the invention relating to the specifying of the classified data in the data storage device.

Second Embodiment

In the first embodiment already described, the operations are performed as follows. Before hard disk 20 starts the rewrite processing illustrated by flowcharts of FIGS. 13-15 as well as re-providing processing illustrated by flowcharts of FIGS. 21-23, hard disk 20 retrieves the last log for the license to be handled in the rewriting/re-providing processing for determining whether the processing is allowed or not. When the corresponding log is retrieved, the retrieved log is copied to bank n of log memory 253, and the log thus stored in the bank n will be updated in accordance with the processing procedures of the subsequent processing.

In the rewrite processing, however, the copied log is output to the license providing side as the log for the last processing, and then the contents of the log will be rewritten in step S137 in FIG. 14. The copying of the log is performed because of such characteristics of log memory 253 that the logs are circulatively used in the order from the bank storing the old log toward the bank storing the newer log, and the purpose of copying the log is to hold the log corresponding to the rewrite processing for a longer duration in log memory 253 even at the time of initial interruption of the rewrite processing (in or before step S136 in FIG. 14).

Accordingly, in the hard disk provided with log memory 253 having a sufficiently large capacity, the rewrite processing may be configured to output directly the retrieved log from the bank storing it without copying the retrieved log. In this case, the change (steps S115, S116 and S117) of status ST2 is effected on the log of the bank in question so that the log to be output is obtained in step S118 from the bank in question.

Since the log is not copied, the bank for storing the log corresponding to the rewrite processing is ensured in step S137 in FIG. 14. Therefore, step S137 is changed to "store new log in bank na storing the earliest log in the log memory".

Processing in hard disk 21 can be changed similarly. All the other processing is the same as that in the first embodiment. The above change in processing does not cause any change in safety of the license, and the effects similar to those in the first embodiment can be achieved.

Third Embodiment

Similarly to the rewrite processing of the license, it is possible in the re-providing processing of the license to determine whether the re-providing is allowed or not, by directly reading the retrieved log from the bank storing it without copying the retrieved log. This can be achieved by changing the processing such that the copying in step S301a in FIG. 21 is not performed, and the log retrieved in step S302 in FIG. 21 and steps S329, S331 and S332 in FIG. 22 is obtained directly from the bank storing it. Processing other than the above is the same as that in the first embodiment.

This change in processing does not cause any change in safety of the license, and the same effects as those in the first embodiment can be achieved. Also, this can be combined with the second embodiment.

Fourth Embodiment

For reducing the processing in hard disk 20, it is desired that commonality is achieved between the normal write processing and the rewrite processing to a higher extent. Therefore, commonality is provided among the processing of hard disk 20 in and after "session key request" in the first embodiment, i.e., the normal write processing (steps S19-S22 in FIG. 9, and steps S33-S35 and S38-S43 in FIG. 10) and the rewrite processing (steps S136-S139 in FIG. 14, and steps S150-S152 and S154-S160 in FIG. 15). In this case, the commonality can be easily achieved by employing the same processing in step S20 in FIG. 9 and step S137 in FIG. 14.

In this case, the same processing is performed in steps S137 and S20 to "store new log in bank nb storing the earliest log in the log memory". The specific processing is performed according to flowcharts of FIGS. 11 and 12 except for that variable n is replaced with variable nb. The purpose of this replacement of variable n with variable nb is to distinguish the variable from variable n in the processing in and before step S137 in FIGS. 13 and 14. Thereby, each bank n is replaced with bank nb in steps S154, S155 and S159 after step S137 in FIGS. 14 and 15.

Likewise, in the shift/copy session, the processing in and after steps S342 in the flowcharts of FIGS. 21-23 differs from the processing in and after step S222 in the flowcharts of FIGS. 16-18 only in the recording of the log (only in step S345 in FIG. 23 and step S225 in FIG. 18). Since the processing in step S345 in FIG. 23 is the same as that in step S225 in FIG. 18, this facilitates the implementation of hard disk 20. In this case, the same processing as that in step S20 is performed in step S345 to "store new log in bank nb storing the earliest log in log memory". Specific processing can be performed according to the flowcharts of FIGS. 20 and 12, although variable n is replaced with variable nb. The purpose of this replacement of variable n with variable nb is to distinguish the variable from variable n in the processing in and before step S245 in FIGS. 21 and 22. Thereby, each bank n is replaced with bank nb in all steps S348 and S57 after step S345 in FIG. 23.

Processing other than the above is the same as that in the first embodiment. The change in processing does not cause any change in safety of the license, and the same effect as the first embodiment can be achieved. Also, the processing in hard disk 21 can be changed similarly.

By providing the commonality between the normal write processing and the rewrite processing, it is possible to reduce the amount of implemented processing while achieving the safe management of the license similarly to the first embodiment.

Fifth Embodiment

Description will now be given on a fifth embodiment. For clarifying the record start timing of the log, the fifth embodiment is configured to accept license IDs (LID) externally with respect to the hard disk in all the processing so that one bank is ensured in log memory 253, and the log for this processing is record therein.

A distribution operation of the license in the fifth embodiment will now be described.

Figure 25:
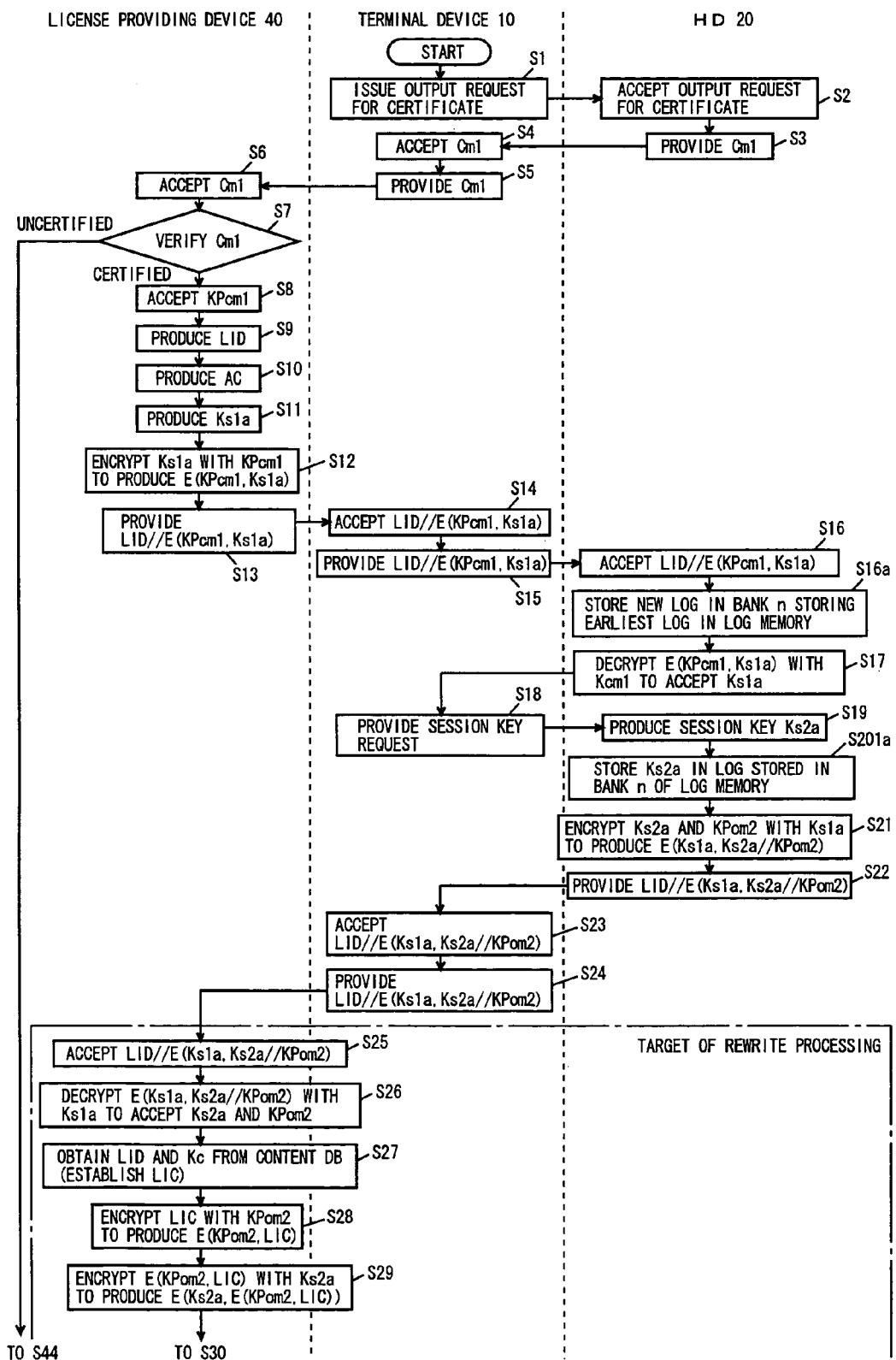
FIG. 25 is a first flowchart in a fifth embodiment for illustrating distribution processing in the data distribution system shown in FIG. 1.
Figure 26:
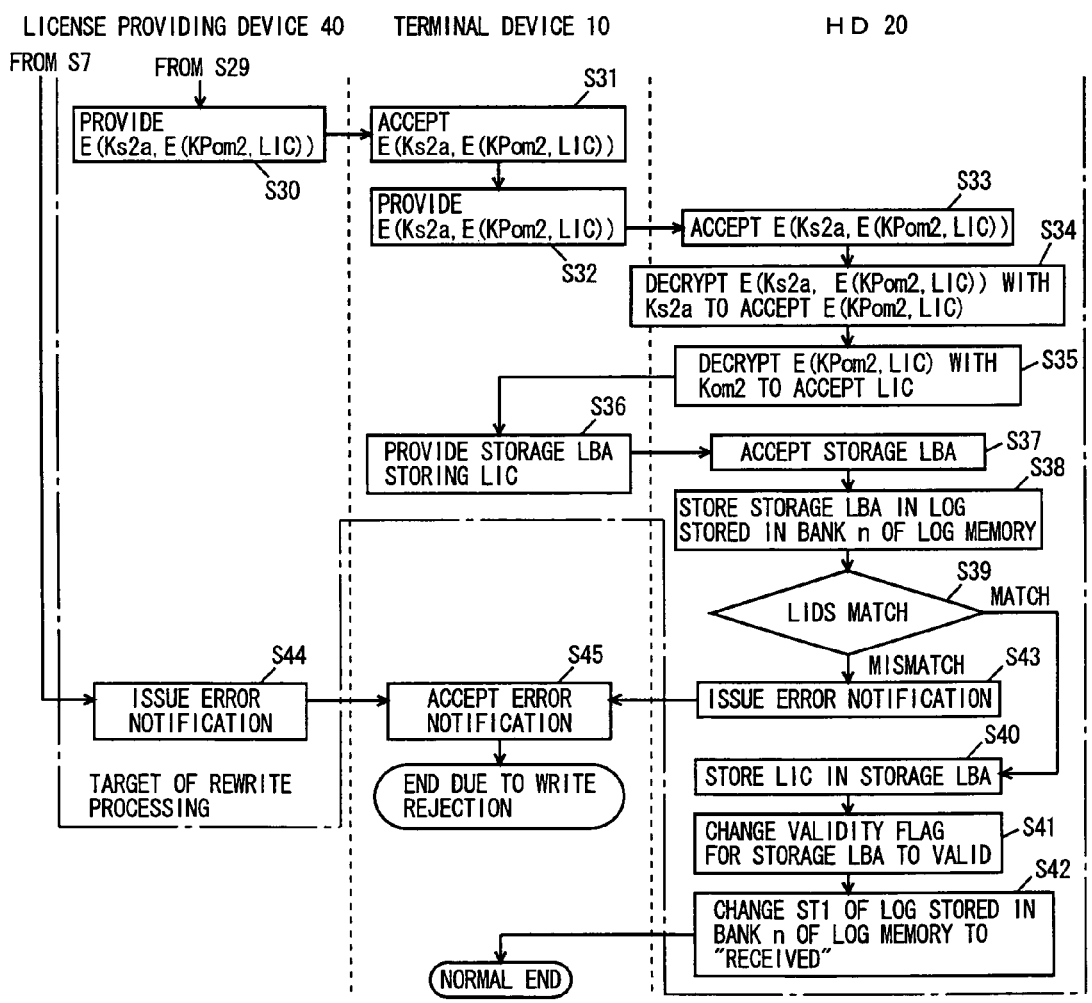
FIG. 26 is a second flowchart in the fifth embodiment for illustrating the distribution processing in the data distribution system shown in FIG. 1.

In the fifth embodiment, license providing device 40 distributes the license to hard disk 20 in accordance with the flowcharts of FIGS. 25 and 26. The flowcharts of FIGS. 25 and 26 are the same as those of FIGS. 9 and 10 except for that a step S16a is inserted between steps S16 and S17 in FIGS. 9 and 10, and step 20 is replaced with a step S201a.

Figure 27:
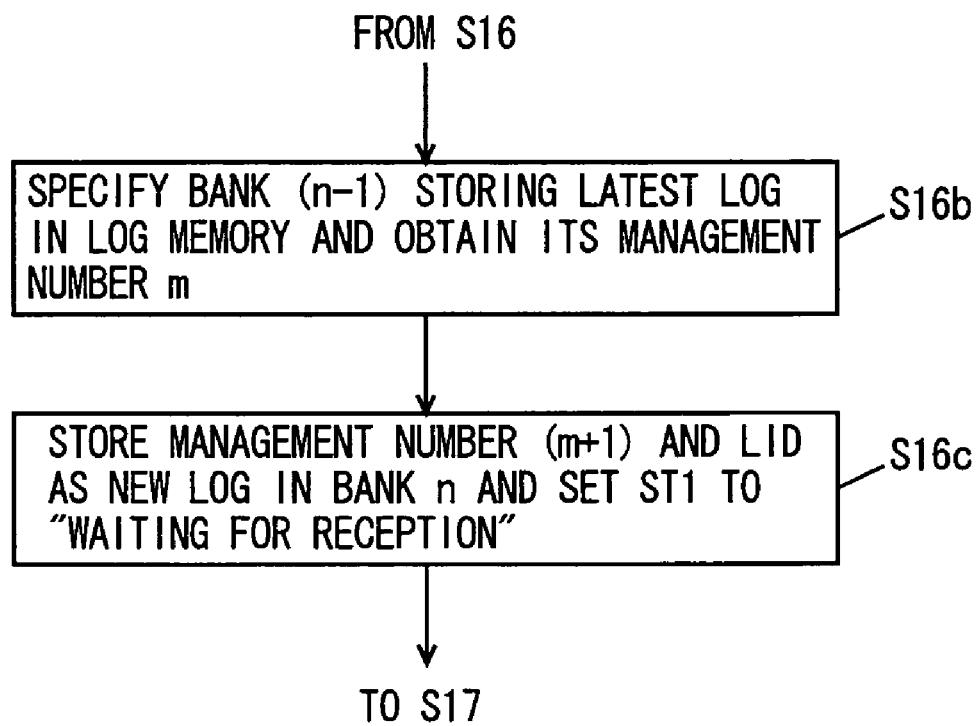
FIG. 27 is a flowchart for illustrating specific operations in a step S16a illustrated in FIG. 25.

Specific operations in step S16a are executed according to a flowchart of FIG. 27. Referring to FIG. 27, controller 214 of hard disk 20 specifies bank (n−1) storing the latest log after step S16, and obtains management number m stored in bank n (step S16b). Specific operations in step S16b are executed according to the flowchart of FIG. 12.

After step S116b, controller 214 stores management number (m+1) and license ID (LID) accepted in step S16 in bank n, and sets ST1 region 2544 of the log stored in bank n to "waiting for reception" (step S16c). Thereby, the operation in step S16a illustrated in FIG. 25 ends.

After step S19, controller 214 records session key Ks2a accepted in step S19 in Ks2x region 2543 of the log stored in bank n of log memory 253 (step S201a).

Operations other than the above are the same as those in the first embodiment already described.

[Rewrite in Distribution]

In the fifth embodiment, the license is rewritten when the license distribution is interrupted, and this rewrite operation is performed according to the flowcharts of FIGS. 13-15. The specific operations are the same as those already described in connection with the first embodiment.

[Shift/Copy]

Figure 28:
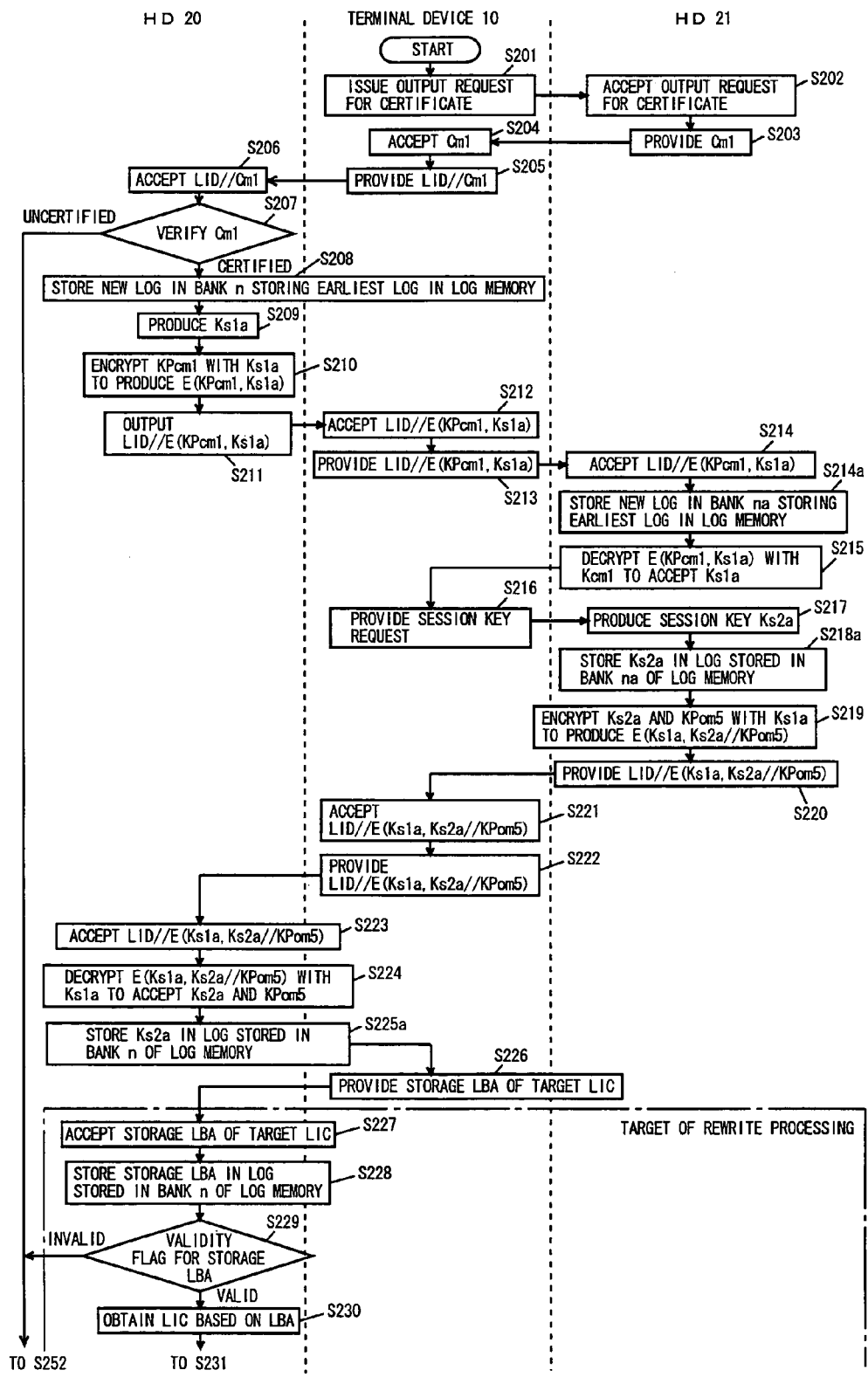
FIG. 28 is a first flowchart in the fifth embodiment for illustrating copy or shift operation in the system illustrated in FIG. 17.
Figure 29:
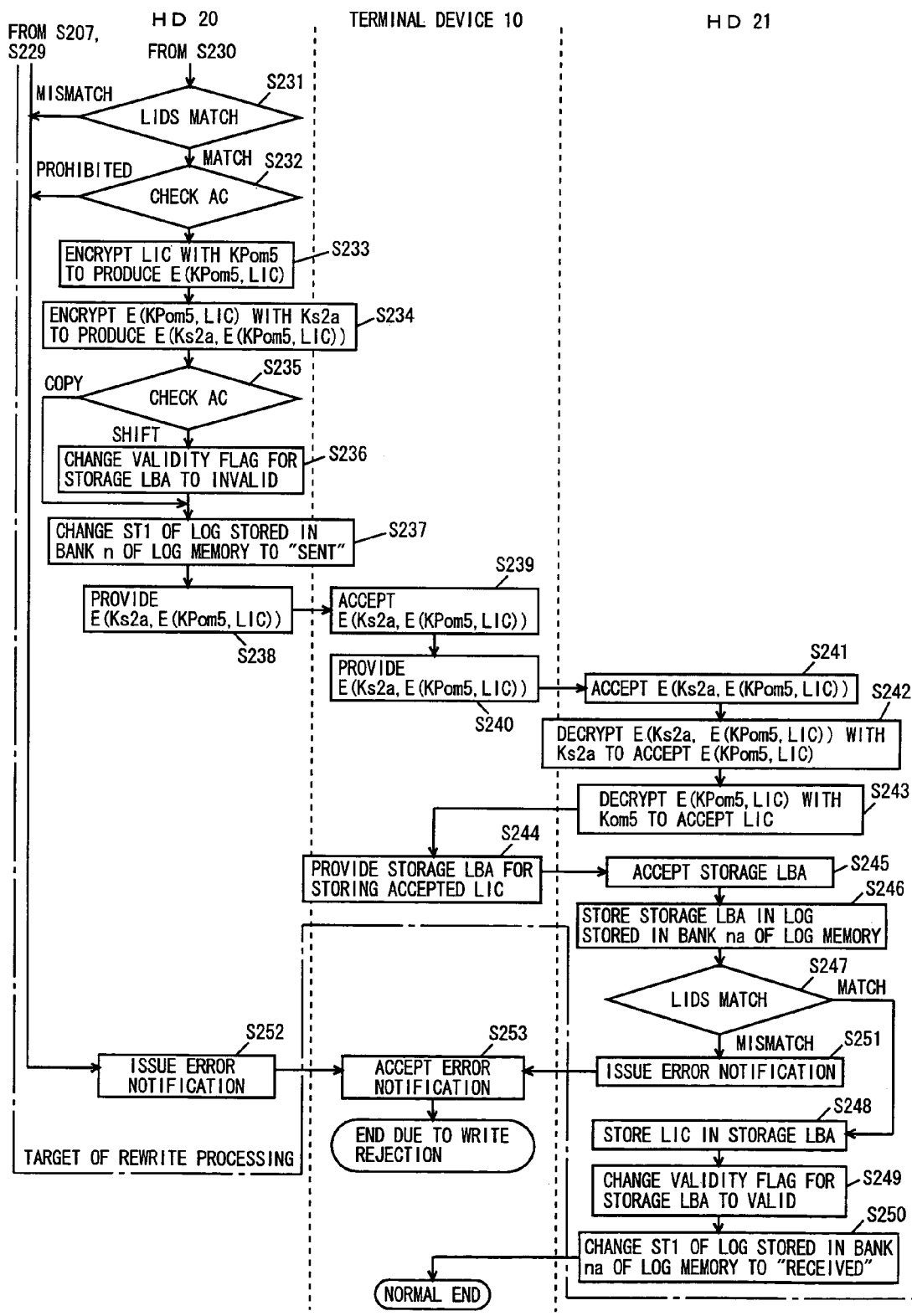
FIG. 29 is a second flowchart in the fifth embodiment for illustrating the copy or shift operation in the system illustrated in FIG. 17.

FIGS. 28 and 29 are first and second flowcharts for illustrating processing (copy/shift session) in the fifth embodiment performed in the system, which is shown in FIG. 17 and can perform shift/copy of the license. In this processing, the user of terminal device 10 requests the copy or shift of the license of the encrypted content data from terminal device 10, and thereby the license is copied or shifted from hard disk 20 attached to terminal device 10 to hard disk 21 via terminal device 10.

The flowcharts of FIGS. 28 and 29 are the same as those of FIGS. 18 and 19 except for that a step S208 is inserted between steps S207 and S209, a step S214a is inserted between steps S214 and S215, step S218 is replaced with a step S218a, and step S225 is replaced with step S225a.

Referring to FIG. 28, when controller 214 of hard disk 20 approves certificate Cm1 provided from hard disk 21 in step S207, it stores the new log in bank n storing the earliest log in log memory 253 (step S208). Specific operations in step S208 are performed according to a flowchart of FIG. 30.

Figure 30:
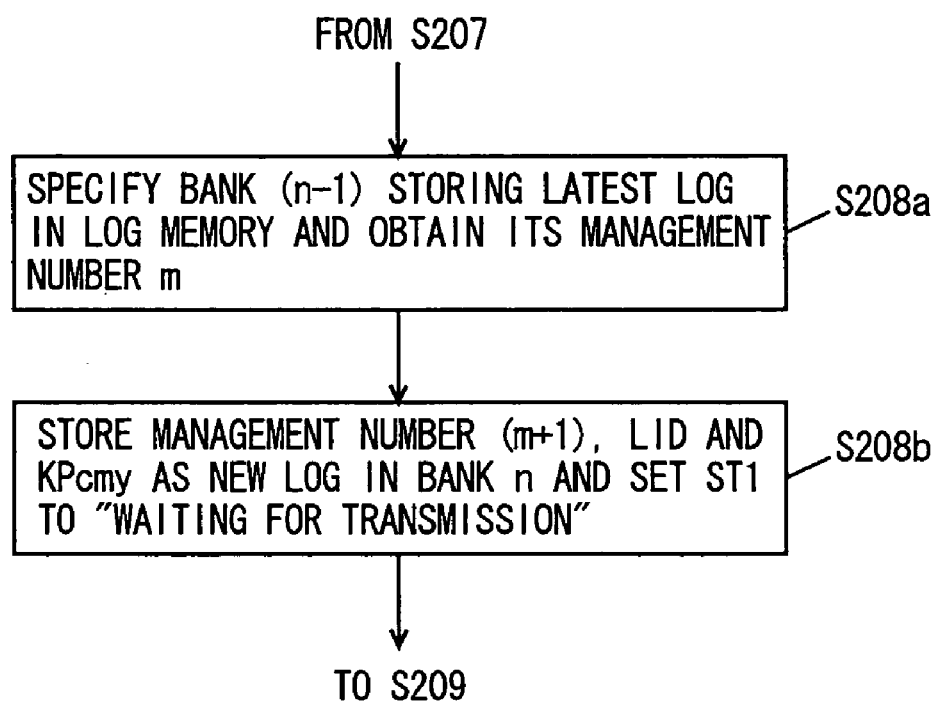
FIG. 30 is a flowchart for illustrating specific operations in a step S208 illustrated in FIG. 28.

Referring to FIG. 30, step S208 includes a step S208a, in which bank (n−1) storing the latest log in log memory 253 is specified in hard disk 20, and management number m stored in bank (n−1) is obtained, and a step S208b, in which management number (m+1), license ID (LID) and class public key KPcmy are stored in bank n, and status ST1 in ST1 region 2544 is set to "transmitted". Specific operations in step S208a are performed according to the flowchart of FIG. 12. Therefore, controller 214 operates according to the flowcharts of FIGS. 12 and 30, and thereby stores the new log, which stores license ID (LID) accepted in step S206, class public key KPcm1 of hard disk 21 and status ST1 set to "waiting for transmission", in bank n.

After step S214, controller 214 of hard disk 21 stores the new log in bank na storing the earliest log (step S214a). Specific operations in step S214a are performed according to the flowcharts of FIGS. 12 and 27 already described, although variable n is replaced with variable na.

Therefore, according to the flowcharts of FIGS. 12 and 27, controller 214 of hard disk 21 stores license ID (LID) accepted in step S214 and the new log storing status ST1 set to "waiting for reception" in bank na storing the earliest log in log memory 254 (step S214a).

Further, after step S217, controller 214 of hard disk 21 stores session key Ks2a produced in step S217 in bank na of log memory 253 (step S218a).

Further, after step S224, controller 214 of hard disk 20 stores session key Ks2a accepted in step S224 in bank n of log memory 253 (step S225a).

Operations other than the above are the same as those already described in connection with the first embodiment.

[Rewrite in Shift/Copy]

In the fifth embodiment, when the session of shifting or copying the license from hard disk 21 to hard disk 20 is interrupted, the operation of rewriting the license is performed according to the flowcharts of FIGS. 21-23. Therefore, specific operations for the rewriting are the same as those in the first embodiment already described.

The fifth embodiment achieves the safe processing of rewriting and providing the license similarly to the first embodiment, and clarifies the timing of log generation in the respective kinds of processing. Also, similarly to the third embodiment, the fifth embodiment can reduce the amount of implemented processing by providing commonality between the normal write processing and the rewrite processing. The processing of hard disk 21 can be changed similarly.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The invention can be applied to the data storage device, which can store a plurality of items of history information relating to input/output processing of classified data without overlap.

The invention claimed is:

1. A terminal device for performing input/output of classified data in accordance with a constant procedure, storing said classified data, and operating to store history information or update at appropriate timing said history information in accordance with progress of said constant procedure, comprising:

a data storage device, wherein the data storage device comprising:

a data storage portion storing said classified data, wherein said classified data includes a plurality of classified data items;

a log storage portion storing a plurality of items of the history information relating to the input/output of said classified data to and from the data storage portion, wherein each of said plurality of items of the history information includes identification information identifying a classified data item, information showing a progress state of input/output processing of the classified data item, and information showing a state of the input/output of the classified data item, wherein said log storage portion is provided as a ring buffer circulatively with two or more regions each storing one item of said history information;

an interface performing external input/output of said classified data to or from the data storage portion;

a control portion controlling the input/output of at least one classified data item to or from the data storage portion;

said control portion receives the identification information identifying said at least one classified data item to be input/output via said interface in accordance with start of input/output processing of said at least one classified data item to or from the data storage portion, searches the two or more regions in said log storage portion in a predetermined order, determines the region storing the earliest item of the history information stored in said log storage portion as the earliest region, and stores new history information relating to the input/output processing of said at least one classified data item including said received identification information in the determined earliest region, and in input processing of said at least one classified data item to the data storage portion, said control portion searches the two or more regions in said log storage portion in the predetermined order, determines the latest region storing the newest item of the history information including said received identification information, and outputs via said interface the information showing the progress state of the input/output processing of said at least one classified data item and the information showing the state of the input/output of said at least one classified data item included in the history information stored in the determined latest region.

2. The terminal device according to claim 1, wherein in input processing of said at least one classified data item, said control portion searches the two or more regions in said log storage portion in a predetermined sequence, determines said earliest region and the latest region storing the latest history information including said received identification information, copies a part or the whole of the history information stored in the determined latest region into the determined earliest region to store the copied history information as new history information relating to the input processing of said at least one classified data item, and outputs a part or the whole of the history information stored in said determined earliest region via said interface.

3. The terminal device according to claim 1, wherein in re-output processing of said classified data including inputting of one additional item of the history information recorded in accordance with progress of said constant procedure by another device, said control portion receives said one additional item of the history information via said interface in addition to the received identification information, determines said earliest region and said latest region, and determines whether said classified data is to output or not, based on the history information stored in the determined earliest region and said received one additional item of the history information.

4. The terminal device according to claim 1, wherein in output processing of said classified data including inputting of one additional item of the history information recorded in accordance with progress of a constant procedure by another device, said control portion receives said one additional item of the history information via said interface in addition to the received identification information, determines said earliest region and said latest region, copies a part or the whole of the history information stored in the determined latest region into the determined earliest region to store the copied history information as the new history information relating to the output processing of said classified data, and determines whether said classified data is to output or not, based on the history information stored in said determined earliest region and said received one additional item of the history information.

5. The terminal device according to claim 1, wherein after said earliest region is determined, said control portion updates at appropriate times the history information stored in said determined earliest region in accordance with progress of the constant procedure before end or interruption of the constant procedure in said input/output processing.

6. The terminal device according to claim 1, wherein each of the plurality of items of said history information further includes a management number for identifying sequence stored in said log storage portion, and said earliest region storing the earliest item is detected based on the management numbers respectively included in two items of the history information stored in two regions arranged continuously in said log storage portion.

7. The terminal device according to claim 6, wherein said log storage portion is formed of a ring buffer circulatively utilizing regions of N (N is a natural number larger than one) in number, and said management number is in a residue system of M (M is a natural number satisfying (N<M)).

8. The terminal device according to claim 7, wherein said control portion obtains each of the management numbers respectively included in the two items of the history information store in the two regions arranged continuously in the log storage portion, determines whether the two items of the history information respectively including said management numbers are stored continuously or not, based on a difference between the obtained management numbers, and detects one of said two continuous regions subsequent to the other as said earliest region when the two items of the history information are discontinuously stored.

* * * * *